US010554144B2

(12) United States Patent
Cao et al.

(10) Patent No.: US 10,554,144 B2
(45) Date of Patent: Feb. 4, 2020

(54) DUAL VOLTAGE AND CURRENT LOOP LINEARIZATION CONTROL AND VOLTAGE BALANCING CONTROL FOR SOLID STATE TRANSFORMER

(71) Applicant: Nanyang Technological University, Singapore (SG)

(72) Inventors: Shuyu Cao, Singapore (SG); Brihadeeswara Sriram Vaisambhayana, Singapore (SG); Anshuman Tripathi, Singapore (SG); Fengjiao Cui, Singapore (SG); Abishek Sethupandi, Singapore (SG); Hossein Dehghani Tafti, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 16/376,662

(22) Filed: Apr. 5, 2019

(65) Prior Publication Data

US 2019/0312521 A1 Oct. 10, 2019

(51) Int. Cl.
*H02M 5/458* (2006.01)
*H02M 1/088* (2006.01)
(Continued)

(52) U.S. Cl.
CPC ......... *H02M 5/4585* (2013.01); *H02M 1/088* (2013.01); *H02M 1/36* (2013.01);
(Continued)

(58) Field of Classification Search
CPC ...... H02M 5/458; H02M 5/4585; H02M 1/36; H02M 1/88; H02M 2001/0003;
(Continued)

(56) References Cited

U.S. PATENT DOCUMENTS 3,304,494 A * 2/1967 Palatinus .................. H03K 4/12
  324/76.27
3,436,641 A * 4/1969 Biringer ................ H02M 5/271
  363/10

(Continued)

OTHER PUBLICATIONS

Zhao, Q. Song and W. Liu, "Power Characterization of Isolated Bidirectional Dual-Active-Bridge DC-DC Converter With Dual-Phase-Shift Control," IEEE Transactions on Power Electronics, vol. 27, No. 9, pp. 4172-4176, 2012.
(Continued)

*Primary Examiner* — Yemane Mehari
(74) *Attorney, Agent, or Firm* — K&L Gates LLP

(57) ABSTRACT

This invention relates to a method of controlling a Solid State Transformer (SST). The method comprises dividing a dual active bridge (DAB) power reference on a Low Voltage (LV) side Direct Current (DC) link voltage to obtain a total DAB reference current; dividing the total DAB current reference by N number of DAB modules to obtain a reference current for each DAB module; in response to SST being in a normal power regulation, determining a deviation of a capacitor voltage at the HV side of each of a k DAB modules with reference from an average voltage from the HV DC bus; determining a current adjustment signal for each of the k DAB modules based on the total DAB reference current and a corresponding deviation of the capacitor voltage of each of the k DAB modules; adding a saturated current adjustment signal together with the reference current for each of the k DAB modules to obtain a total current reference for each of the k DAB modules; and subtracting a sum of the total current reference of each of the k DAB modules from the total DAB reference current to determine a total current reference for an $N^{th}$ DAB module.

13 Claims, 52 Drawing Sheets

(51) Int. Cl.
    *H02M 1/00*     (2006.01)
    *H02M 1/36*     (2007.01)
(52) U.S. Cl.
    CPC .... *H02M 5/458* (2013.01); *H02M 2001/0003* (2013.01); *H02M 2001/0093* (2013.01)
(58) Field of Classification Search
    CPC ....... H02M 2001/0093; H02M 7/5357; H02M 7/538; H02M 7/53803; H02J 3/38; H02J 9/06; H02J 9/062
    USPC ........ 363/10, 34, 37, 98, 123, 127, 129, 132
    See application file for complete search history.

(56) References Cited

U.S. PATENT DOCUMENTS

| | | | | |
|---|---|---|---|---|
| 5,099,410 | A * | 3/1992 | Divan ..................... | H02J 9/062 |
| | | | | 363/98 |
| 9,450,415 | B2 * | 9/2016 | Larsen .................... | H02J 3/386 |
| 10,186,995 | B2 * | 1/2019 | Dong ....................... | H02J 3/382 |
| 2005/0111246 | A1 * | 5/2005 | Lai ......................... | H02M 5/225 |
| | | | | 363/157 |
| 2019/0097544 | A1 * | 3/2019 | Albertini ........... | H02M 3/33584 |

OTHER PUBLICATIONS

S. S. Muthuraj, V. K. Kanakesh, P. Das and S. Panda, "Triple Phase Shift control of LLL tank based Bidirectional Dual Active Bridge Converter," IEEE Transactions on Power Electronics, vol. PP, No. 99, pp. 1-20, 2016.

B. Zhao, Q. Yu and W. Sun, "Extended-Phase-Shift Control of Isolated Bidirectional DC-DC Converter for Power Distribution in Microgrid," IEEE Transactions on Power Electronics, vol. 27, No. 11, pp. 4667-4680, 2012.

Shigenori Inoue; Hirofumi Akagi, "Voltage Control of a Bi-Directional Isolated DC/DC Converter for Medium-Voltage Motor Drives", 2007 Power Conversion Conference—Nagoya, pp. 1244-1250.

Dinesh Segaran; Donald Grahame Holmes; Brendan Peter McGrath, "Enhanced Load Step Response for a Bidirectional DC-DC Converter", IEEE Transactions on Power Electronics Year: 2013, vol. 28, Issue: 1. pp. 371-379.

J. Shi, W. Gou, H. Yuan, T. Zhao and A. Q. Huang, "Research on Voltage and Power Balance Control for Cascaded Modular Solid-State Transformer," IEEE Transactions on Power Electronics, vol. 26, No. 4, pp. 1154-1166, 2011.

F. Krismer and J. W. Kolar, "Accurate Small-Signal Model for the Digital Control of an Automotive Bidirectional Dual Active Bridge," IEEE Transactions on Power Electronics, vol. 24, No. 12, pp. 2756-2768, 2009.

B. Zhao, Q. Song, W. Liu, G. Liu and Y. Zhao, "Universal High-Frequency-Link Characterization and Practical Fundamental-Optimal Strategy for Dual-Active-Bridge DC-DC Converter Under PWM Plus Phase-Shift Control," in IEEE Transactions on Power Electronics, vol. 30, No. 12, pp. 6488-6494, Dec. 2015.

B. Bahrani, A. Rufer, S. Kenzelmann and L. A. C. Lopes, "Vector Control of Single-Phase Voltage-Source Converters Based on Fictive-Axis Emulation," in IEEE Transactions on Industry Applications, vol. 47, No. 2, pp. 831-840, Mar.-Apr. 2011.

A. Filba-Martinez, S. Busquets-Monge and J. Bordonau, "Modulation and capacitor voltage balancing control of a four-level active-clamped dual-active-bridge DC-DC converter," 2016 18th European Conference on Power Electronics and Applications (EPE'16 ECCE Europe), Karlsruhe, 2016, pp. 1-8.

D. Sha, G. Xu and Y. Xu, "Utility Direct Interfaced Charger/Discharger Employing Unified Voltage Balance Control for Cascaded H-Bridge Units and Decentralized Control for CF-DAB Modules," in IEEE Transactions on Industrial Electronics, vol. 64, No. 10, pp. 7831-7841, Oct. 2017.

T. Zhao, G. Wang, S. Bhattacharya and A. Q. Huang, "Voltage and Power Balance Control for a Cascaded H-Bridge Converter-Based Solid-State Transformer," in IEEE Transactions on Power Electronics, vol. 28, No. 4, pp. 1523-1532, Apr. 2013.

H. Dehghani Tafti, A. I. Maswood, G. Konstantinou. C. Townsend, P. Acuna and J. Pou, "Flexible Control of Photovoltaic Grid-Connected Cascaded H-Bridge Converters during Unbalanced Voltage Sags," IEEE Trans. Ind. Elec, 2018.

Hyeok-Jin Yun; Ho-Sung Kim; Myung-Hyo Ryu; Ju-Won Baek; Hee-Je Kim, "A simple and practical voltage balance method for a solid-state transformer using cascaded H-bridge converters", 2015 9th International Conference on Power Electronics and ECCE Asia (ICPE-ECCE Asia).

A Simple and Practical Voltage Balance Method for a Solid-State Transformer using Cascaded H-bridge Converters, 9th International Conference on Power Electronics-ECCE Asia, Jun. 1-5, 2015 / 63 Convention Center, Seoul, Korea.

L. Xiang, W. Jian, Y. Xiaojie and W. Kun, "An improved proportional pulse compensation strategy for DC voltage balance of cascaded H-Bridge Rectifier," 2016 IEEE Energy Conversion Congress and Exposition (ECCE), Milwaukee, WI, 2016, pp. 1-6.

* cited by examiner

DUAL VOLTAGE AND CURRENT LOOP LINEARIZATION CONTROL AND VOLTAGE BALANCING CONTROL FOR SOLID STATE TRANSFORMER

CROSS-REFERENCE TO RELATED APPLICATION

This application claims the benefit of Singapore Patent Application No. 10201802869Q, entitled "Dual Voltage And Current Loop Linearization Control And Voltage Balancing Control For Solid State Transformer" and filed on 5 Apr. 2018, which is expressly incorporated by reference herein in its entirety.

FIELD OF THE INVENTION

This disclosure relates to an improved Solid State Transformer (SST). Particularly, this disclosure relates to a Direct Current (DC) bus capacitor voltage balancing method at the High Voltage (HV) side of a SST system. Further, this disclosure relates to a linearized Dual Active Bridge (DAB) feedback control.

BACKGROUND

FIG. 1 shows one known implementation of a modular SST circuit topology for Low Voltage (LV) side grid tied application. Briefly, a SST typically comprises a HV side 110, a LV side 130 and a DAB 120 between the HV 110 and LV 130. Returning back to FIG. 1, the HV side 110 Neutral Point Clamp (NPC) 3-level Cascaded H-Bridge (CHB) converter are connected to single phase HV side Alternating Current (AC) voltage source. For each individual DAB module, its HV side NPC half bridge DC-AC converter is connected through a HV side DC bus to NPC CHB module. The modular DAB LV side 2-level full bridge AC-DC converters are connected through a common LV DC bus to a LV AC grid tied three-phase inverter. This NPC CHB 3-level SST circuit configuration supports bi-directional power flow between HV and LV AC grid sources with less number of High Frequency (HF) transformers and power devices. As the last solution for capacitor over voltage protection of this SST circuit, an individual chopper discharging circuit is connected to each DC bus capacitor. In normal SST operation, the chopper discharging circuit should not be activated in normal power regulation. For this NPC CHB SST circuit topology, it is required that the NPC top/bottom capacitor voltage balancing control to be implemented in NPC CHB controller to avoid unsymmetrical HF transformer current generated by the DAB NPC capacitor voltage balancing control. Module level voltage balancing control is also required for this NPC CHB SST circuit topology to minimize the NPC CHB circuit total DC bus voltage variation.

FIG. 2 shows another popular modular SST circuit topology composed of 2-level full bridge converter for both CHB and DAB. For the same HV side 110 grid voltage level and CHB power device voltage rating, 2-level full bridge SST circuit topology requires more levels of CHB and DAB modules and more number of HF transformers. Similar to the SST NPC CHB circuit topology, a chopper discharging circuit is connected to each capacitor as the last solution for SST DC bus over voltage protection. Module level HV side DC bus voltage balancing control is required for this SST circuit topology to minimize the CHB DC bus voltage variation.

In SST system, the control objective of LV side 130 DC-AC inverter is to regulate the bi-direction of active power flow of the entire SST system around its target value and to regulate the bi-direction reactive power output to LV side grid around its reference value. The control objective of HV side CHB converter is to regulate the total HV DC bus voltage around its target value with fast dynamic response with evenly distributed voltage output among each CHB module. The control objective of modular DAB DC-DC converter is to regulate the LV DC bus voltage around its target value with fast dynamic response.

In the SST converter system, module level HV side 110 DC bus voltage balancing could be affected by the imperfect HV side CHB control performance due to the non-ideal power switching operation, the practical HV side DC bus capacitance variation, and the imperfect DAB current/power distribution performance due to DAB module-to-module circuit parameter variations. The unbalanced HV side DC bus voltage will cause the capacitor or power device overvoltage in the CHB and DAB circuit and trigger the SST overvoltage protection.

Conventionally, the modular CHB converter voltage balancing control is generally applied for SST HV side DC bus voltage balancing control. The often cited limitation of this type of voltage balancing solution is that it requires significant amount of reactive current flow in the CHB converter for the voltage balancing algorithm to work properly in light load condition. Another disadvantage of CHB voltage balancing algorithm is that the grid current is slightly distorted due to PWM modulation signal injection from the voltage balancing algorithm.

FIGS. 3a and 3b show the conventional module level H-bridge voltage balancing control for HV side 110 CHB converter in regular power regulation for the 2-level full bridge CHB and DAB SST circuit topology shown in FIG. 2. The H-bridge voltage balancing scheme shown in FIG. 3a is responsible for module level HV DC bus voltage balancing control. The capacitor voltage error is regulated by a PI controller to generate d-axis voltage reference compensation signal which is added to the fundamental d-axis voltage reference generated by the d-axis current regulation. In this configuration, if the active power unbalance among the DAB modules is too large, the CHB voltage balancing algorithm will not be able to maintain the balanced HV DC bus voltage. FIG. 3b shows the power balance control scheme implemented in DAB controller to help to reduce the active power unbalance generated by the DAB module circuit parameter variation so that the conventional CHB voltage balancing algorithm can work more effectively.

The disadvantage of the power balancing control scheme based on that shown in FIGS. 3a and 3b is that the CHB voltage balancing control is only applied as inputs to the d-axis voltages. This type of voltage balancing control is not effective in the start-up process of SST when only CHB converter control is activated and when CHB is operating around zero power condition. For this power balancing control scheme, reactive current in CHB cannot help to improve the voltage balancing performance because q-axis voltage reference is not affected by the voltage balancing component. Another disadvantage of this SST power voltage balancing control scheme is that the DAB power balancing control is a feedforward control to mitigate the DAB control sensitivity to circuit parameter variations, and CHB voltage balancing control needs to be activated in the entire operation range of SST in normal power regulation.

An enhanced CHB capacitor voltage balancing scheme is proposed as shown in FIG. 4 with DC bus voltage error proportional control method which utilizes the magnitude normalized grid current to change the direction of voltage balancing PWM modulation injection signal. The DC bus voltage error passes through a moving average filter (MAF) as one input for voltage balancing control. The peak value of grid current is computed from root mean square (RMS) value of the grid current. The magnitude normalized grid current is computed by dividing the grid current signal by its peak value. This CHB voltage balancing control method can be applied for individual NPC CHB module top/bottom voltage balancing control as well as SST module level voltage balancing control. When applied in SST converter system, the CHB voltage balancing control performance will be improved by injecting certain amount of reactive current in the CHB control at zero power or light load condition. However, the disadvantage of this CHB voltage balancing control is that the load/power dynamic response from the DAB may vary.

FIG. 5 shows a SST HV DC bus voltage balancing control which is implemented in single voltage loop DAB control system by directly generating the phase shift angle adjustment signals for each individual DAB. However, the disadvantage of this DAB control based voltage balancing control scheme is that single voltage loop DAB control is slow in load/power dynamic response and very sensitive to the DAB parameter variations. This creates extra disturbance to the PI controller in the load/power dynamic transition period. The dynamic performance of this DAB voltage balancing control is not reliable.

Hence, those skilled in the art are striving to provide an improved method of balancing the Direct Current (DC) bus capacitor voltage at the High Voltage (HV) side of a SST system.

SUMMARY OF THE INVENTION

The above and other problems are solved and an advance in the state of the art is made by systems and methods provided by embodiments in accordance with the disclosure. The first advantage of embodiments of systems and methods in accordance with the disclosure is that systems and methods are able to minimize the HV side DC bus voltage unbalance in SST start-up process with enforced reactive current flow in CHB converter circuit with enhanced CHB module voltage balancing control implemented. The second advantage of embodiments of systems and methods in accordance with the disclosure is that systems and methods are able to minimize the HV side DC bus voltage unbalance in SST normal power regulation with current distribution adjustment based on module level voltage error implemented in the dual voltage and current loop DAB control system. The third advantage of embodiments of system and methods in accordance with the disclosure is that systems and methods minimize the HV side DC bus voltage unbalance in the fast dynamic load/power transition process. The fourth advantage of embodiments of system and methods in accordance with the disclosure is that systems and methods can be implemented to DC link type SST circuit topology, including the 2-level full bridge CHB, 3-level NPC CHB circuit topology and other higher level CHB and DAB circuit topology.

A first aspect of the disclosure relates to a method of controlling a Solid State Transformer (SST). The method comprises: dividing a dual active bridge (DAB) power reference by a Low Voltage (LV) side Direct Current (DC) link voltage to obtain a total DAB reference current; dividing the total DAB current reference by N number of DAB modules to obtain a reference current for each DAB module; in response to SST being in a normal power regulation, determining a deviation of a capacitor voltage at the HV side of each of a k DAB modules with reference from an average voltage from the HV DC bus; determining a current adjustment signal for each of the k DAB modules based on the total DAB reference current and a corresponding deviation of the capacitor voltage of each of the k DAB modules; adding the current adjustment signal together with the reference current for each DAB module to obtain a total current reference for each of the k DAB modules; and subtracting a sum of the total current reference of each of the k DAB modules from the total DAB reference current to determine a total current reference of an $N^{th}$ DAB module, wherein k=1, . . . , N−1.

In an embodiment of the first aspect of the disclosure, the step of determining a current adjustment signal for each of the k DAB modules based on the total DAB reference current and a corresponding deviation of the capacitor voltage of each of the k DAB modules comprises multiplying the deviation of the capacitor voltage at the HV side of each DAB module, a load dependent voltage balancing proportional compensation gain, and a magnitude of the reference current for each of the k DAB modules. The voltage balancing proportional compensation gain can be positive values which can be obtained from a look-up table.

In an embodiment of the first aspect of the disclosure, the current adjustment signal is saturated before adding together with the reference current for each DAB module to obtain the total current reference for each of the k DAB modules.

In an embodiment of the first aspect of the disclosure, the method further comprises: in response to the total current reference of the $N^{th}$ DAB module being positive, increasing the magnitude of the reference current for a DAB module with higher deviation of the capacitor voltage.

In an embodiment of the first aspect of the disclosure, the method further comprises: in response to the total current reference of the $N^{th}$ DAB module being negative, reducing the magnitude of the reference current for a DAB module with higher deviation of the capacitor voltage.

In an embodiment of the first aspect of the disclosure, the method further comprises: in response to the total current reference of the $N^{th}$ DAB module being positive, reducing the magnitude of the reference current for a DAB module with lower deviation of the capacitor voltage.

In an embodiment of the first aspect of the disclosure, the method further comprises: in response to the total current reference of the $N^{th}$ DAB module being negative, increasing the magnitude of the reference current for a DAB module with lower deviation of the capacitor voltage.

In an embodiment of the first aspect of the disclosure, the method further comprises: in response to SST being in a normal power regulation, applying the reference current of each DAB module as the total current reference for each DAB module. In an embodiment of this embodiment, the method further comprises enforcing minimum HV side reactive power.

In an embodiment of the first aspect of the disclosure, the method further comprises linearizing a current and voltage in each DAB module.

In an embodiment of the first aspect of the disclosure, the step of linearizing the current and voltage in each DAB module comprises: applying a non-linear compensation function between a proportional-integral (PI) controller and a DAB plant, the non-linear compensation function being $$\frac{\beta}{x} = \frac{1}{V_{DC_{HV}} * \cos\left(\frac{\alpha_{1\_1} + \alpha_{1\_2}}{4}\right) * \cos\left(\frac{a_2}{2}\right)}$$

where $V_{DC_{HV}}$ refers to capacitor voltage at the HV side of each DAB module, $\alpha_{1\_1}$, $\alpha_{1\_2}$, $\alpha_2$, are phase shift angles from the DAB plant, $\beta$ refers to the input of the DAB plant and x refers to the output of the PI.

In an embodiment of the first aspect of the disclosure, the step of linearizing the current and voltage in each DAB module further comprises: passing a low voltage output current through a low pass filter and using the filtered output current as a feedback signal; obtaining a difference between an input current and the feedback signal and passing a signal representing the difference through a proportional-integral (PI) controller and the non-linear compensation function; and performing linearization of a voltage by using a square of a low voltage output voltage as a feedback signal to the reference voltage.

BRIEF DESCRIPTION OF THE DRAWINGS

The above advantages and features in accordance with this invention are described in the following detailed description and are shown in the following drawings.

DETAILED DESCRIPTION

This disclosure relates to an improved Solid State Transformer (SST). Particularly, this disclosure relates to a Direct Current (DC) bus capacitor voltage balancing method at the High Voltage (HV) side of a SST system. Further, this disclosure relates to a linearized Dual Active Bridge (DAB) feedback control.

The method and system according to this disclosure involves several embodiments. In a first embodiment, the method and system involves DAB current distribution having a dual current and voltage loop voltage balancing control. In a second embodiment, the method and system involves a linearized DAB feedback control. In a third embodiment, the method and system involves the combination of the first and second embodiments.

First Embodiment

The method and system according to the DAB current distribution with a dual current and voltage loop voltage balancing control is capable of achieving excellent voltage balancing performance in the zero power or light load condition without requiring HV grid current flow and robust to SST CHB and DAB circuit parameter variations. The combination of CHB voltage balancing control with minimum reactive power/current injection at SST start-up process and DAB voltage balancing control in normal SST power regulation is the best SST voltage balancing scheme to minimise the capacitor voltage variation in HV DC bus.

The DAB current distribution with a dual current and voltage loop voltage balancing control minimizes the HV side DC bus capacitor voltage unbalance in SST start-up process with enforced reactive current flow in CHB converter circuit with enhanced CHB module voltage balancing control implemented. The DAB current distribution with a dual current and voltage loop voltage balancing control also minimizes the HV side DC bus capacitor voltage unbalance in SST normal power regulation with current distribution adjustment based on module level voltage error implemented. In the zero power and light load condition in normal SST power regulation, with the DAB current distribution having a dual current and voltage loop voltage balancing control, the reactive current flow in CHB circuit is not required when DAB voltage balancing algorithm is enabled and CHB control module level voltage balancing is disabled.

Further, the DAB current distribution with a dual current and voltage loop voltage balancing control minimizes the HV side DC bus voltage unbalance in the fast dynamic load/power transition process. Advantageously, the DAB current distribution with a dual current and voltage loop voltage balancing control can be generalized to various DC link type SST circuit topology, including the 2-level full bridge CHB, 3-level NPC CHB circuit topology and other higher level CHB and DAB circuit topology.

Briefly, the method according to the first embodiment relates to a DC bus capacitor voltage balancing method which can be used in a SST system.

Figure 1:
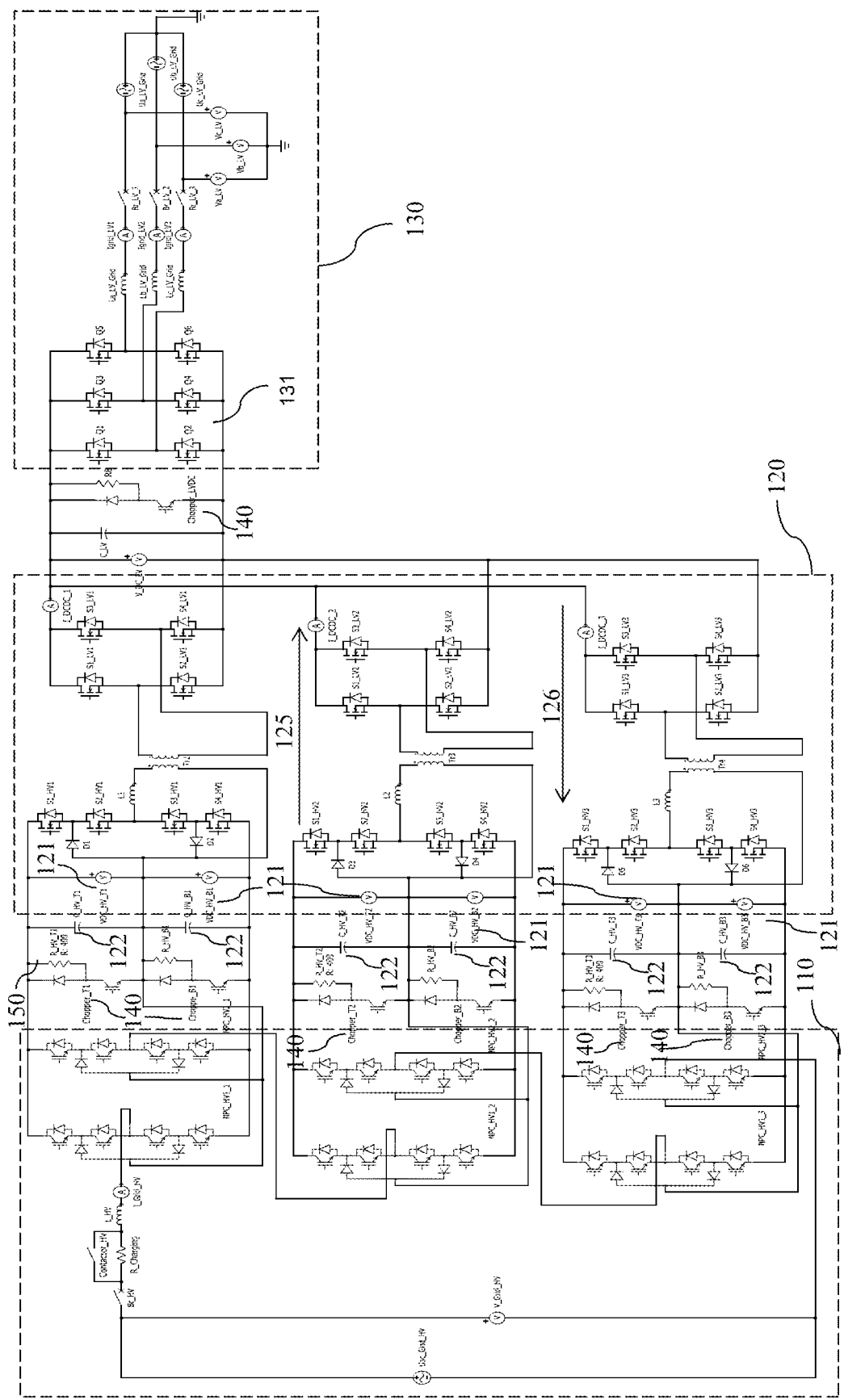
FIG. 1 illustrating the SST circuit topology with NPC CHB and HV side half-bridge NPC DAB.
Figure 6:
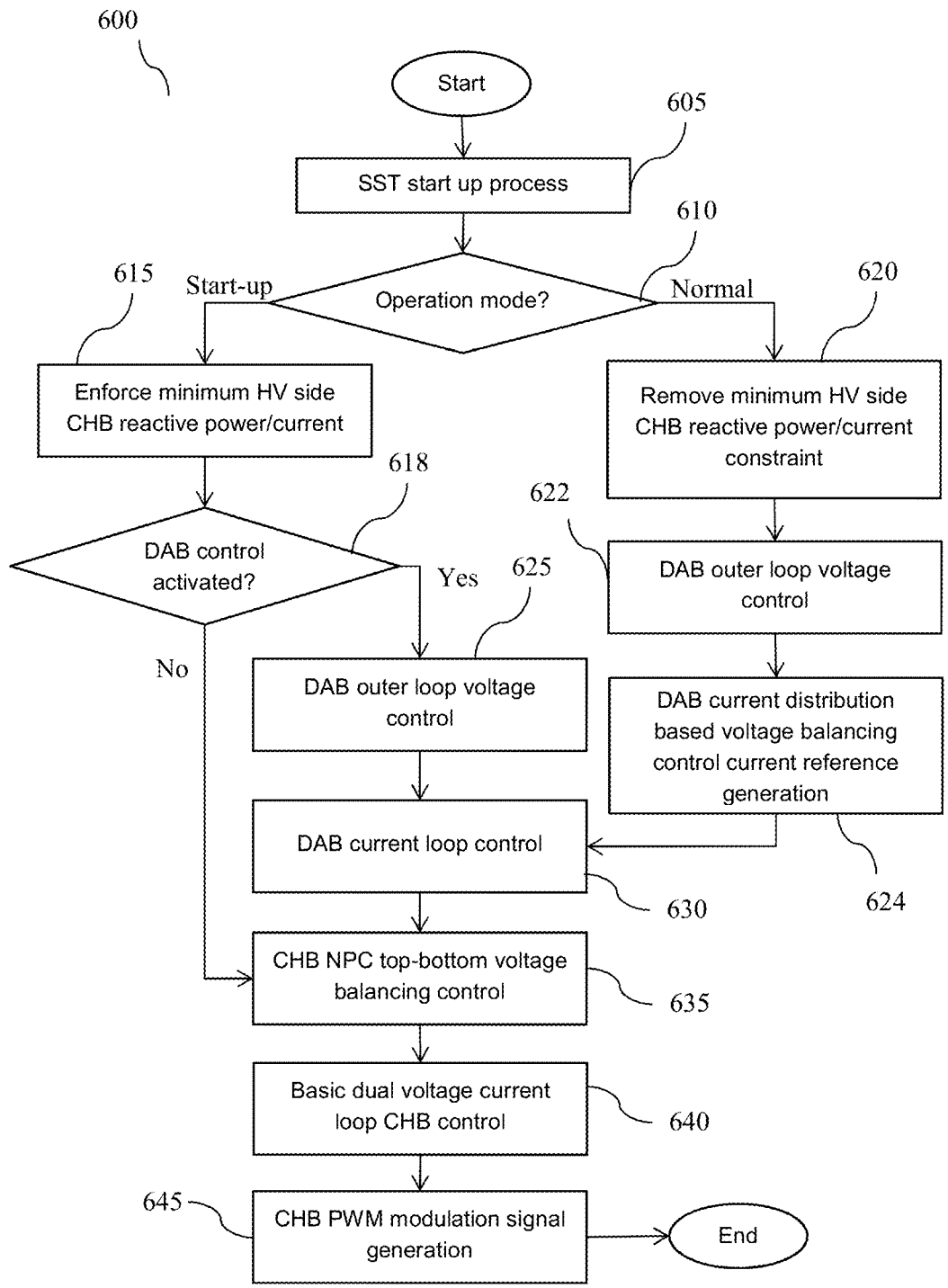
FIG. 6 illustrating the SST HV DC bus voltage balancing strategy proposed for NPC CHB SST.

FIG. 6 shows a flow diagram of a process 600 performed by the SST HV side DC bus voltage balancing control method in accordance with the first embodiment which is applicable for the SST modular NPC CHB circuit configuration shown in FIG. 1. The CHB NPC top/bottom voltage balancing control is always activated for NPC CHB circuit configuration in the entire SST operation process.

Process 600 begins with 605 with SST start-up process. In a SST system, the SST start-up process includes the HV DC bus voltage charging process and DAB LV side DC bus voltage charging process. In short, charge up process will be activated for both HV and LV DC busses at SST start-up.

In step 610, process 600 determines the operation mode of the SST. Specifically, process 600 determines whether the SST is still in the start-up or normal power regulation. When the LV side three phase inverter control 130 is activated, the SST operation mode is changed from start-up operation mode to the normal power regulation mode and process 600 proceeds to step 620. Otherwise, process 600 continues with step 615.

In step 615, process 600 enforces the minimum HV side CHB reactive power/current constraint. Specifically, the CHB control based module voltage balancing is activated in SST start-up operation mode to enforce the minimum HV side CHB reactive power/current constraint. It should be noted that step 615 is optional and is dependent on the components used in the HV converter. For example, if diodes are used to connect to the grid, it will no longer require a minimum HV side CHB reactive power/current constraint.

In step 620, process 600 removes the minimum HV side CHB reactive power/current constraint. Specifically, in the normal power regulation mode, the DAB current distribution based voltage balancing control is activated and CHB modular voltage balancing control is deactivated.

After the start-up operation mode, process 600 determines whether the DAB current distribution control is activated in step 618. If the DAB current distribution control is activated, process 600 proceeds to step 625 to activate the DAB outer loop voltage control. The DAB current distribution control may be manually or automatically activated and the exact configuration is left to one skilled in the art. For example, one skilled in the art may wish to activate the DAB current distribution control immediately after step 615 automatically. Alternatively, the DAB current distribution control may be activated on demand by a user. If the DAB current distribution control is not activated, process 600 proceeds to step 635 to activate the CHB NPC top-bottom balancing control.

In the normal power regulation mode, the DAB current distribution control is activated in step 622. Thereafter, process 600 proceeds to step 624 to generate the DAB current references before proceeding to step 630. It should be noted that step 624 is not required between step 625 and step 630. This is because in the start-up mode, DAB current reference is simply the nominal current reference 750. This will be explained further below with reference to FIG. 7.

After step 624 and step 625, process 600 proceeds to step 630 to activate the DAB current loop control to determine the DAB current references to minimize the HV DC bus voltage unbalance. The details of determining the DAB current references are provided below with reference to FIG. 7.

In step 635, process 600 activates the CHB NPC top-bottom voltage balancing control.

In step 640, process 600 activates the basic dual voltage current loop CHB control.

In step 645, process 600 activates CHB PWM modulation signal generation.

Process 600 ends after step 645.

Figure 7:
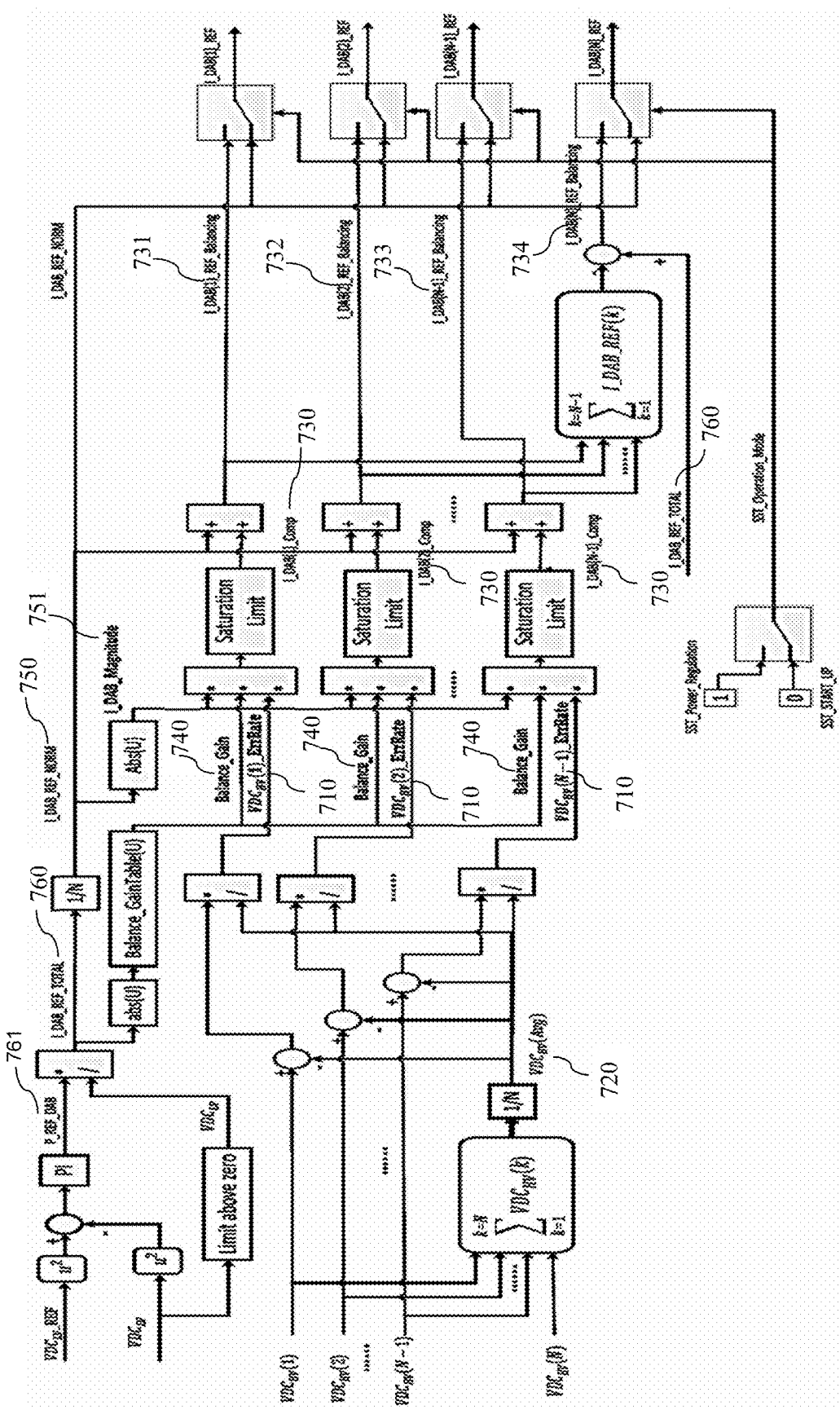
FIG. 7 illustrating the Modular DAB current distribution based HV DC bus voltage balancing control.

FIG. 7 illustrates the implementation details of modular DAB current distribution with dual current and voltage loop voltage balancing control. In DAB voltage control, the total DAB power reference 761 is generated from proportional integral (PI) regulation of the square of LV side voltage feedback signal. The total DAB current is generated by dividing the DAB power reference by the LV side DC link voltage. The nominal current of individual DAB module is computed by dividing the total current reference by the number of DAB modules. When DAB current distribution based voltage balancing control is disabled/deactivated, the nominal DAB module current is applied as the reference current for all DAB modules for modular DAB inner current feedback control.

In the SST normal power regulation, DAB current distribution based HV DC bus voltage balancing control algorithm is enabled/activated. For the SST circuit with "N" sets of CHB and DAB module pairs, the equations (1) to (4) are applied by the DAB voltage balancing controller to generate the DAB current references to minimize the HV DC bus voltage unbalance.

The individual HV DC bus voltage error rate of the "N−1" modules with respect to the average HV DC bus voltage 720 is denoted as $VDC_{HV}(k)\_ErrRate$ 710 which is calculated from equation (1). The $VDC_{HV}(k)\_ErrRate$ 710 is a measure of the deviation of the DC bus capacitor voltage at the HV side of each of the k DAB module with reference from the average voltage 720 from the HV DC bus. The average voltage 720 from the HV DC bus is the summation of the voltage from the HV DC bus link divided by the total number of DAB modules.

$$VDC_{HV}(k)\_ErrRate = \frac{VDC_{HV}(k) - VDC_{HV}(avg)}{VDC_{HV}(avg)}$$

Where k=1, ..., N−1

The current adjustment signals of the voltage balancing control of the "N−1" individual modules, which is denoted as $I\_DAB(k)\_Comp$ 730, is calculated from equation (2) as the multiplication of HV DC bus voltage error rate 710, a load dependent voltage balancing proportional compensation gain 740, and the magnitude of the nominal DAB module current magnitude 751. The voltage balancing proportional compensation gain 740, "Balance_gain", can be positive values which can be obtained from a look-up table with total DAB current magnitude as its input. The look-up table is provided below. At SST light load condition, larger voltage balancing proportional gain is applied when DAB current magnitude is smaller to improve the sensitivity of voltage balancing algorithm. At SST heavy load/power condition, the voltage balancing gain is reduced.

| Look-up table | |
|---|---|
| Input current total (Abs) | Balance_gain |
| 0 | 20 |
| 6 | 20 |
| 9 | 10 |
| 12 | 5 |
| 40 | 5 |

$$I\_DAB(k)\_Comp = VDC_{HV}(k)\_ErrRate * Balance\_Gain * |I\_DAB\_REF\_NORM| \quad (2)$$

Where, k=1, ..., N−1

The total current reference of each of the "N−1" DAB modules 731-733 is obtained by adding the saturated voltage balancing adjustment current component together with the nominal reference current 750 using equation (3). The voltage balancing adjustment current component is saturated by limiting the value with a maximum limit of 15 and/or minimum limit of −15 One skilled in the art will recognise that the maximum and minimum limit is based on the limitation of the components used and the exact value is left as a design choice to one skilled in the art.

$$I\_DAB(k)\_REF = Limit(I\_DAB(k)\_Comp) + I\_DAB\_REF\_NORM \quad (3)$$

Where, k=1, ..., N−1

The total current reference of the "$N^{th}$" DAB module 734 is obtained by subtracting the sum of the current reference of the "N−1" DAB modules 731-733 from the total DAB current reference 760 using equation (4), so that the total DAB current of all modules can be regulated by the DAB voltage controller.

$$I\_DAB(N)\_REF = I\_DAB\_REF\_TOTAL - \sum_{k=1}^{k=N-1} I\_DAB(k)\_REF \quad (4)$$

Based on equation (2), the sign of DAB voltage balancing adjustment current component corresponds to the sign of the HV DC bus voltage error. When HV DC bus voltage error 710 is positive, the DAB voltage balancing adjustment current component 730 is also positive.

In this condition, if the total current reference is positive 734, the DAB positive current reference magnitude 751 is increased for a relevant DAB module with higher HV DC bus voltage. The relevant DAB inner current loop regulation will transfer more power from HV DC bus to LV DC bus, as shown generally by arrow 125 in FIG. 1, by this DAB module. This makes the HV DC capacitor 122 that is connected to the relevant DAB module discharges faster than HV DC capacitor 122 of other DAB modules so that the capacitor voltage error of this relevant DAB module can be reduced. If the total current reference 734 is negative, the DAB negative current reference magnitude 751 is reduced for the relevant DAB module with higher HV DC bus voltage. This causes less power transferred from LV DC bus to HV DC bus, as shown generally by arrow 126 in FIG. 1, from this relevant DAB module. Therefore, the HV DC capacitor 122 that is connected to the relevant DAB module charges slower than the HV DC capacitor 122 of other DAB modules so as to reduce the capacitor voltage of this DAB module.

If HV DC bus voltage error is negative (i.e. DC bus voltage of this relevant DAB module is below average), the DAB voltage balancing current adjustment component is also negative.

In this condition, if the total current reference is positive 734, the DAB positive current reference magnitude 751 is reduced for the relevant DAB module with lower deviation of the capacitor voltage. This causes less power transferred from HV DC bus to LV DC bus, as shown by arrow 125 in FIG. 1, by this relevant DAB module. This makes the HV DC capacitor 122 that is connected to the relevant DAB module discharges slower than HV DC capacitor 122 of other DAB modules so that the capacitor voltage of this relevant DAB module can be increased. If the total current reference is negative 734, the DAB negative current reference magnitude 751 is increased for the relevant DAB module with lower HV DC bus voltage. This causes more power transferred from LV DC bus to HV DC bus, as shown generally by arrow 126 in FIG. 1, by this relevant DAB module. Therefore, the HV DC capacitor 122 that is connected to the relevant DAB module charges faster than the HV DC capacitor 122 of other DAB modules so as to increase the capacitor voltage of this DAB module.

Figure 8:
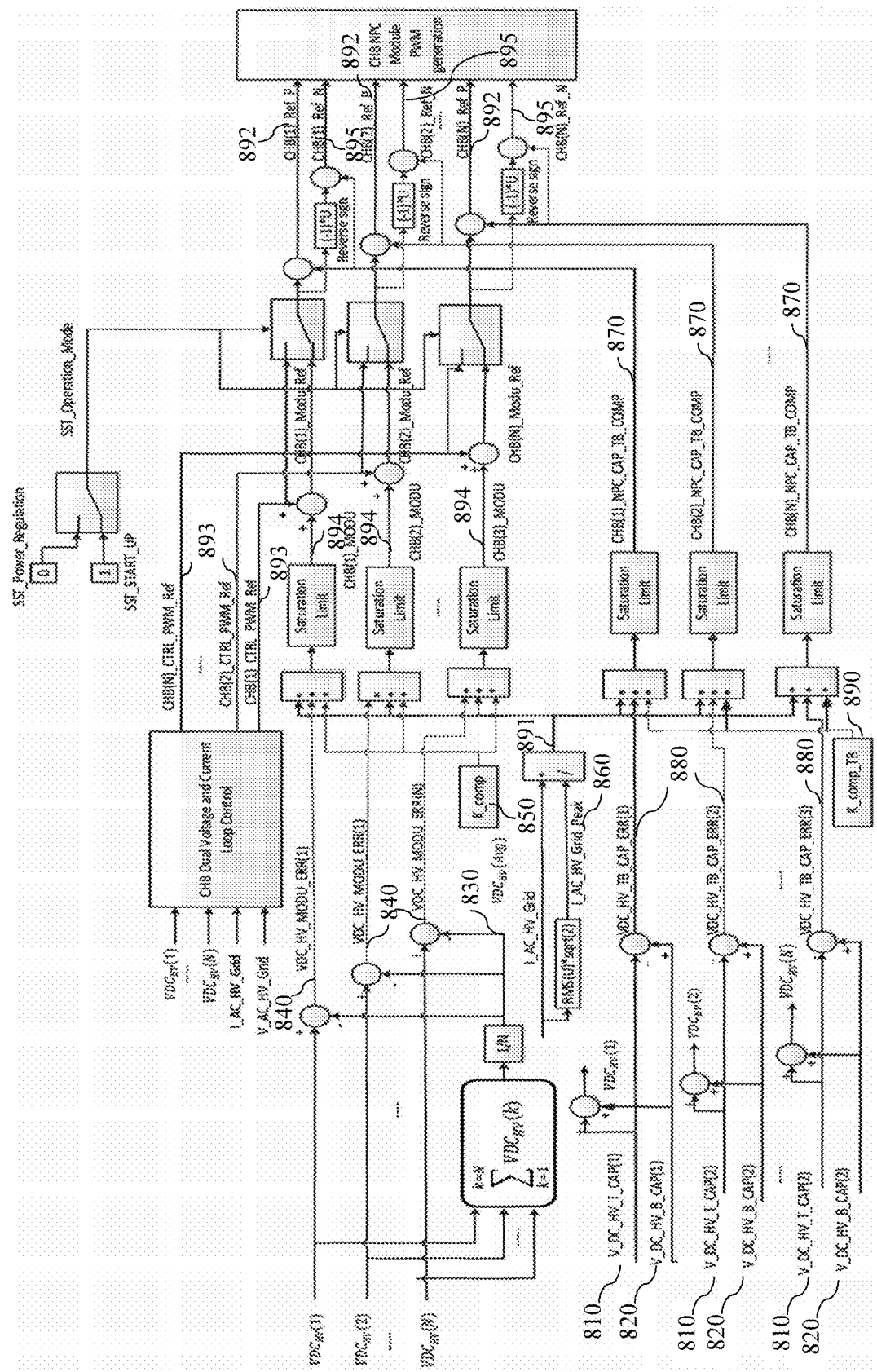
FIG. 8 illustrating the NPC CHB HV DC bus voltage balancing control applied in SST start-up.

FIG. 8 shows the modular CHB voltage balancing control scheme for 3-level NPC CHB circuit topology illustrated in FIG. 1 utilizing a known CHB voltage balancing concept. The inter CHB module NPC top and bottom capacitor voltage balancing is enabled in the entire SST operation process. The modular level voltage CHB balancing compensation is only enabled in the SST start-up process.

In SST start-up process when both CHB based NPC top/bottom HV DC bus capacitor voltage balancing and CHB modular voltage balancing are enabled. Equations (5) to (11) are utilized for voltage balancing control computation. The CHB module voltage is computed as sum of top capacitor voltage 810 and bottom capacitor voltage 820 using equation (5).

$$VDC_{HV}(k) = VDC\_HV\_T\_CAP(k) + VDC\_HV\_B\_CAP(k) \quad (5)$$

where k=1, . . . , N

The CHB HV DC bus voltage error is computed as module voltage subtracting the averaged module voltage 830 based on equation (6).

$$VDC\_HV\_MODU\_ERR(k) = VDC_{HV}(k) - VDC_{HV}(avg) \quad (6)$$

The CHB module level balancing compensation signal is computed from equation (7) as multiplication of the module voltage error 840 with a module level compensation gain (K_comp) 850 and magnitude normalized HV grid current signal 860.

$$CHB(k)\_MODU = VDC\_HV\_MODU\_ERR(k) \\ *K\_COMP*I\_HV\_GRID/I\_AC\_HV\_GRID\_PEAK \quad (7)$$

The NPC top/bottom capacitor voltage balancing error is computed from equation (8) by subtracting the bottom capacitor voltage and top capacitor voltage.

$$VDC\_HV\_TB\_ERR(k) = VDC\_HV\_B\_CAP(k) - VDC\_HV\_T\_CAP(k) \quad (8)$$

The NPC top/bottom capacitor balancing compensation signal 870 is computed using equation (9) by multiplication of the voltage error 880 with a balancing proportional compensation gain 890, and normalized grid current 891.

$$CHB(N)\_NPC\_CAP\_TB\_COMP(k) = VDC\_HV\_TB\_ERR(k)*K\_COMP\_TB*I\_HV\_GRID/I\_HV\_GRID\_PEAK \quad (9)$$

The NPC PWM modulation positive reference signal 892 is obtained from equation (10) by summing up the PWM modulation signal from CHB control 893 with the CHB module voltage balancing compensation signal 894 and the NPC top/bottom voltage balancing compensation signal 870.

$$CHB(k)\_Ref\_P = CHB(k)\_CTRL\_PWM\_Ref + CHB(k) + CHB(k)\_NPC\_CAP\_TB\_COMP(k) \quad (10)$$

The NPC PWM modulation negative reference signal 895 is obtained from equation (11) by summing up the sign reversed PWM modulation signal from CHB control with the sign reversed CHB module voltage balancing compensation signal 894 and the NPC top/bottom voltage balancing compensation signal 870.

$$CHB(k)\_Ref\_N = (-1)*(CHB(N)\_CTRL\_PWM\_Ref + CHB(k)\_MODU) + CHB(N)\_NPC\_CAP\_TB\_COMP(k) \quad (11)$$

In SST normal power regulation, the CHB module voltage balancing is disabled. This means that the CHB module voltage balancing compensation signal 894 would not be available. Hence, the NPC positive and negative PWM modulation reference signals are computed from equation (12) and (13) respectively.

$$CHB(k)\_Ref\_P = CHB(k)\_CTRL\_PWM\_Ref + CHB(k)\_NPC\_CAP\_TB\_COMP(k) \quad (12)$$

$$CHB(k)\_Ref\_N = (-1)*CHB(N)\_CTRL\_PWM\_Ref + CHB(N)\_NPC\_CAP\_TB\_COMP(k) \quad (13)$$

Figure 2:
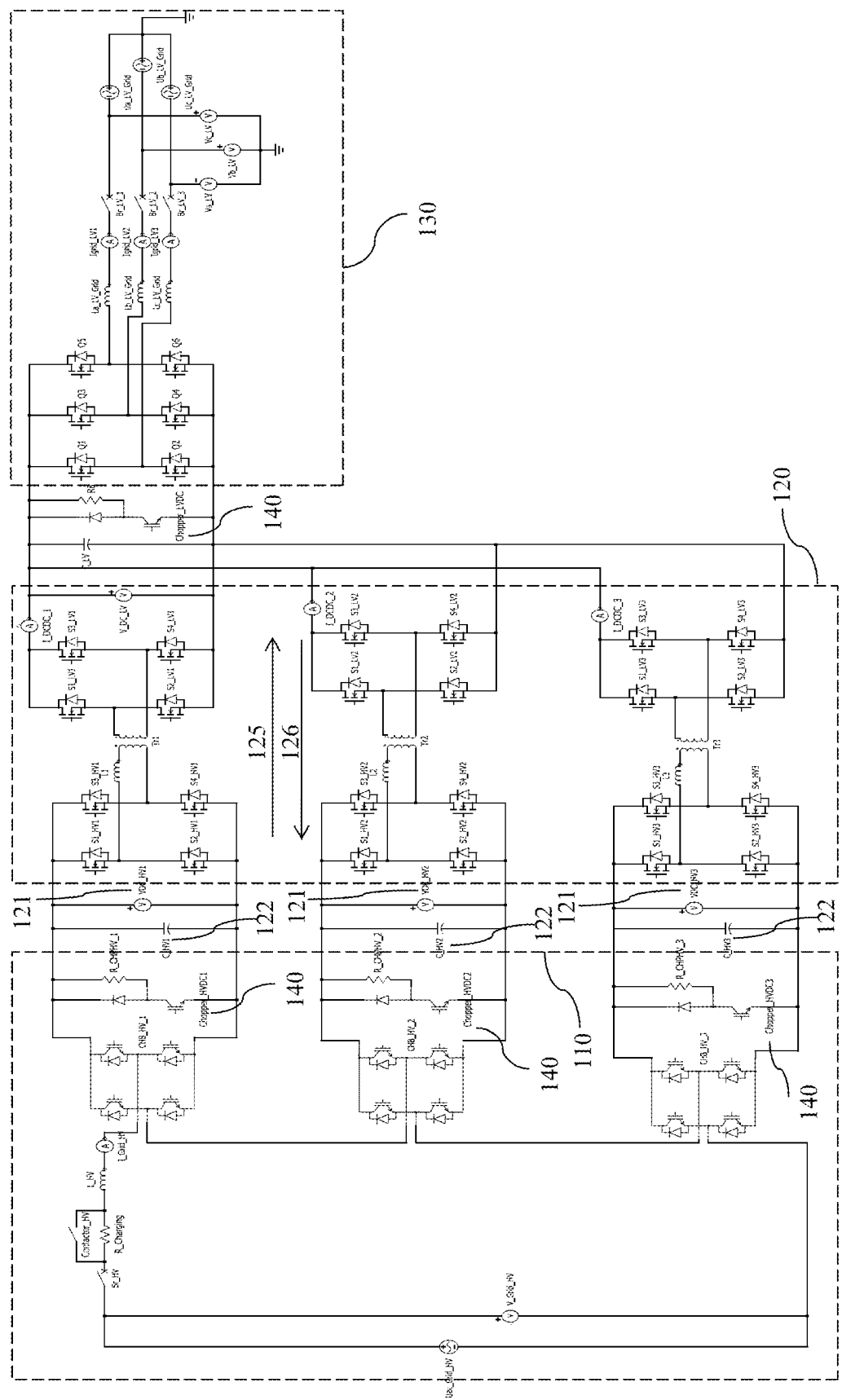
FIG. 2 illustrating the SST circuit topology with 2-level full bridge CHB and DAB.
Figure 3A:
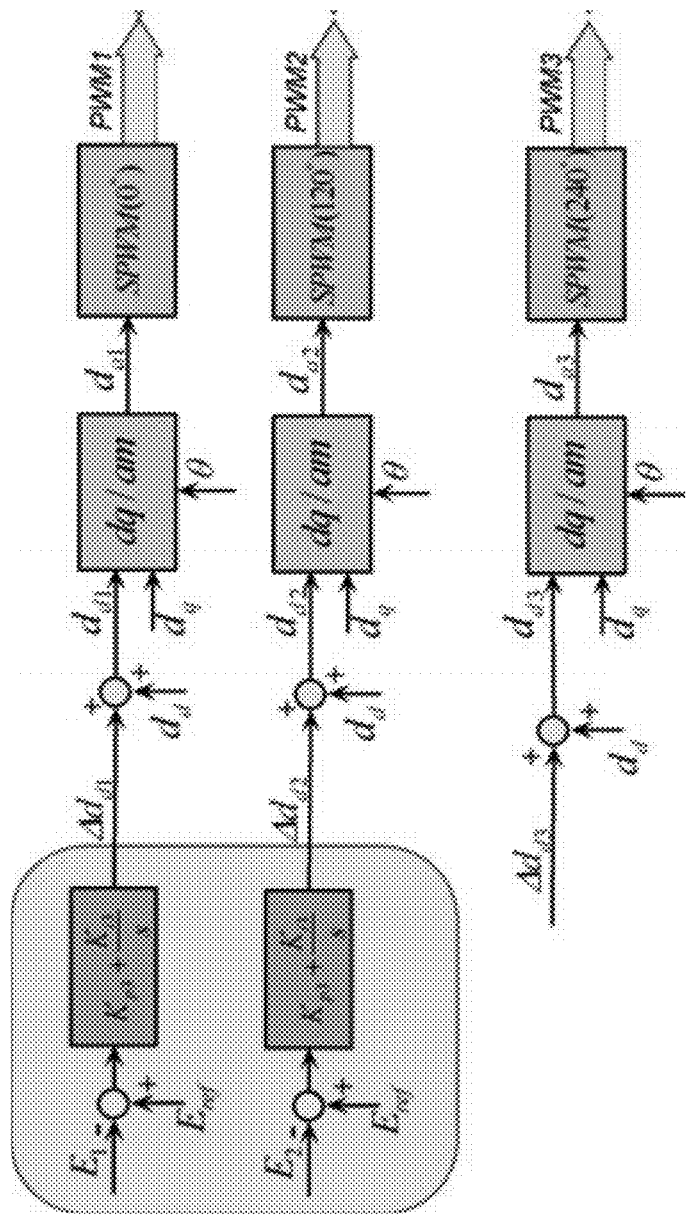
FIG. 3a illustrating the CHB voltage balancing control of SST with CHB voltage balancing control and DAB power balancing control.
Figure 3B:
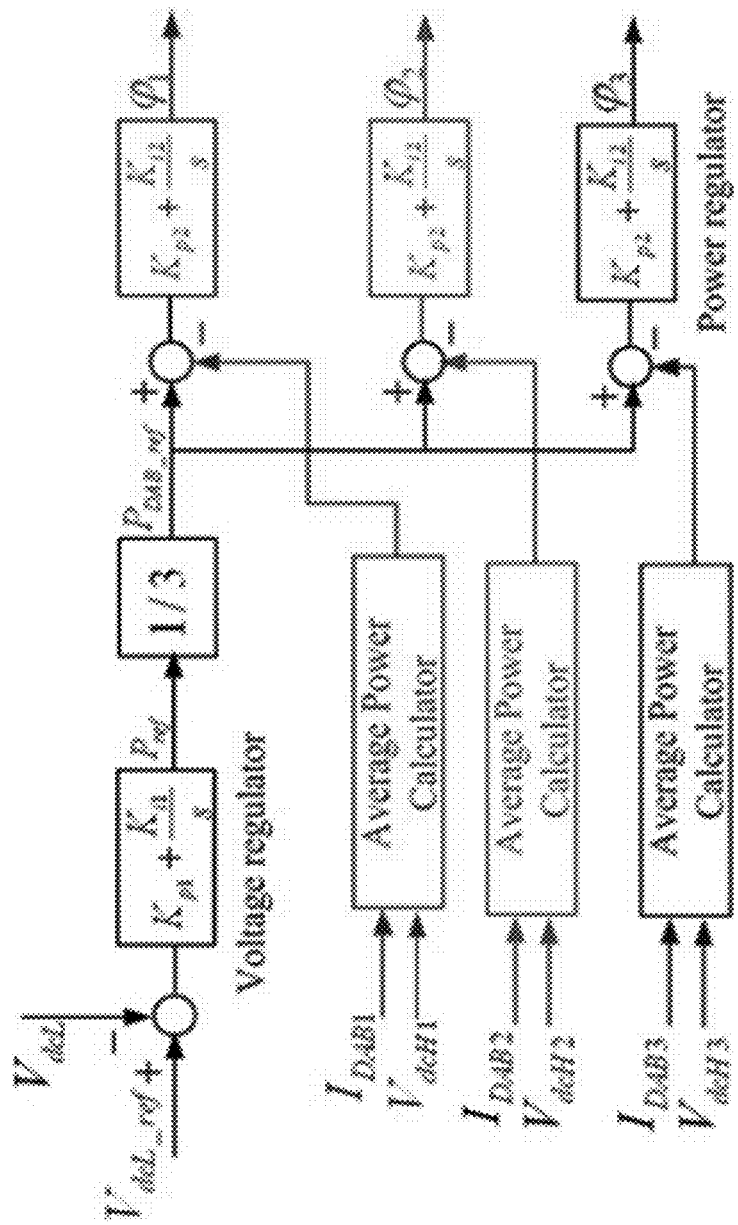
FIG. 3b illustrating the DAB power balancing control of SST with CHB voltage balancing control and DAB power balancing control.
Figure 4:
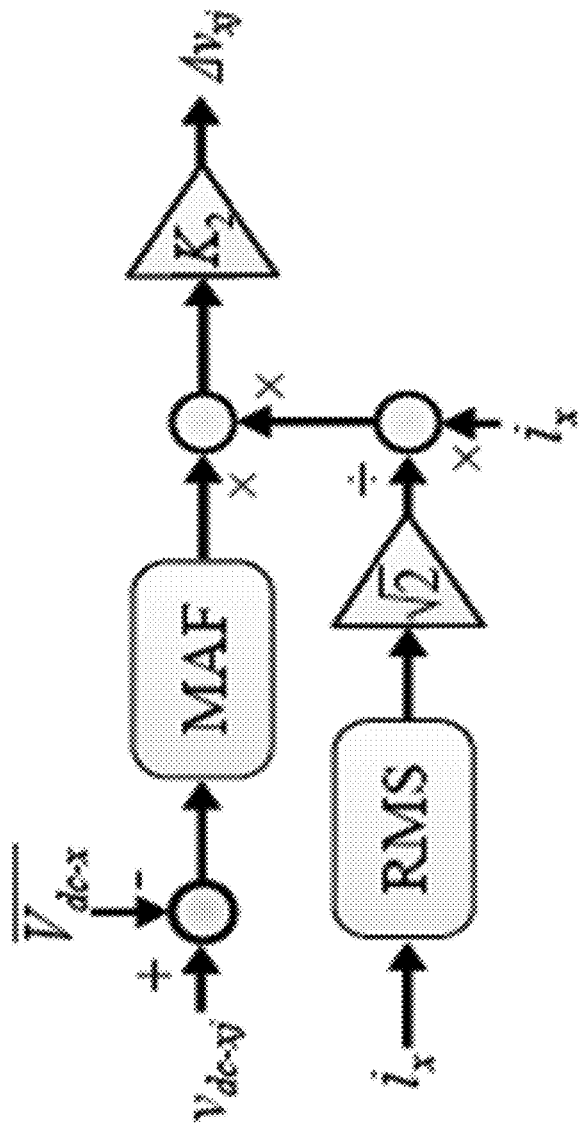
FIG. 4 illustrating the Enhanced H-bridge voltage balancing control.
Figure 5:
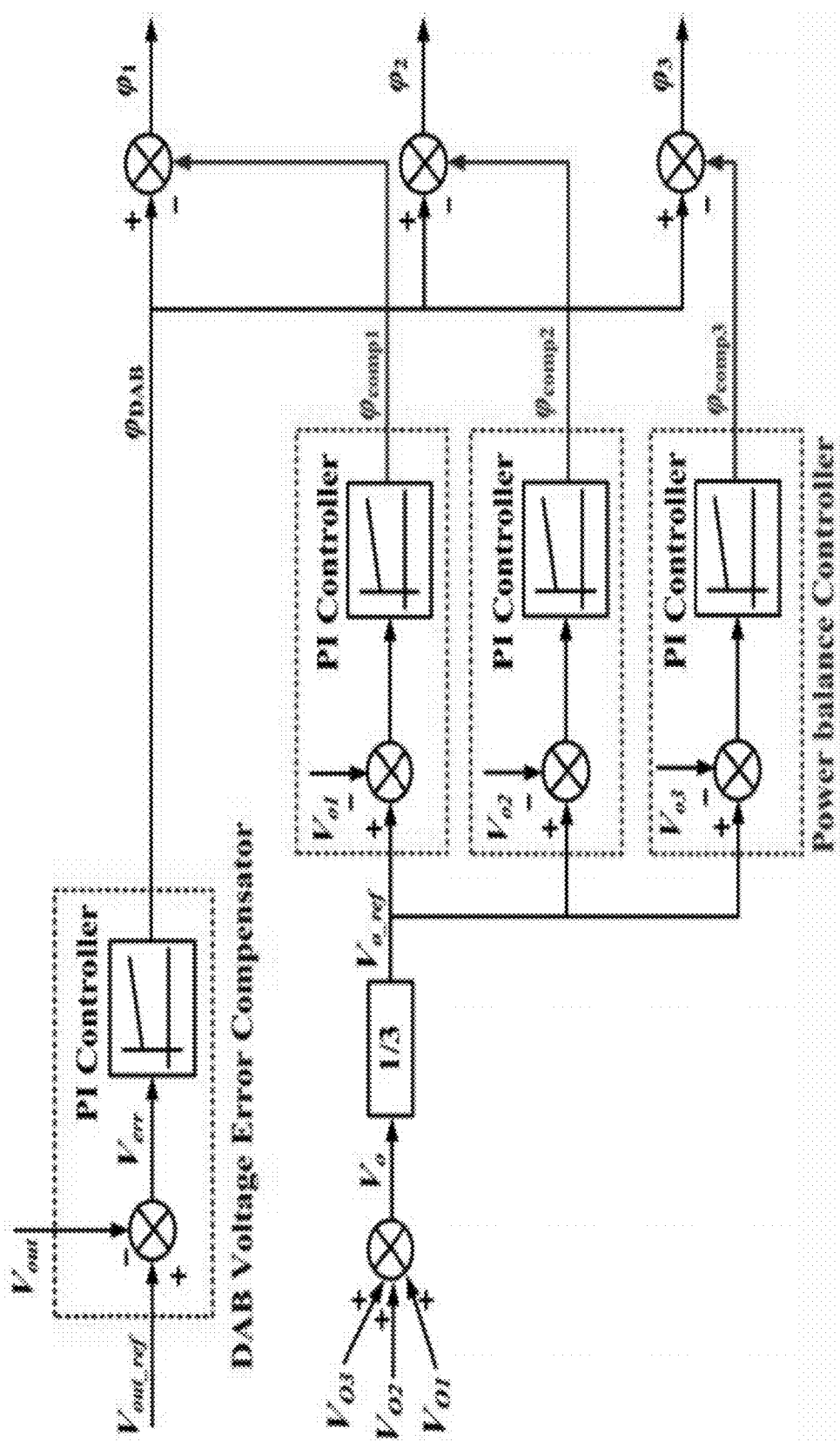
FIG. 5 illustrating the SST with single voltage loop DAB voltage balancing control.
Figure 9:
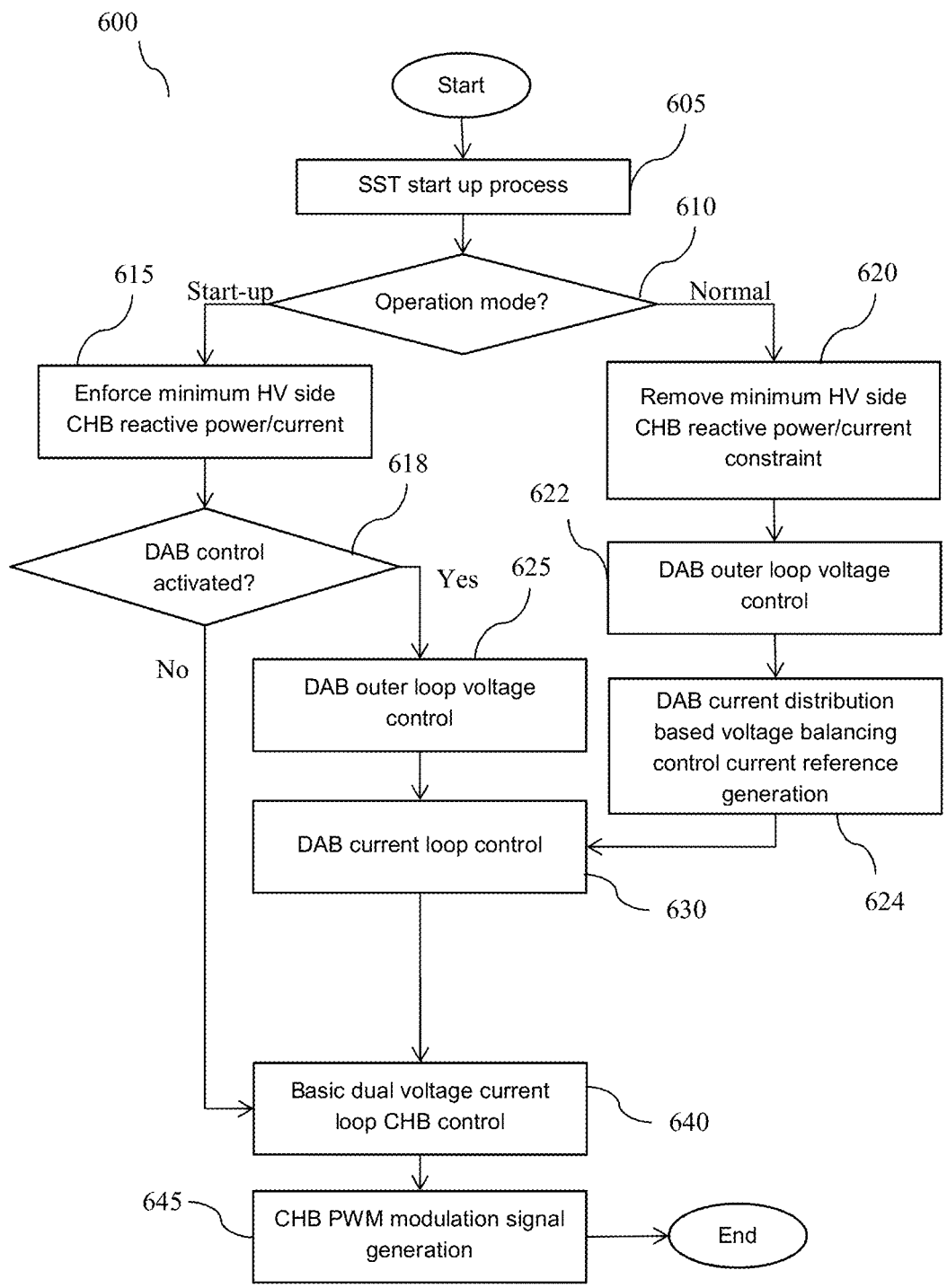
FIG. 9 illustrating the SST HV DC bus voltage balancing strategy for 2-level full bridge CHB SST.
Figure 10:
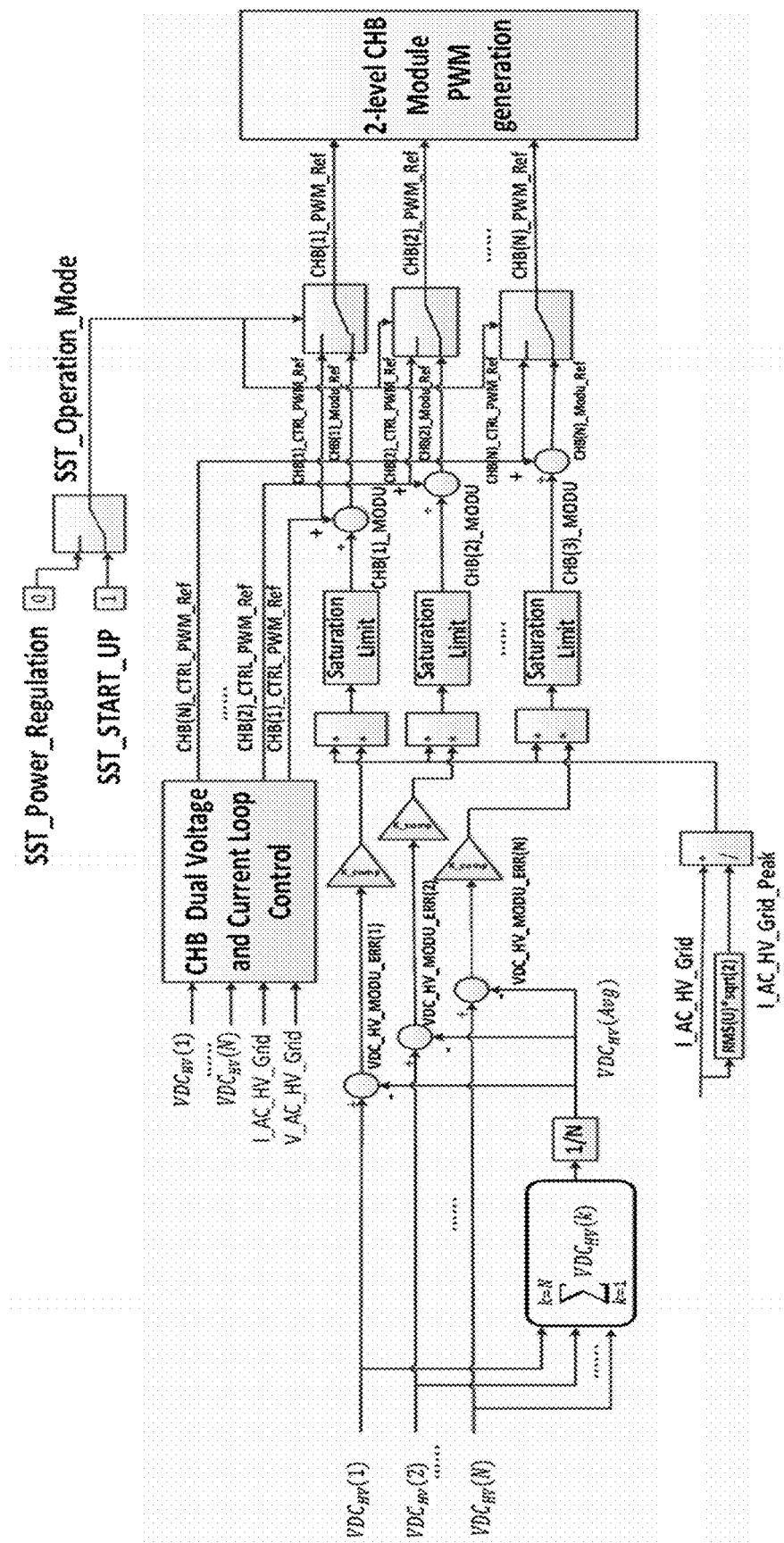
FIG. 10 illustrating the 2-level full bridge CHB HV DC bus voltage balancing control for SST start-up.

FIG. 9 shows a flow diagram of a process that is similar to process 600 performed by the SST HV side DC bus voltage balancing control method in accordance with the first embodiment which is applicable for the SST modular 2-level full bridge CHB circuit configuration shown in FIG. 2. The HV DC bus voltage balancing is simpler for 2-level full bridge SST circuit configuration with only module level voltage balancing required. In brief, step 635 for NPC top/bottom capacitor voltage balancing control is removed. When applied for SST circuit configuration of 2-level full bridge CHB circuit topology configuration shown in FIG. 2, the same DAB current distribution based HV DC bus voltage balancing control scheme shown in FIG. 7 is applied in normal SST power regulation. In SST start-up process, the CHB HV DC bus voltage balancing control is simplified as shown in FIG. 10 by removal the NPC top/bottom capacitor voltage balancing control.

The method according to the first embodiment relates to controlling a Solid State Transformer (SST). The method comprises: dividing a dual active bridge (DAB) power reference on a Low Voltage (LV) side Direct Current (DC) link voltage to obtain a total DAB reference current 760; dividing the total DAB current reference 760 by N number of DAB modules to obtain a reference current for each DAB module 750; in response to SST being in a normal power regulation, determining a deviation of a capacitor voltage 710 at the HV side of each of a k DAB modules with reference from an average voltage 720 from the HV DC bus; determining a current adjustment signal 730 each of the k DAB modules based on the total DAB reference current 760 and a corresponding deviation of the capacitor voltage 710 of each of the k DAB modules; adding the current adjustment signal 730 together with the reference current for each DAB module 750 to obtain a total current reference for each of the k DAB modules 731-733; and subtracting a sum of the total current reference of each of the k DAB modules with the total DAB reference current to determine a total current reference of an $N^{th}$ DAB module 734, wherein k=1, . . . , N−1. Further, the current adjustment signal is saturated before adding together with the reference current for each DAB module to obtain the total current reference for each of the k DAB modules.

More specifically, the step of determining a current adjustment signal 730 for each of the k DAB modules based on the total DAB reference current 760 and a corresponding deviation of the capacitor voltage 710 of each of the k DAB modules comprises: multiplying the deviation of the capacitor voltage 710 at the HV side of each DAB module, a load dependent voltage balancing proportional compensation gain 740, and a magnitude of the reference current for each of the k DAB modules 751. The voltage balancing proportional compensation gain can be positive values which can be obtained from a look-up table.

If the total current reference of the $N^{th}$ DAB module is positive, the method increases the magnitude of the reference current for a DAB module with higher deviation of the capacitor voltage and reduces the magnitude of the reference current for a DAB module with lower deviation of the capacitor voltage.

If the total current reference of the $N^{th}$ DAB module is negative, the method reduces the magnitude of the reference current for a DAB module with higher deviation of the capacitor voltage and increases the magnitude of the reference current for a DAB module with lower deviation of the capacitor voltage.

The method of controlling the SST further comprises: in response to SST being in a normal power regulation, enforcing minimum HV side reactive power and applying the reference current of each DAB module as the total current reference for each DAB module.

Second Embodiment

The method and system according to the second embodiment is that the DAB converter system voltage loop and current control loop are both linearized with non-linear gain compensation so that the conventional linear controller design method can be readily applied in voltage and current controller design to ensure uniformed dynamic performance achieved in all operation conditions.

The linearized DAB feedback control enables uniformed inner current control loop performance for all DAB modules in SST system with respect to the high frequency transformer parameter variation, the DAB circuit external inductance variation, and HV side DC voltage variation. It also ensures inner current loop has desired stability margins when operates at different inner phase shift angle settings and different HV/LV side DC bus voltage levels. The linearized DAB feedback control achieves uniformed inner current control loop dynamic performance in various operation conditions.

The outer DAB voltage control loop is linearized to achieve uniformed dynamic performance at various operation conditions.

The linearized DAB feedback control supports bi-direction power flow regulation of the SST converter with DAB current sensor mounted only on the LV side of DAB AC-DC converter output. This simplifies the current control strategy and reduces the controller complexity and sensor cost, that requires the current sensor signal to be changed between HV side of DAB AC-DC converter and LV side of DAB AC-DC converter when power flow direction changed. The linearized DAB feedback control can be applied for both 2-level modular DAB circuit configuration shown in FIG. 2 and the HV side 3-level NPC modular DAB configuration shown in FIG. 1. The DAB control solution proposed can be readily generalized to be applied for other NPC 3-level DAB circuit configurations or higher order DAB circuit configuration.

Figure 11:
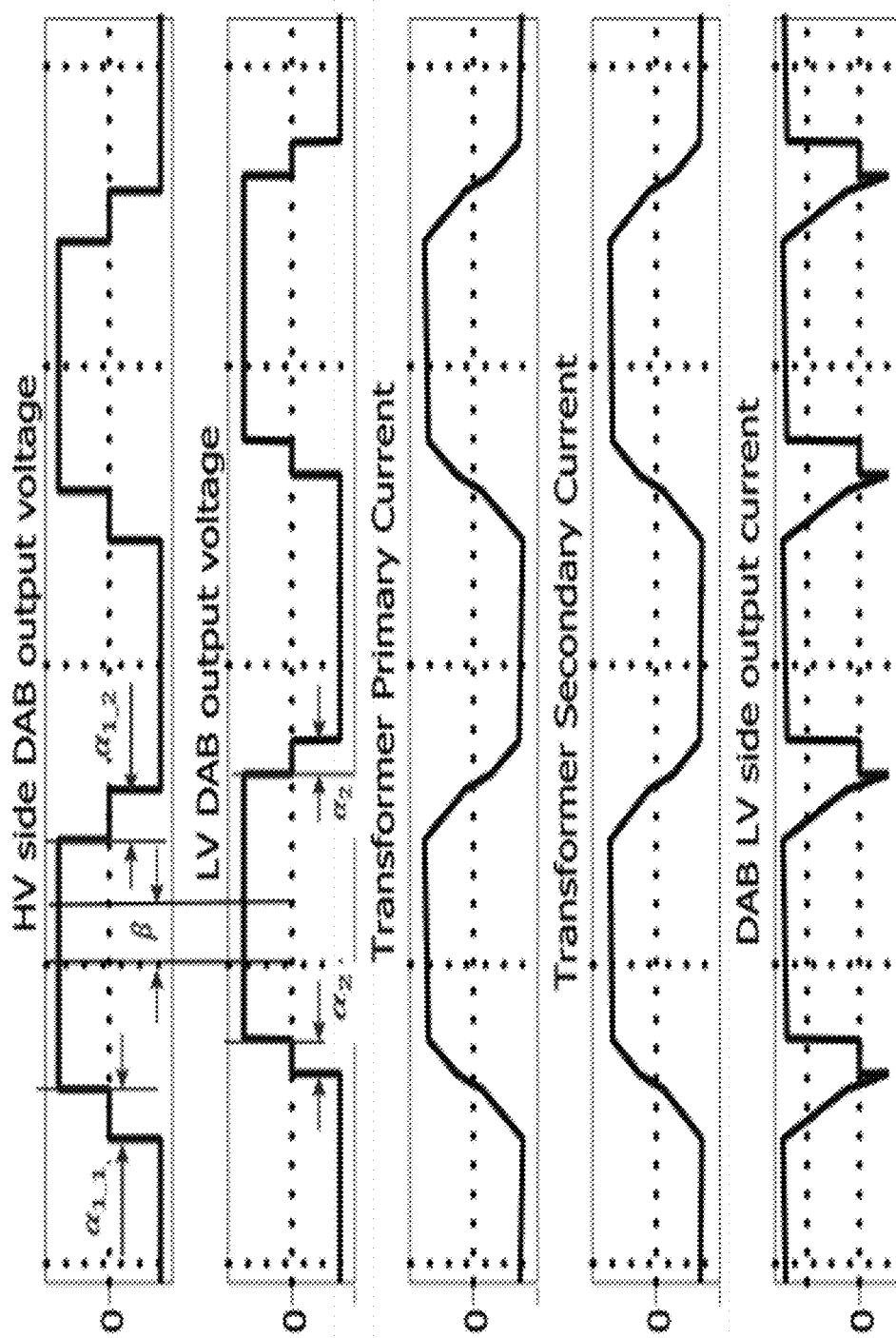
FIG. 11 illustrating the DAB output voltage/current with multiple phase shift angles.

FIG. 11 illustrates the DAB converter voltage, the transformer primary current, the transformer secondary current, and the LV side DAB output current with adjustable phase shift angles $\alpha_{1\_1}$, $\alpha_{1\_2}$, $\alpha_2$, and $\beta$ of the DC-DC converter. The angle $\beta$ is the phase angle difference between HV DAB converter and LV DAB converter bridges, which regulates the direction and amplitude of the power flow between HV DC bus and LV DC bus of the DAB converter module.

For 2-level full bridge DAB topology shown in FIG. 2, the symmetrical zero voltage phase shift angle $\alpha_1=\alpha_{1\_1}=\alpha_{1\_2}$ is applied for HV side DAB converter. For NPC 3-level HV side DAB circuit topology shown in FIG. 1, the difference of phase angle $\alpha_{1\_1}$ and $\alpha_{1\_2}$ can be utilized for NPC capacitor voltage balancing control. The drawback of this solution is that the transformer winding current can become asymmetrical which causes DC current saturation issue for high frequency transformer operation.

Figure 12:
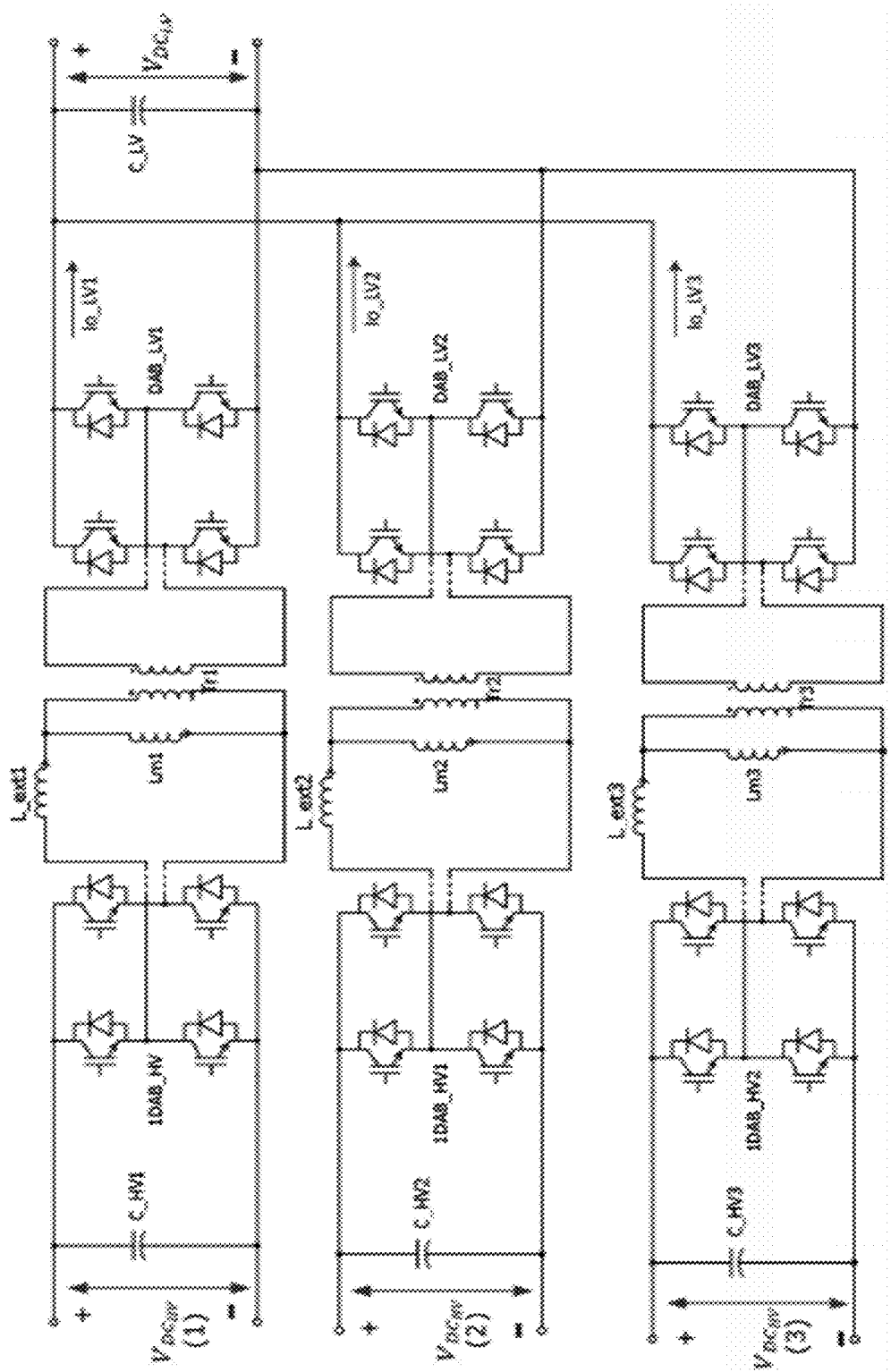
FIG. 12 illustrating the Modular 2-level full bridge DAB for SST application.

FIG. 12 shows the modular 2-level full bridge DAB circuit configuration for SST application. The HV side DC bus of DAB modules are isolated. The LV side DAB DC outputs of all individual DAB modules are connected to a common DC bus. The modular DAB topology is preferred in SST application because it is easier to share the load/power evenly among DAB modules.

Figure 13:
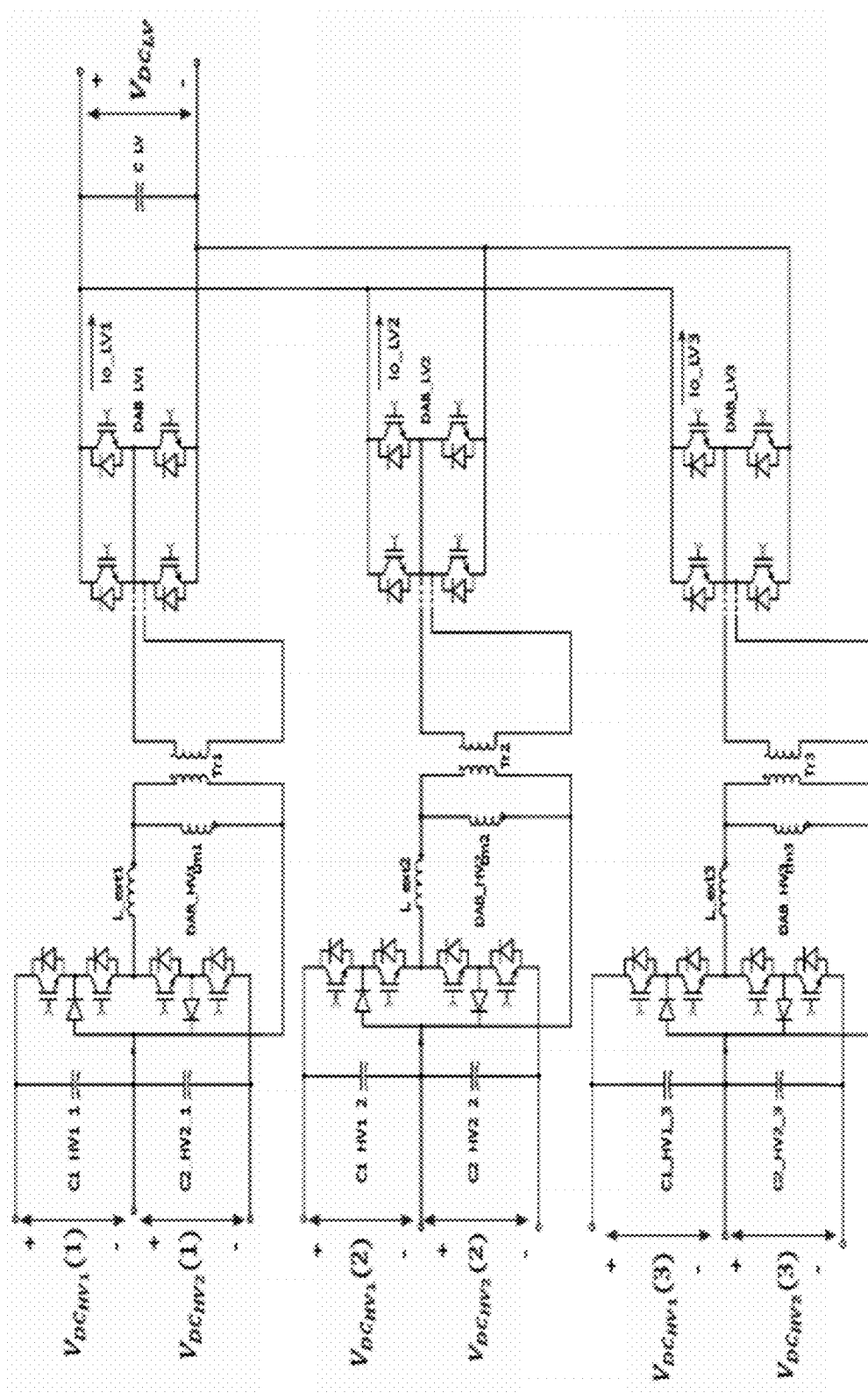
FIG. 13 illustrating the Modular HV side NPC 3-level half bridge DAB for SST application.

FIG. 13 shows the modular HV side 3-level half bridge DAB circuit configuration for SST application. Similar to the 2-level full bridge modular DAB configuration, the HV side DC buses of 3-level NPC modular DAB modules are isolated. The LV side DAB output is connected to a common DC bus. This modular HV side 3-level NPC half bridge DAB circuit configuration is very attractive for SST application because of its reduced number of HF transformer and power switches for the same level of total HV DC bus voltage. The control challenge of this HV side NPC 3-level modular DAB circuit topology is that the HV side NPC capacitor voltage balancing issue needs to be addressed properly in the active frontend cascaded H-bridge NPC 3-level AC-DC converter.

One important DAB control performance requirement is fast dynamic response to load/power changes. The DAB single voltage loop control algorithm has been well-developed. However, one often cited disadvantage of the single voltage loop DAB control is its slow dynamic response. The dual-loop DAB controller with the voltage outer loop and the averaged output current inner loop is a preferred control strategy for SST converter system because of its advantages in robustness to DAB circuit parameter variation and fast dynamic response.

Presently, there is no known method on how to linearize the inner averaged current loop for dual-loop controller when multiple phase shift angles are applied. It is difficult to stabilize the DAB inner averaged current loop for each individual DAB modules with a conventional PI controller by try-and-error tuning method in practical SST converter application which operates at wide load/power and voltage variation range.

The linearized DAB feedback control can be applied for SST application of both 2-level full bridge modular DAB circuit configuration shown in FIG. 12 and HV side NPC 3-level half bridge modular DAB circuit configuration shown in FIG. 13.

Returning back to FIG. 1, the schematic illustrates one preferred implementation of the modular SST circuit topology for LV side grid tied application. The HV side three modules of 3-level NPC cascaded H-bridge converter 110 of SST system are connected to single phase HV AC voltage sources. The LV side three phase inverter 130 is connected to the LV AC grid with voltage. The LV side 2-level DAB AC-DC converter 131 is connected to the common LV DC bus 140 of the SST system. This circuit configuration supports bi-directional power flow between HV and LV AC grid sources. The HV side NPC leg of DAB DC-AC converter is connected to the HV side DC bus 150 of 3-level NPC cascaded H-bridge converter.

In SST system, the control objective of HV side cascaded H-bridge converter 110 is to regulate the HV DC bus voltage around its target value. The HV side cascaded H-bridge converter is controlled with outer total voltage loop and reactive power control loop which generates DQ current reference respectively. Inner current control can be implemented in the fictive DQ frame using the fictive-axis beta current component estimation method. Second Order Generalized Integrator (SOGI) Phase Locked Loop (PLL) is applied to generate the phase angle for the HV side single phase grid voltage for DQ convention. The NPC capacitor voltage balancing is implemented in the HV side NPC 3-level cascaded H-bridge control for simplicity.

The control objective of LV side DC-AC inverter 130 is to regulate the active and reactive power flow of SST system. The LV side three phase inverter is controlled with outer active and reactive power control loop to generate the DQ current reference respectively. The inner current control is implemented in DQ frame as conventional three phase inverter system. The conventional PLL based on LV side three phase grid voltage is applied for LV side three phase inverter DQ conversion.

The control objective of modular DAB DC-DC converter is to regulate the LV DC bus voltage around its target value with fast dynamic response. The DAB control method proposed in this embodiment is applicable for the modular SST DAB DC-DC converter control.

According to one embodiment of the second embodiment, there is provided a method of controlling a DAB converter in the following manner. The method comprises performing linearization of a current by: i) passing a low voltage output current through a low pass filter and using the filtered output current as a feedback signal; and ii) obtaining a difference between an input current and the feedback signal and passing a signal representing the difference through a proportional-integral (PI) controller and a non-linear compensation block. The method then performs linearization of a voltage by using a square of a low voltage output voltage as a feedback signal to the reference voltage.

Figure 14:
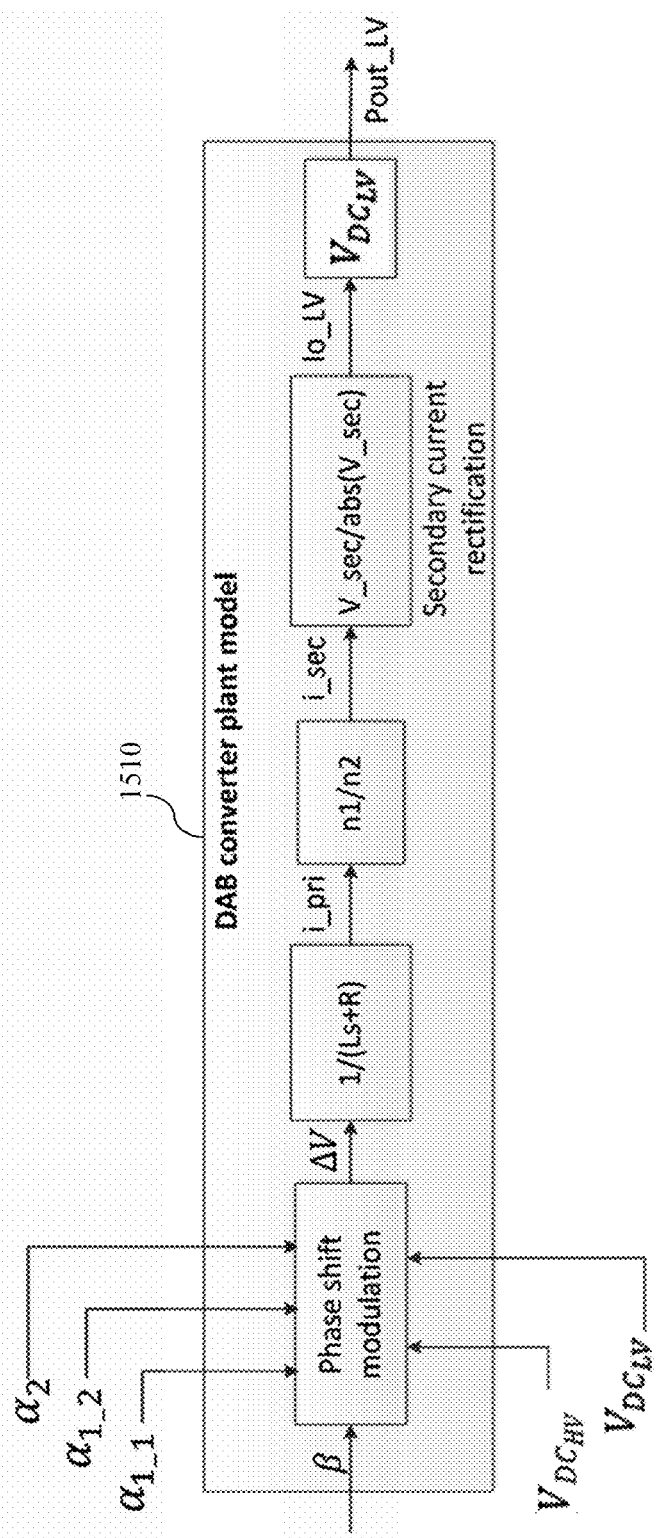
FIG. 14 illustrating the DAB Converter Model with Multiple Phase Shift from Working Principal.

FIG. 14 shows the DAB converter model 1510 for multiple phase shift modulation control derived from the physical working principal. The DC-DC converter generates the voltage difference of primary side and secondary side converter, which is applied in the external inductor and resistor circuit connected to the primary side of the HF transformer. The primary current of HF transformer is generated in the inductance and resistance network (L*s+R), where L=L_ext+L_leakage is the sum of external inductance (L_ext) and primary leakage inductance (L_leakage) of the HF transformer, R=R_inductor+R_TRO is the sum of external inductor resistance (R_inductor) and the equivalent transformer winding resistance of HF transformer (R_TRO). Assuming the transformer magnetization current and core loss resistance are both small enough, the transformer secondary side current is decided by the turn's ratio of the transformer and the transformer primary side current. The secondary side current is rectified to get the LV side DAB output current.

Based on the DAB converter circuit model shown in FIG. 14, the transfer function from phase shift angle to the total power output of the DAB converter can be presented by equation (14), where $\Delta V$ is the voltage applied on the inductor and resistor network of primary winding of the transformer which is the non-linear function of multiple phase shift angles $\alpha_1 = \alpha_{1\_1} = \alpha_{1\_2}$, $\beta$ of DAB converter and the HV side DC bus voltage $V_{DC_{HV}}$ and LV side DC bus voltage $V_{DC_{HV}}$, n1 and n2 are number of turns of transformer primary winding and secondary winding, and V_sec is transformer secondary winding voltage.

$$\frac{P_{out_{LV}}(\beta)}{\beta} = \Delta V(V_{DC_{HV}}, V_{DC_{LV}}, \alpha_{1\_1}, \alpha_{1\_2}, \alpha_2, \beta) * \frac{1}{Ls+R} * \frac{n1}{n2} * \frac{V\_sec}{|V\_sec|} * V_{DC_{LV}} \quad (14)$$

We consolidate the non-linear gain item of equation (14) together and represent it as equation (15).

$$\frac{P_{out_{LV}}(\beta)}{\beta} = P_{out_{LV}}(mag) * \frac{R/L}{s+R/L} \quad (15)$$

Based on the fundamental frequency component analysis of voltage and current waveform DAB converter circuit, DAB output power magnitude is represented by equation (16) as the functions of phase shift angles and HV side and LV side DC link voltages, where $\omega_0 = 2*\pi*f_0$ with $f_0$ as the fundamental operation frequency of the high frequency transformer.

$$P_{out_{LV}}(mag) \approx \quad (16)$$

-continued $$\frac{8*\left(\frac{n1}{n2}\right)}{\pi^2*\omega_0*L}*V_{DC_{HV}}*V_{DC_{LV}}*\cos\left(\frac{\alpha_1}{2}\right)*\cos\left(\frac{\alpha_1}{2}\right)*\sin(\beta)$$

Replacing the magnitude of output power with the value of equation (16) into equation (15), the DAB converter transfer function with phase shift angle β as its input and the averaged power $P_{out_{LV}}$ as its output is derived as equation (17), where $$\frac{\alpha_{1\_1}+\alpha_{1\_2}}{4}=\frac{\alpha_1}{2}$$

is the equivalent internal phase shift angle of HV side of the DAB converter.

$$\frac{P_{out_{LV}}}{\beta}=\frac{8*\left(\frac{n1}{n2}\right)}{\pi^2*\omega_0*L}*V_{DC_{HV}}*V_{DC_{LV}}* \tag{17}$$

$$\cos\left(\frac{\alpha_{1\_1}+\alpha_{1\_2}}{4}\right)*\cos\left(\frac{\alpha_2}{2}\right)*\sin(\beta)*\frac{R/L}{s+R/L}$$

The dynamic model of the averaged output current of DAB converter is thus derived as equation (18) by removing the LV side DC link voltage item.

$$\frac{I_{o\_LV}}{\beta}= \tag{18}$$

$$\frac{8*\left(\frac{n1}{n2}\right)}{\pi^2*\omega_0*L}*V_{DC_{HV}}*\cos\left(\frac{\alpha_{1\_1}+\alpha_{1\_2}}{4}\right)*\cos\left(\frac{\alpha_2}{2}\right)*\sin(\beta)*\frac{R/L}{s+R/L}$$

Figure 15:
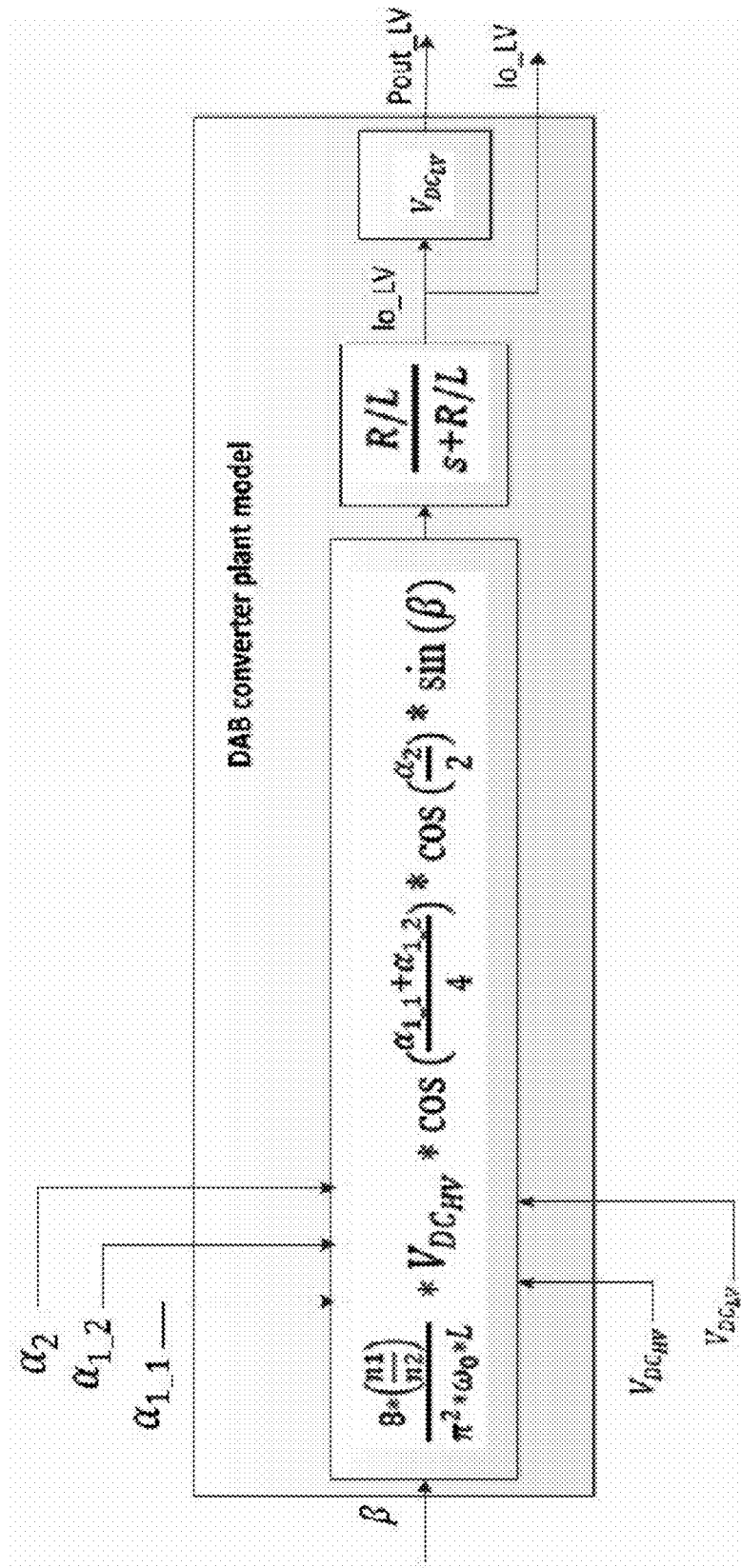
FIG. 15 illustrating the Non-linear DAB Dynamic Model with Multiple Phase Shift Angles.

FIG. 15 shows the non-linear DAB plant model presented in equation (17) and equation (18) with phase shift angle β as its input and LV side averaged current and LV side averaged power as its output respectively.

Figure 16:
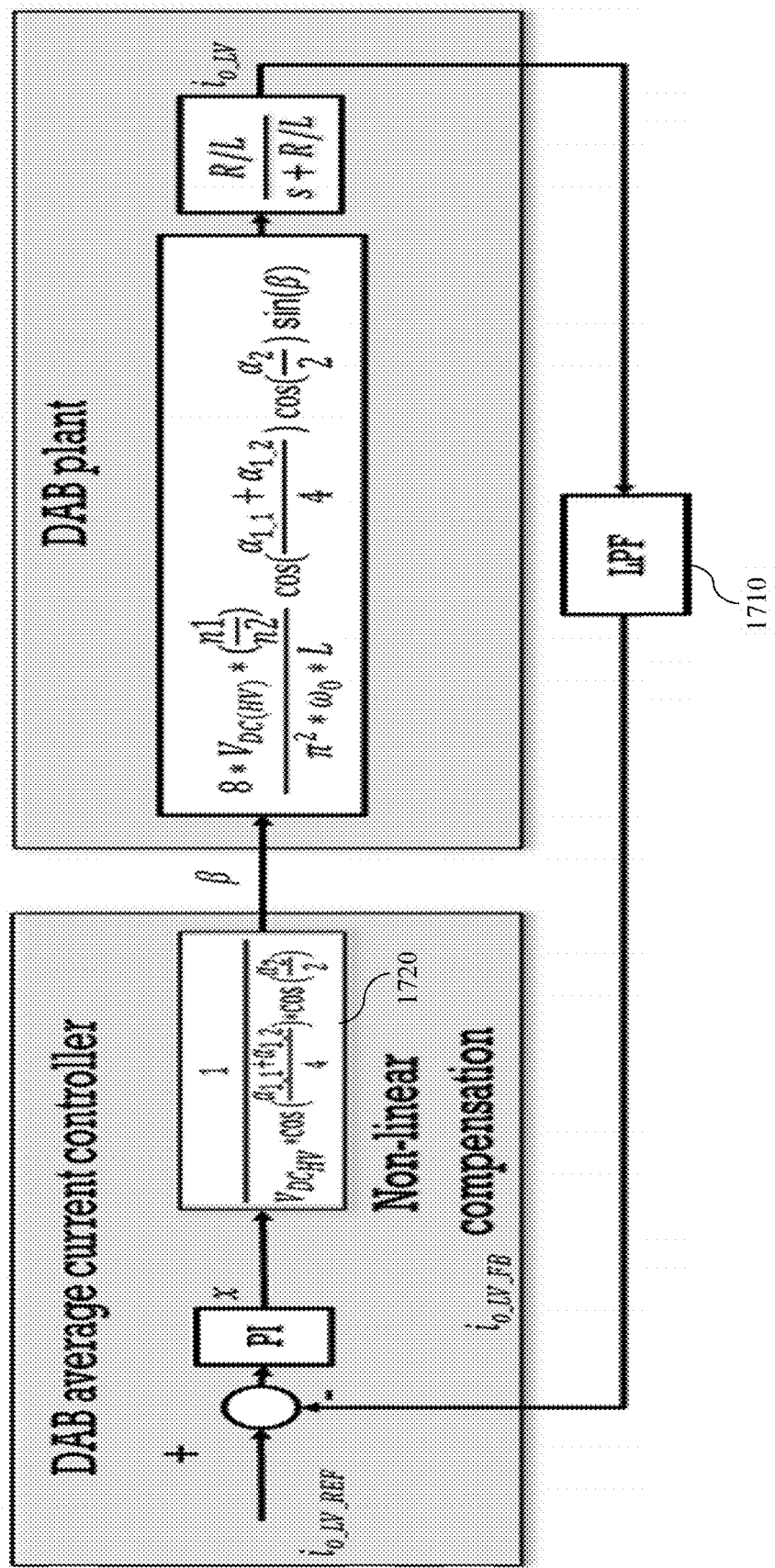
FIG. 16 illustrating the Linearized DAB Current Control Scheme.

The proposed linearized DAB averaged current control scheme is shown in FIG. 16. The LV side output current is filtered through a low pass filter 1710 and used as the feedback signal for DAB inner current control loop. In additional to the traditional PI (proportional-integral) current controller, a non-linear compensation block 1720 is added to reverse the non-linear DAB current loop gain variation due to change of multiple phase shift angles.

The non-linear compensation function shown in non-linear compensation block 1720 in FIG. 16 is given in equation (19).

$$\frac{\beta}{x}=\frac{1}{V_{DC_{HV}}*\cos\left(\frac{\alpha_{1\_1}+\alpha_{1\_2}}{4}\right)*\cos\left(\frac{\alpha_2}{2}\right)} \tag{19}$$

where $V_{DC_{HV}}$ refers to capacitor voltage at the HV side of each DAB module, $\alpha_{1\_1}$, $\alpha_{1\_2}$, $\alpha_2$ are phase shift angles from the DAB plant, β refers to the input of the DAB plant and x refers to the output of the PI.

Figure 17:
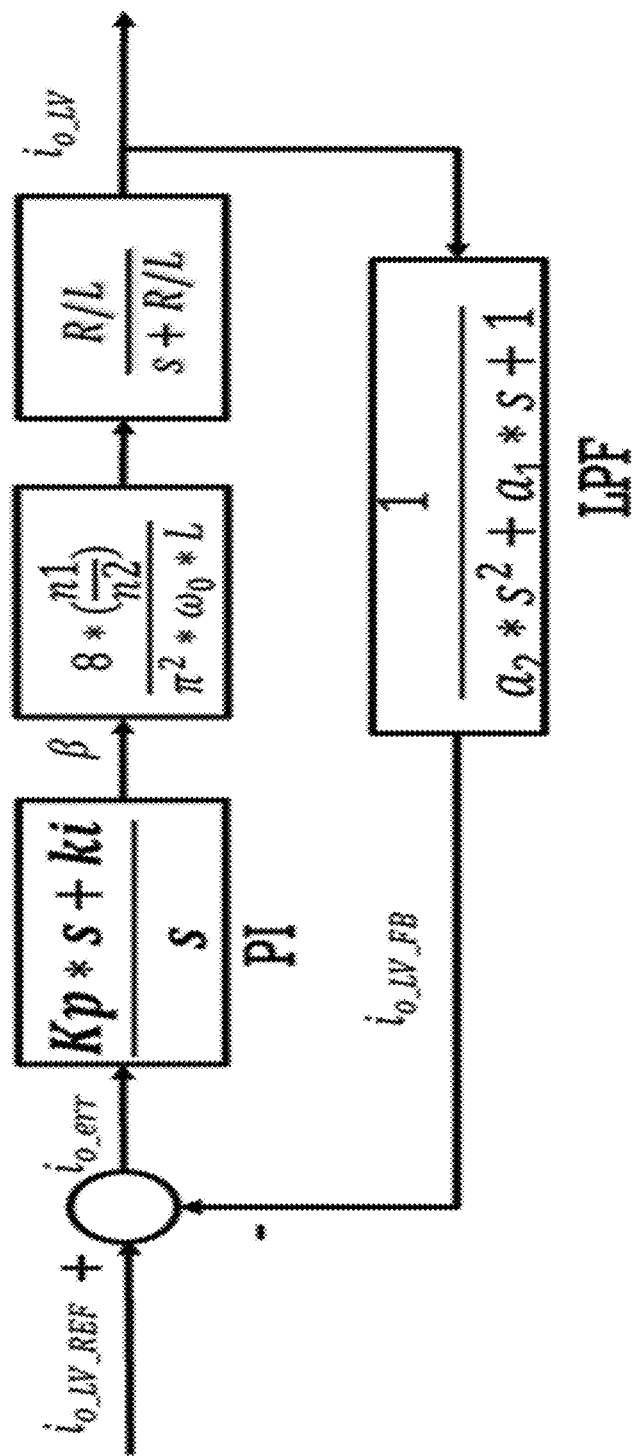
FIG. 17 illustrating the Linearized DAB averaged current control loop with $2^{nd}$ order low pass filter.

For small signal analysis with approximation of $\sin(\beta) \cong \beta$, the DAB current control loop can be simplified as linear control system as shown in FIG. 17, where $1/(a_2s^2+a_1s+1)$ is illustrated with a 2nd order low pass filter which replaces the general low pass filter shown in FIG. 16 as a simplified implementation. Essentially, the non-linear compensation block 1720 effectively linearizes the non-linear DAB plant model.

The open loop transfer function of DAB current control system shown in FIG. 17 is represented as equation (20).

$$\frac{i_{o\_LV\_FB}}{i_{o\_err}}=\left(\frac{Kp*s+ki}{s}\right)*\frac{8*\left(\frac{n1}{n2}\right)}{\pi^2*\omega_0*L}*\frac{\frac{R}{L}}{s+\frac{R}{L}}*\left(\frac{1}{a_2s^2+a_1s+1}\right) \tag{20}$$

For the DAB control implementation shown in FIG. 17, the closed loop transfer function of DAB inner current loop is given in equation (21).

$$\frac{i_{o\_LV}}{i_{o\_LV\_REF}}=\frac{(Kp*s+ki)*\dfrac{8*\left(\frac{n1}{n2}\right)}{\pi^2*\omega_0*L}*(R/L)}{s*(s+R/L)*(a_2s^2+a_1s+1)+} \tag{21}$$

$$(Kp*s+ki)*\frac{8*\left(\frac{n1}{n2}\right)}{\pi^2*\omega_0*L}*(R/L)$$

From equation (20) and equation (21), it is obvious that DAB inner current control loop has been linearized and linear control theory is readily applied to ensure DAB current loop bandwidth and stability margins.

Figure 18:
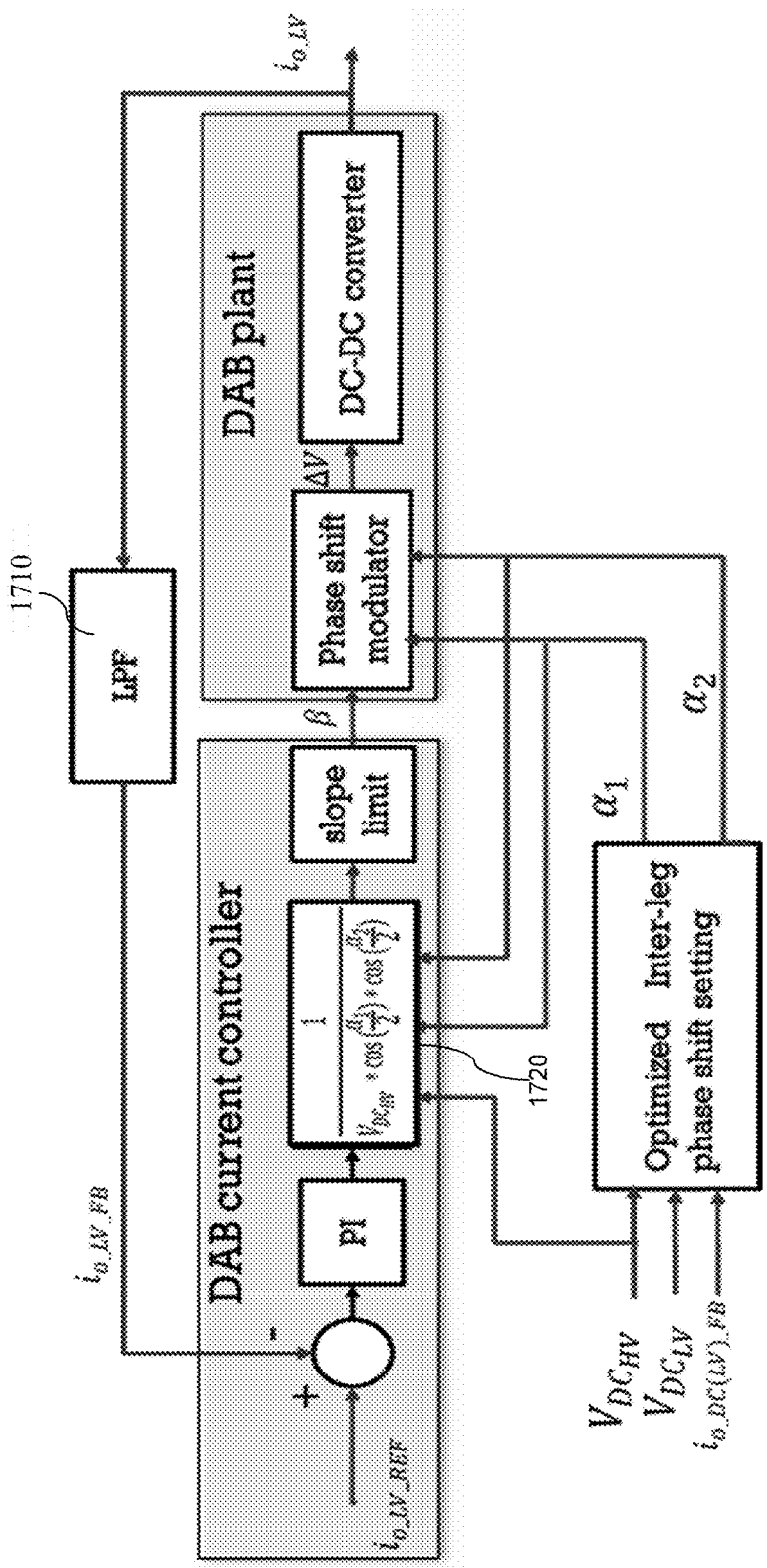
FIG. 18 illustrating the Linearized current control scheme for 2-level full bridge DAB Circuit.

FIG. 18 shows the proposed linearized current control strategy for the 2-level full bridge DAB circuit as shown in FIG. 2 with multiple phase shift angles applied to achieve Zero Voltage Switching (ZVS) in wide operation condition range.

Figure 19:
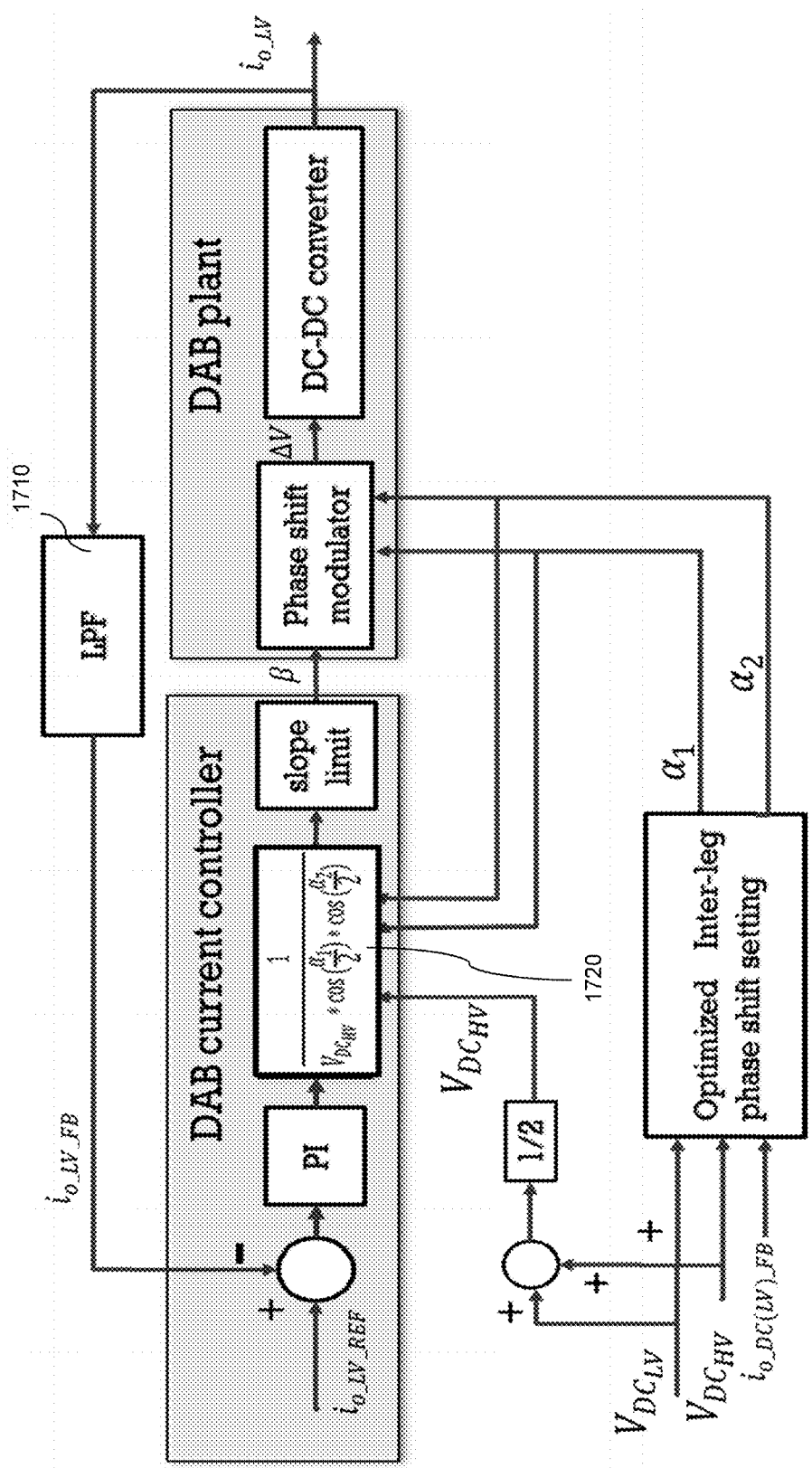
FIG. 19 illustrating the Linearized current control scheme for HV side NPC 3-level DAB.

FIG. 19 shows the linearized current control scheme for the HV side NPC 3-level half bridge type DAB shown in FIG. 1 with multiple phase shift angles applied without NPC leg capacitor voltage balancing control in DAB controller. The DC link voltage $V_{DC_{HV}}$ applied in the HF transformer primary winding is the averaged voltage of two HV side capacitors 122. It is possible to utilize the voltage difference of HV side NPC leg capacitors to control the angle difference between $a_{1\_2}$ and $a_{1\_1}$ to achieve NPC leg capacitor voltage balancing control of DAB with a proportional controller. However, in practice, it is preferred to control the NPC capacitor voltage balancing from the HV side front end controller cascaded H-bridge NPC converter to avoid DC current component to be generated in the HF transformer windings.

Figure 20:
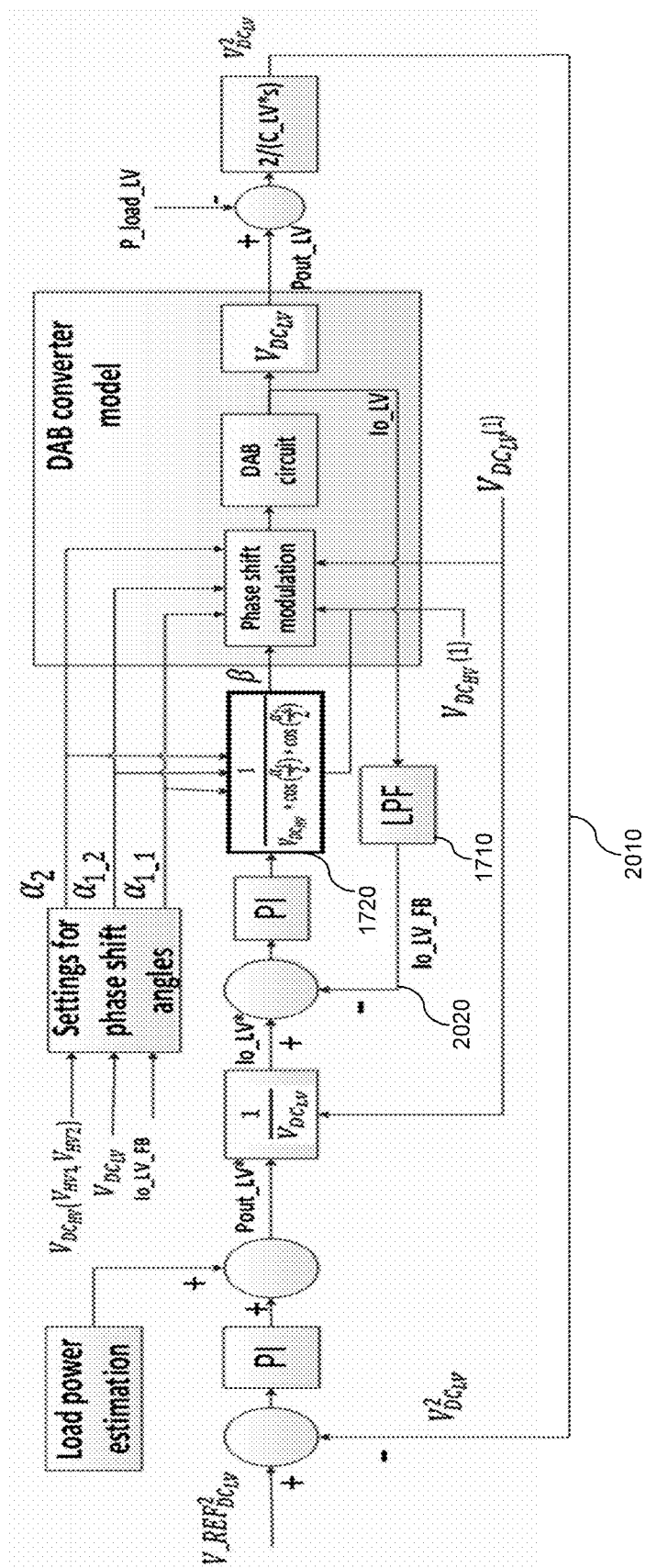
FIG. 20 illustrating the Single Module DAB Linearized Dual Voltage and Current Loop Control.

FIG. 20 shows the proposed linearized dual voltage-current loop DAB control scheme for single DAB converter. The outer loop 2010 is designed as feedback control of square of LV side DC link voltage. The physical meaning of the voltage loop control output is the averaged output power of DAB converter. The voltage control loop dynamic is improved with feedforward control of load power added in the PI control output. The averaged output current reference is obtained by dividing the voltage control output by the LV side DC link voltage. In the inner current loop 2020, the inter-leg phase shift angles and HV side DC link voltage are used for non-linear gain compensation of the averaged current loop to achieve the linearized control of the inner current loop.

Figure 21:
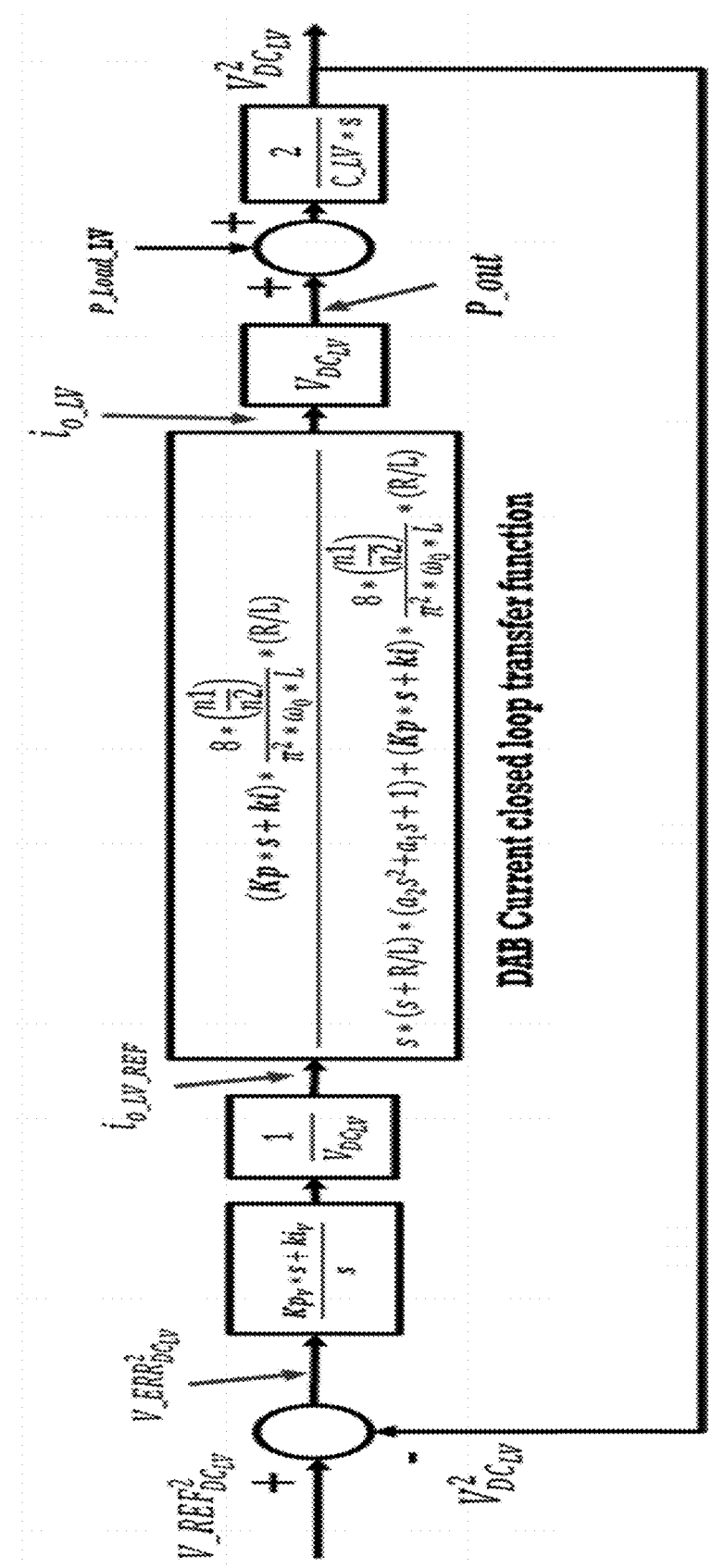
FIG. 21 illustrating the Single Module DAB Linearized Voltage Outer Control Loop.

FIG. 21 illustrates the linearized DAB outer voltage loop for small signal analysis for single DAB converter. The closed loop transfer function of DAB inner current loop is derived from the small signal model of FIG. 17 based on 2nd order LPF implementation.

For single module DAB voltage control loop shown in FIG. 21, the open loop transfer function of linearized voltage control loop with square of LV side DC voltage as output signal and the error of square of LV side DC voltage error as its input signal is derived as equation (22).

$$\frac{V_{DC_{LV}}^2}{V - ERR_{DC_{LV}}^2} = \qquad (22)$$

$$\frac{Kp*s + ki}{s} * \frac{(Kp*s + ki) * \frac{8*\left(\frac{n1}{n2}\right)}{\pi^2 * \omega_0 * L} * \left(\frac{R}{L}\right)}{s*\left(s + \frac{R}{L}\right)*(a_2 s^2 + a_1 s + 1) + } * \frac{2}{C\_LV * s}$$

$$(Kp*s + ki) * \frac{8*\left(\frac{n1}{n2}\right)}{\pi^2 * \omega_0 * L} * (R/L)$$

Figure 22:
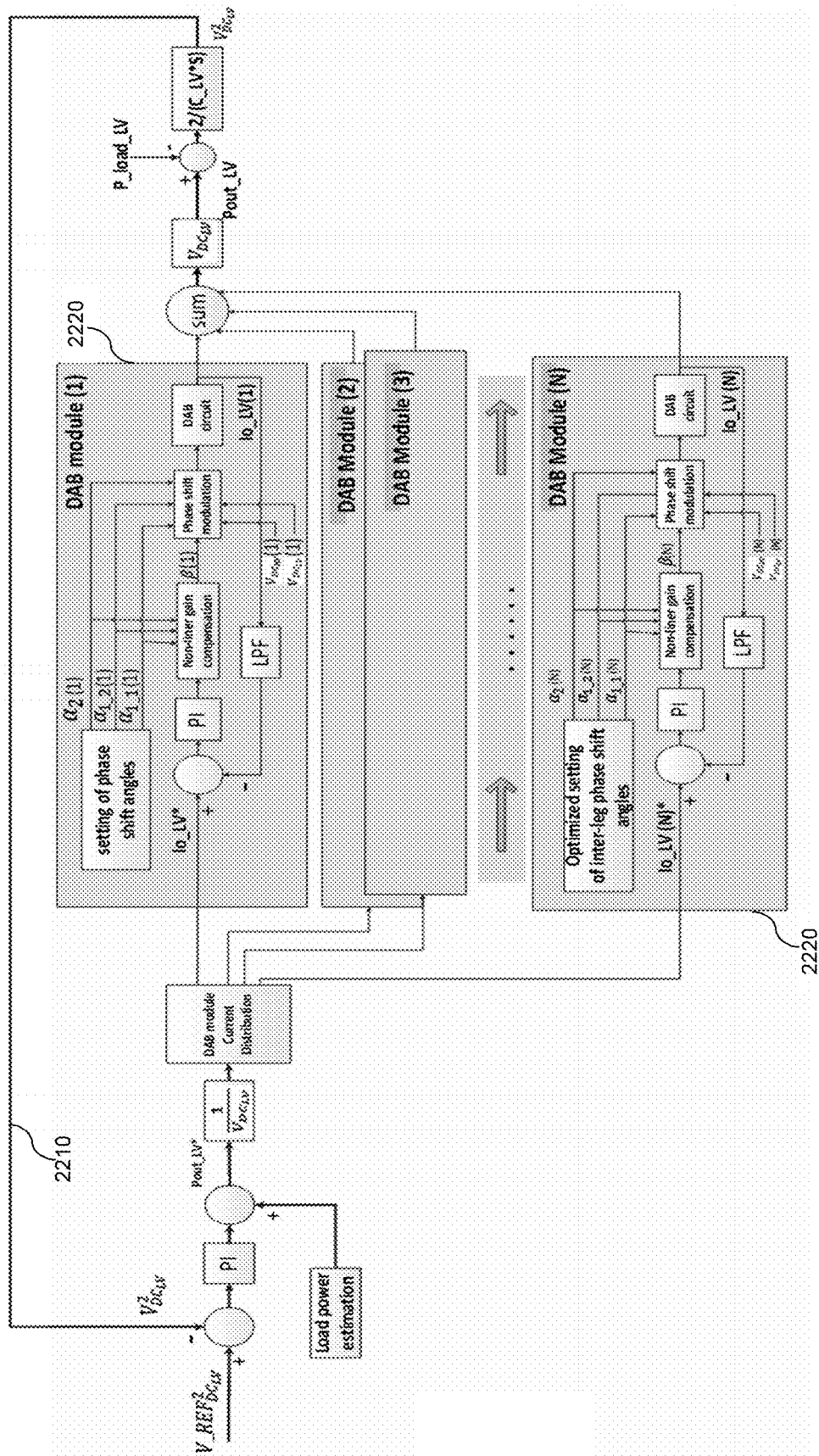
FIG. 22 illustrating the Modular DAB Linearized Dual Voltage and Current Control Scheme.

FIG. 22 shows the linearized modular DAB dual voltage and current control scheme. The linearized voltage outer loop controller structure is same for both 2-level full bridge DAB circuit configuration and HV side NPC 3-level half bridge circuit configuration. In the outer voltage loop 2210, the load power feedforward control is added to the voltage proportional-integral (PI) controller output signal to improve the dynamic performance of modular DAB voltage control. The voltage control output is divided by the LV side DC link voltage to get the total LV side current references of all DAB modules. The total current is distributed among the DAB modules to achieve optimized operation of each individual DABs. For 2-level full bridge DAB circuit configuration shown in FIG. 12, the inner current control loop is implemented as the control scheme shown in FIG. 18. For the HV side NPC 3-level half bridge DAB circuit configuration shown in FIG. 13, the inner control loop is implemented as the control scheme shown in FIG. 19. The LV side individual DAB output current is summed up in the common LV side DC bus circuit. The total DAB output power is obtained by multiplication of the LV side DC bus voltage and the total DAB output current. The LV side DC link capacitor dynamic is included in model of the outer voltage loop.

Figure 23:
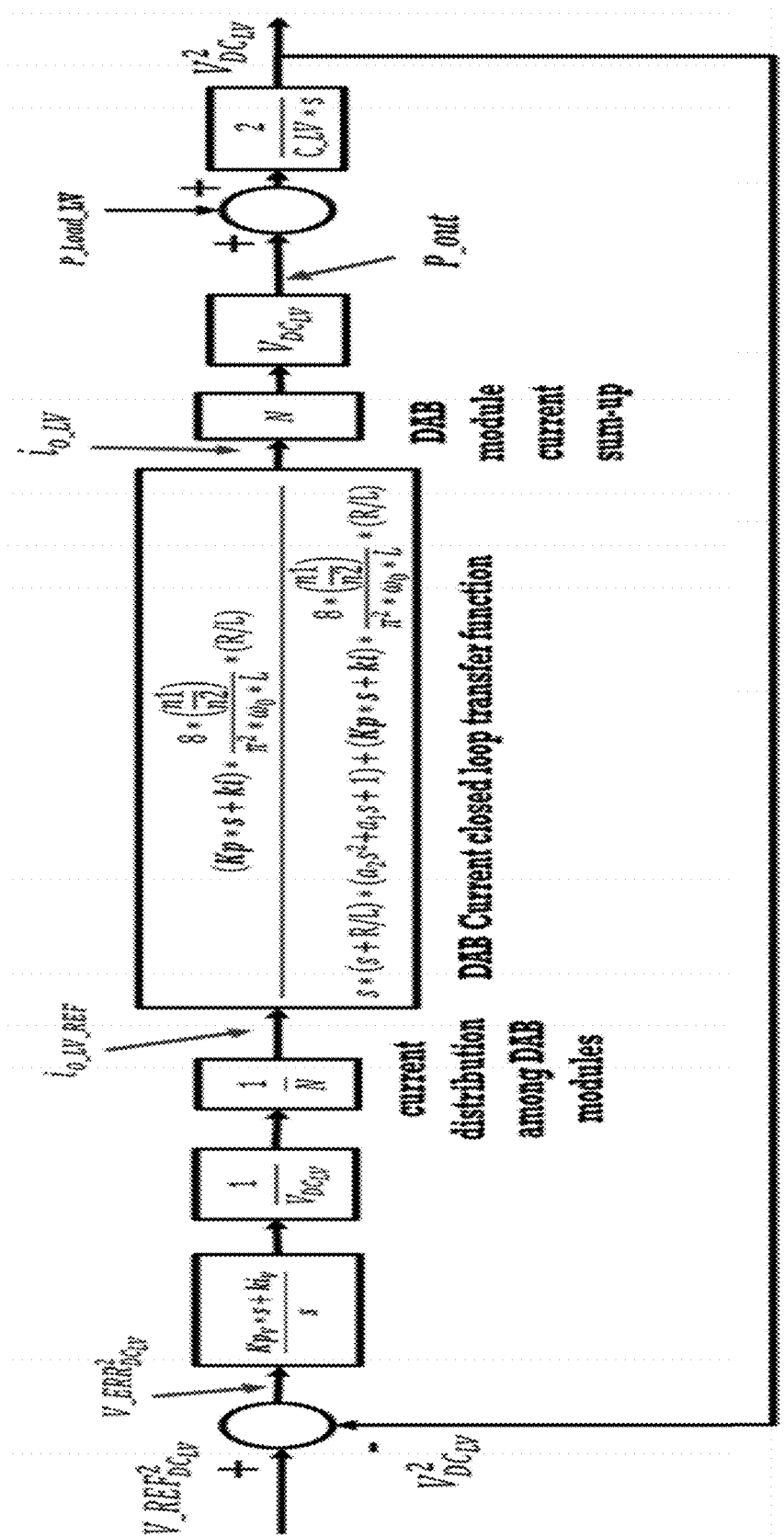
FIG. 23 illustrating the modular DAB Linearized Voltage Outer Control Loop.

FIG. 23 shows the small signal model for the modular DAB voltage outer loop with the assumption that total current is evenly distributed among DAB modules and uniformed dynamic inner current loop response is achieved for all modular DABs. Comparing FIG. 23 with FIG. 21, it is obvious that the same voltage loop transfer function model for single module DAB voltage outer loop control can be applied for multiple module DAB voltage outer loop controller design and analysis.

The method accordingly to the second embodiment relates to controlling the SST by linearizing a current and voltage in each DAB module. The step of linearizing the current and voltage in each DAB module comprises applying a non-linear compensation function as expressed in equation (19) between a proportional-integral (PI) controller and a DAB plant. The step further comprises passing a low voltage output current through a low pass filter and using the filtered output current as a feedback signal; obtaining a difference between an input current and the feedback signal and passing a signal representing the difference through a proportional-integral (PI) controller and the non-linear compensation function; and performing linearization of a voltage by using a square of a low voltage output voltage as a feedback signal to the reference voltage.

Third Embodiment

Figure 25:
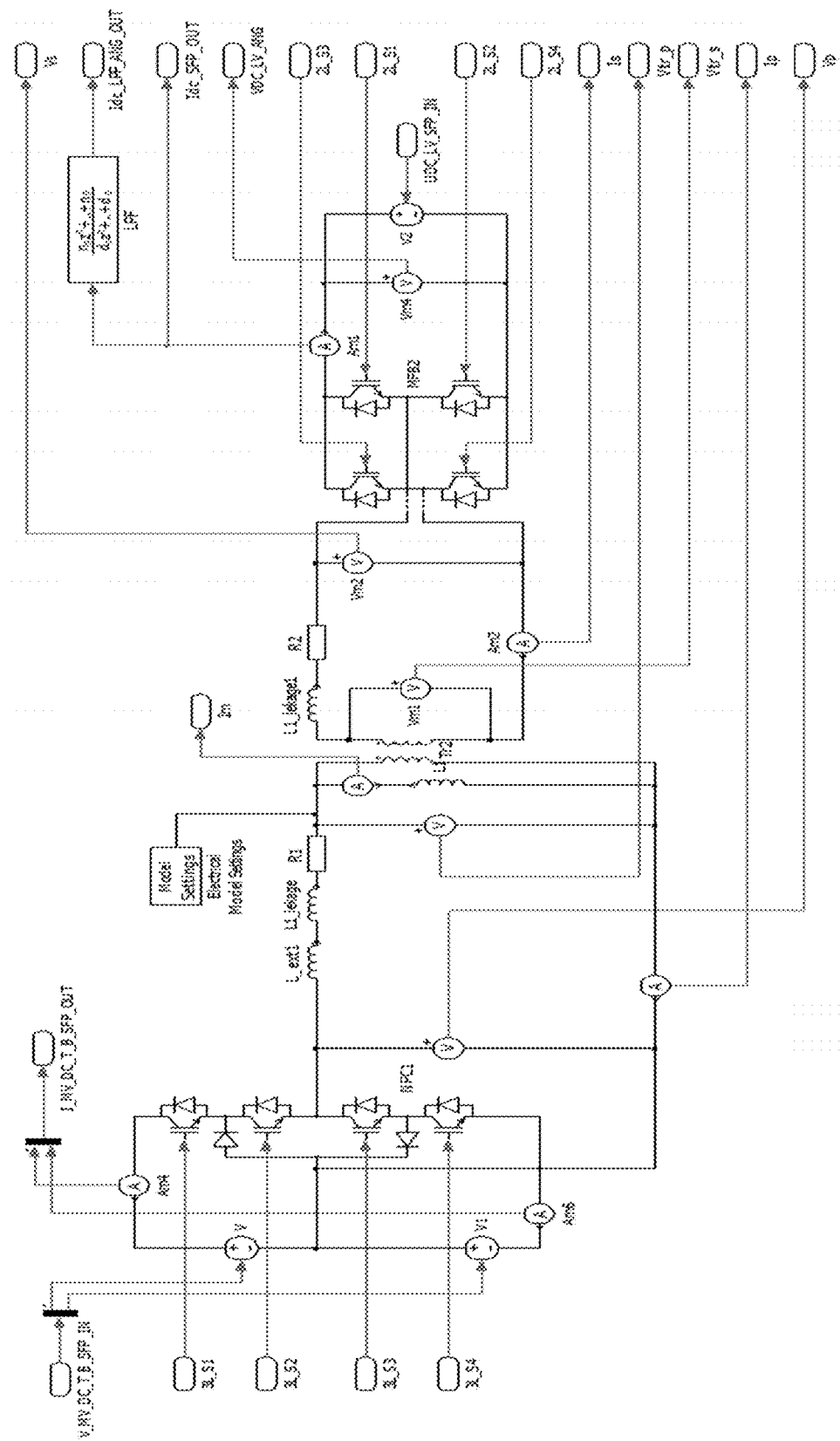
FIG. 25 illustrating the DAB circuit model implemented in the PLECS RT boxes for the SST real time emulation.

FIG. 25 shows the overview of the third embodiment comprising the DAB current distribution with a dual current and voltage loop voltage balancing control of the first embodiment 2510 and the modular DAB linearized dual voltage and current loop control of the second embodiment 2520. The objective of the voltage balancing control is to generate the DAB module current adjustment signals to minimize HV side DC bus voltage unbalance caused by HV side CHB circuit parameter variation, DAB circuit parameter variation, and HF transformer parameter variations. The major advantage of DAB module current distribution based HV bus voltage balancing control is its fast dynamic response which comes from the uniformed inner DAB current loop fast dynamic response for multiple phase shift angle setting changes in full operation range of DAB. Although the first and second embodiments can be individually implemented, it would be advantageous to combine both first and second embodiments to achieve better results.

Figure 24:
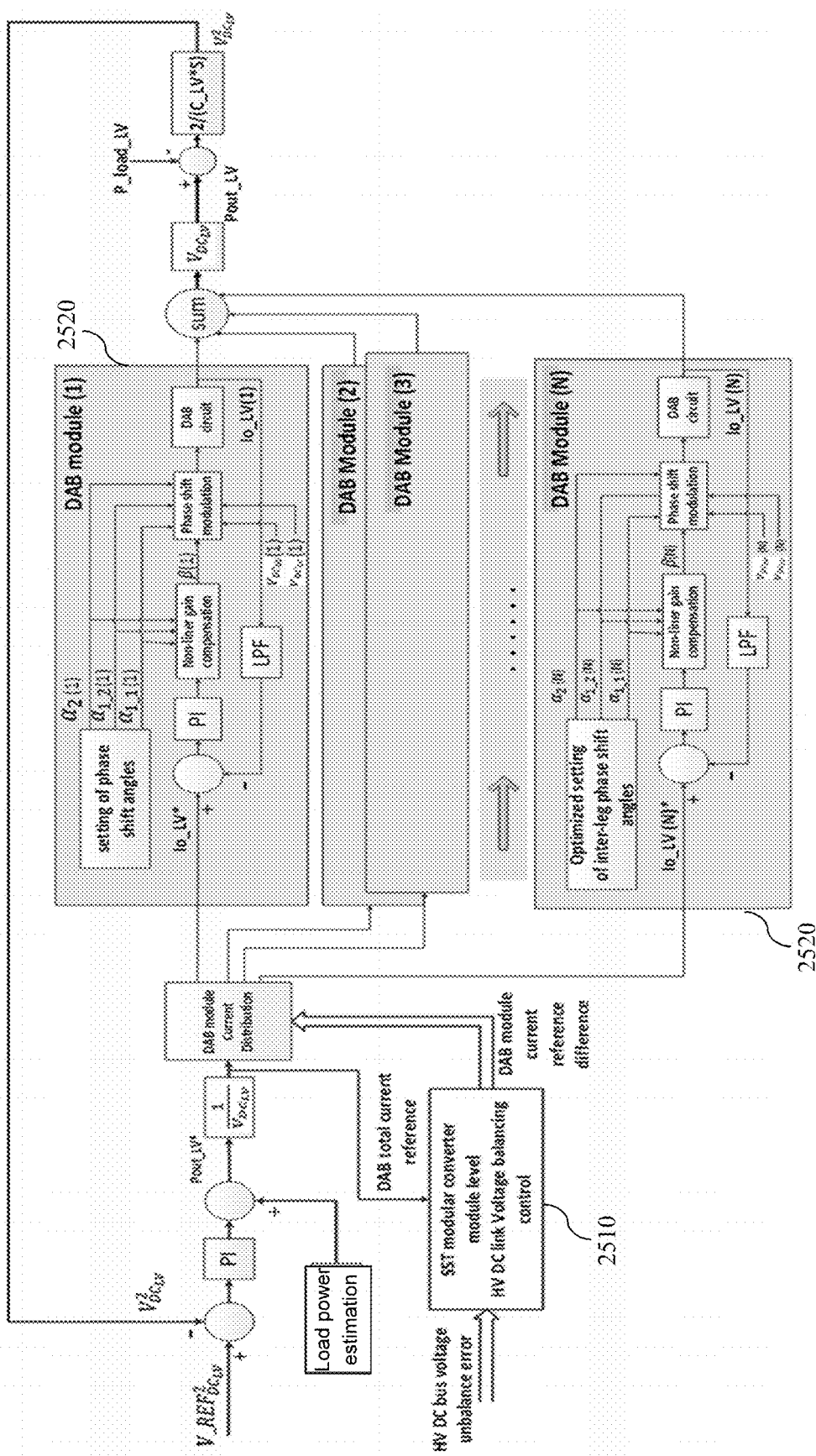
FIG. 24 illustrating the SST DAB current distribution based HV bus voltage balancing control and the modular DAB linearized dual voltage and current control system.

For the SST circuit topology shown in FIG. 1 and the DAB voltage and current control scheme shown in FIG. 24, the DAB current direction and power direction definition applied for the HV DC bus voltage balancing control design is that positive DAB current flows from the LV side DAB AC-DC converter towards the LV side capacitor and positive power of DAB DC-DC converter flows from HV DC bus to LV DC bus.

SST Modular DAB Control Performance Validation with PLECS RT-BOX Real Time Emulation To validate the performance of DAB module current distribution based voltage balancing control system, PLECS real time emulation is carried out for the SST converter system for the NPC CHB and HV side half bridge NPC DAB circuit SST configuration with three modules shown in FIG. 1. Further, to validate the linearized modular DAB controller performance, PLECS real time emulation is carried out for the SST converter system for LV side grid tied application with 3 modules of HV NPC 3-level half bridge side DAB shown in FIG. 1.

The PLECS RT time emulation is a more realistic method to evaluate the SST steady state and dynamic transient performance with all the numerical issues related to the discretized control algorithm, and the current/voltage sensor ADC sampling error, and FPGA based PWM timing resolution for DAB phase shift modulation included. It is a realistic method to validate the DAB control performance for the modular SST converter control system in real time before physical SST converter to be built and tested. PLECS RT box computation time for each DAB module circuit is around 3 µs. This limits the maximum achievable DAB PWM switching frequency. However, the conclusion obtained in the PLECS real time emulation can be projected to the PLECS off-line circuit simulation for higher DAB switching frequency at the same current and power level by reducing the DAB external inductance value inversely proportional to DAB switching frequency.

FIG. 26 shows the DAB circuit model implemented in the PLECS RT boxes for the SST real time emulation. The LV side DAB output current passes through a digital low pass filter (LPF) and outputs from PLECS RT box analog channel to be applied for modular DAB current feedback control. In physical SST system, this LPF can be either an analog circuit low pass filter or digital LPF implemented in FPGA with fast sampling rate.

Table 1 below shows the circuit settings and parameters used in the PLECS real time circuit emulation. In the voltage balancing control algorithm emulation validation, +/−15% top/bottom capacitance variation and +/−15% CHB module level capacitor variation, and +/−20% DAB module external inductance variation are applied in the emulation PLECS real time emulation setup for all the emulation cases presented below. This is the worst parameter variation condition for the SST voltage balancing algorithm.

TABLE 1

Circuit settings and parameters used for three module SST PLECS circuit emulation

| Circuit settings and parameters | value | unit |
|---|---|---|
| HV side AC voltage source voltage (rms) | 2280 | V |
| LV side three phase AC voltage source phase voltage (rms) | 240 | V |
| PWM switching frequency of HV side cascaded NPC H-bridge converter | 2.5 | kHz |
| PWM switching frequency of LV side DC-AC inverter | 20 | kHz |
| HF transformer operation frequency | 10 | kHz |
| Rated power of each HV side AC-DC converter | 6000 | W |
| Rated power of HF transformer | 6000 | W |
| Rated power of LV side DC-AC inverter | 18000 | W |
| HV side DC bus voltage | 1458 | V |
| LV side DC bus voltage | 750 | V |
| HV side NPC converter top and bottom capacitance | 500 | uF |
| LV side DC bus capacitance | 500 | uF |
| HV side single phase grid filter inductance | 120 | mH |
| Lv side three phase grid filter inductance | 2000 | uH |
| HV side charging resistor | 720 | ohm |
| External inductance connected to HF transformer primary winding | 0.68 | mH |
| HF transformer primary leakage inductance | 1.2765 | uH |
| HF transformer secondary leakage inductance | 0.3394 | uH |
| HF transformer magnetization inductance | 25.26 | mH |
| HF transformer magetization resistance | 88.786 | kohm |
| HF tranformer turns ratio | 1 | |
| HF transformer primary resistance | 0.039 | ohm |
| HF transformer Secondary resistance | 0.0437 | ohm |

Figure 26A:
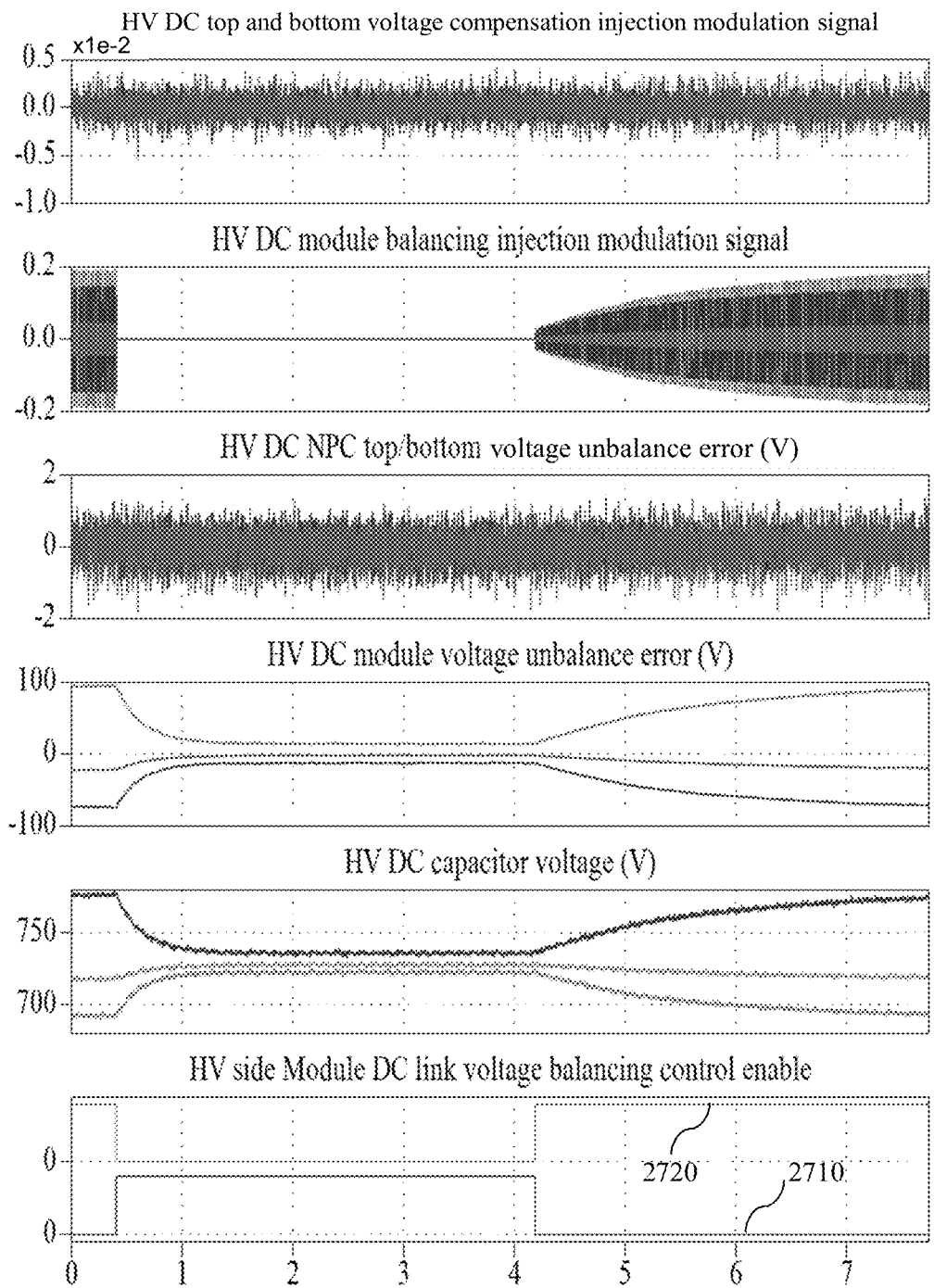
FIG. 26a illustrating the CHB balancing control signals of SST switches between CHB voltage balancing control without reactive power and DAB voltage balancing control in zero power condition.
Figure 26B:
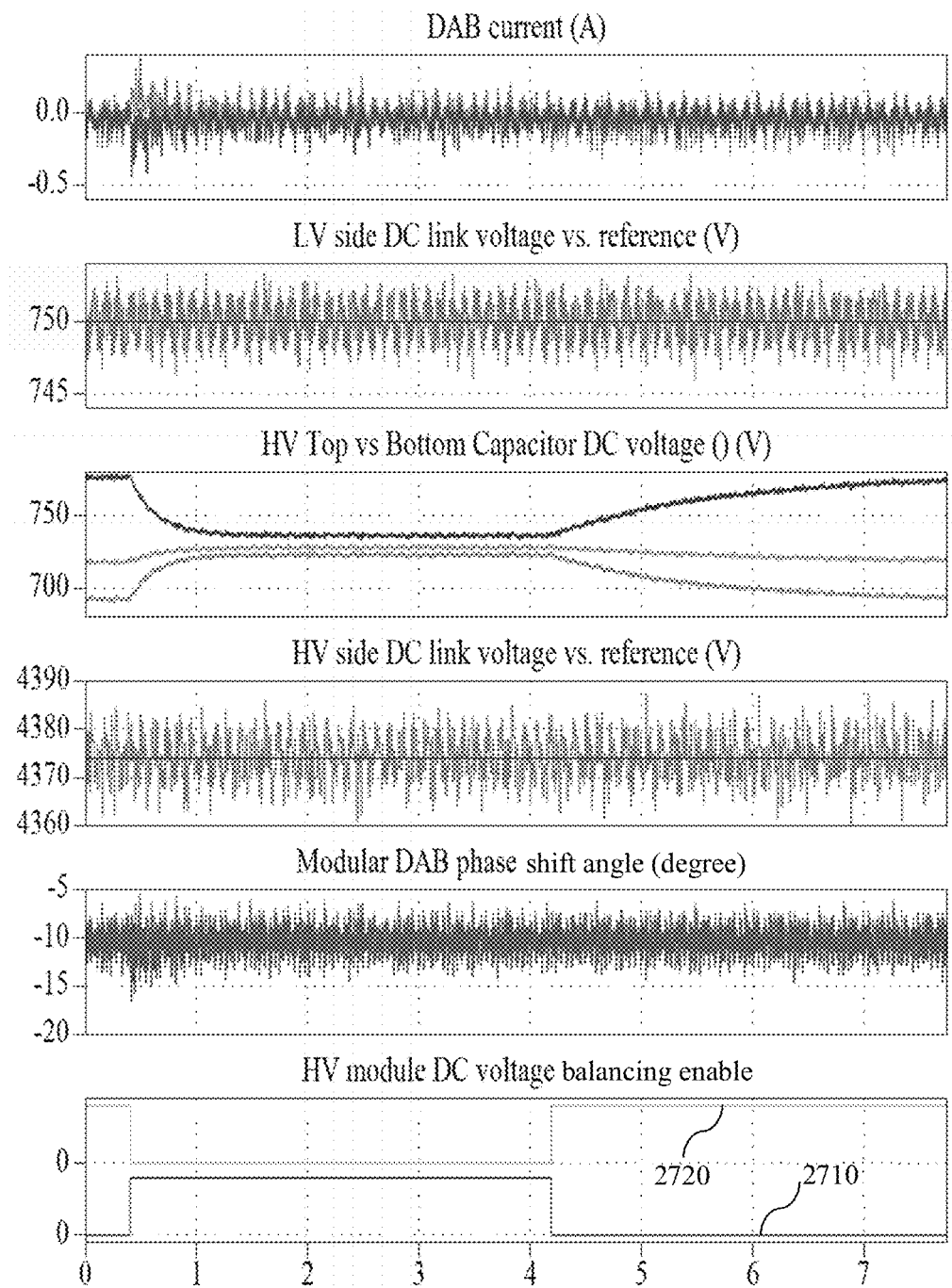
FIG. 26b illustrating the DAB balancing control signals of SST switches between CHB voltage balancing control without reactive power and DAB voltage balancing control in zero power condition.

FIG. 26a and FIG. 26b show the emulation results of voltage balancing control performance at zero power condition of CHB voltage balancing control without enforced reactive power flow compared with the performance of DAB voltage balancing control. DAB voltage balancing control is activated when the voltage balancing mode signal in plot 2710 equals to 1. CHB voltage balancing algorithm is activated when the balancing mode signal in plot 2720 equals to 1. This emulation results show that DAB voltage balancing control achieves a good voltage balancing performance with less than +/−15V module level HV bus voltage difference at zero power condition without requiring reactive power flow in CHB converter. The module level voltage unbalancing of CHB voltage balancing algorithm is around +/−100V when there is no reactive power flow in CHB.

The emulation results of FIG. 26a and FIG. 26b validates that the DAB voltage balancing control has fast dynamic response to the HV side DC voltage unbalance condition in the zero power condition. When the DAB voltage balancing control is activated, a noticeable module level DAB current difference is observed at very beginning of voltage balancing control when the voltage unbalance is very large. The voltage unbalance error is quickly reduced below +/−15V. However, when the balancing control mode is switched back to CHB voltage balancing control, the CHB module balancing compensation signal is slowly increased to closer to its limiting=PWM modulation signal value around 0.2 with the increasing HV side DC bus voltage unbalance around +/−100V.

Figure 27A:
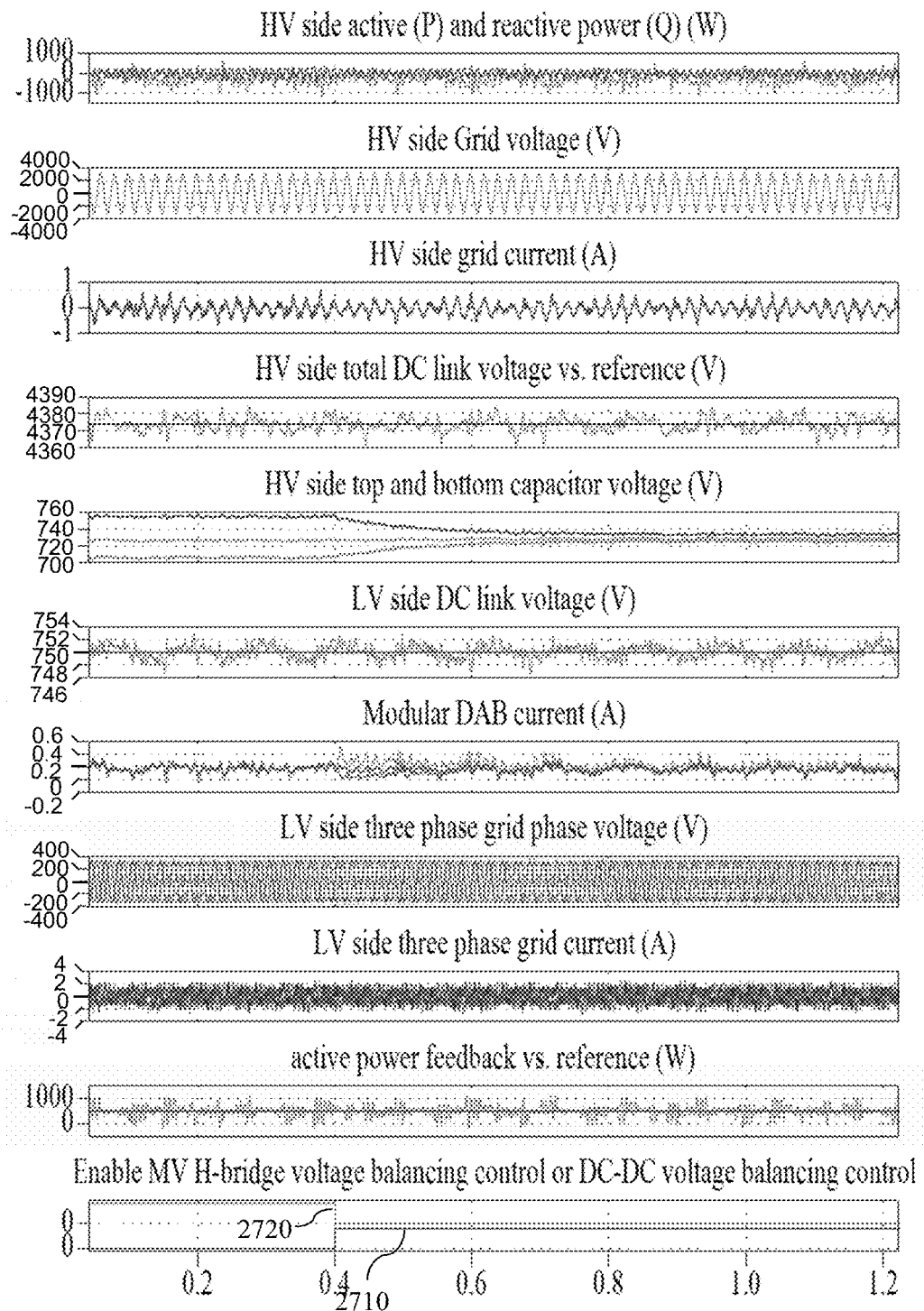
FIG. 27a illustrating the SST control performance of SST from CHB voltage balancing without enforced CHB reactive power to DAB voltage balancing in 500 W light power operation condition.
Figure 27B:
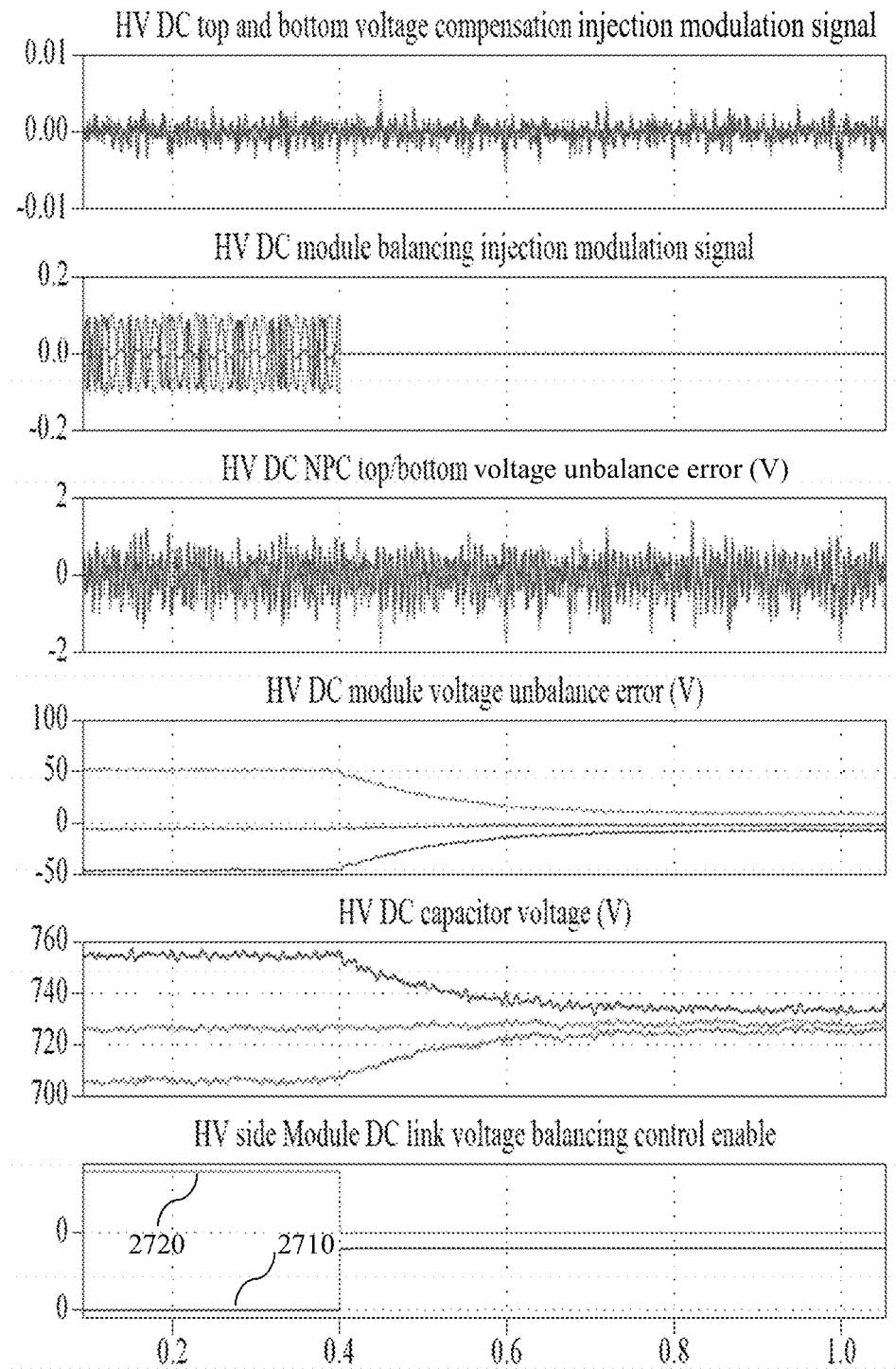
FIG. 27b illustrating the CHB unbalance control signals of SST from CHB voltage balancing without enforced CHB reactive power to DAB voltage balancing in 500 W light power operation condition.

FIG. 27a and FIG. 27b show the PLECS RT emulation results of SST operates at +500 W light power regulation condition when switching from CHB voltage balancing control to DAB voltage balancing control. In this light power/load condition, the CHB voltage balancing control achieves +/−50V module level voltage unbalance. Its performance is improved compared with +/−100V voltage unbalance at zero power condition shown in FIG. 26a and FIG. 26b. However, CHB voltage balancing control performance is not as good as the +/−15V module level voltage balance performance achieved by the DAB voltage balancing control.

The emulation results of FIGS. 26a, 26b, 27a and 27b validated that DAB voltage balancing control has better performance in the zero power and light load condition without requiring HV side grid converter reactive current flows, which justifies to apply DAB current distribution based voltage balancing control by removing the minimum enforced CHB reactive power/current for SST normal power regulation as shown in flow charts of FIGS. 6 and 9.

Figure 28A:
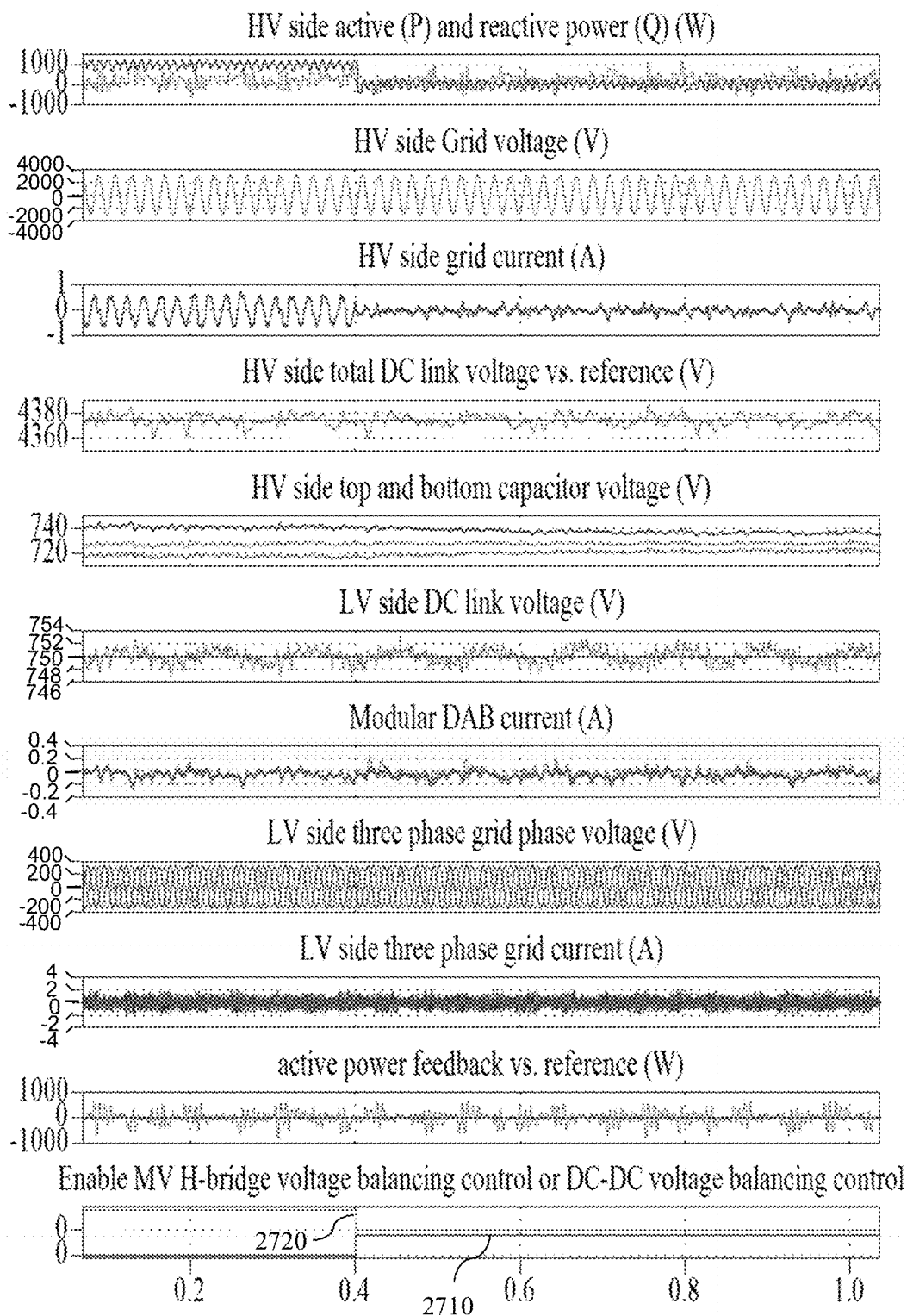
FIG. 28a illustrating the SST control performance of SST switches from CHB voltage balancing with enforced 1 kVA CHB reactive power to DAB voltage balancing in zero power condition.
Figure 28B:
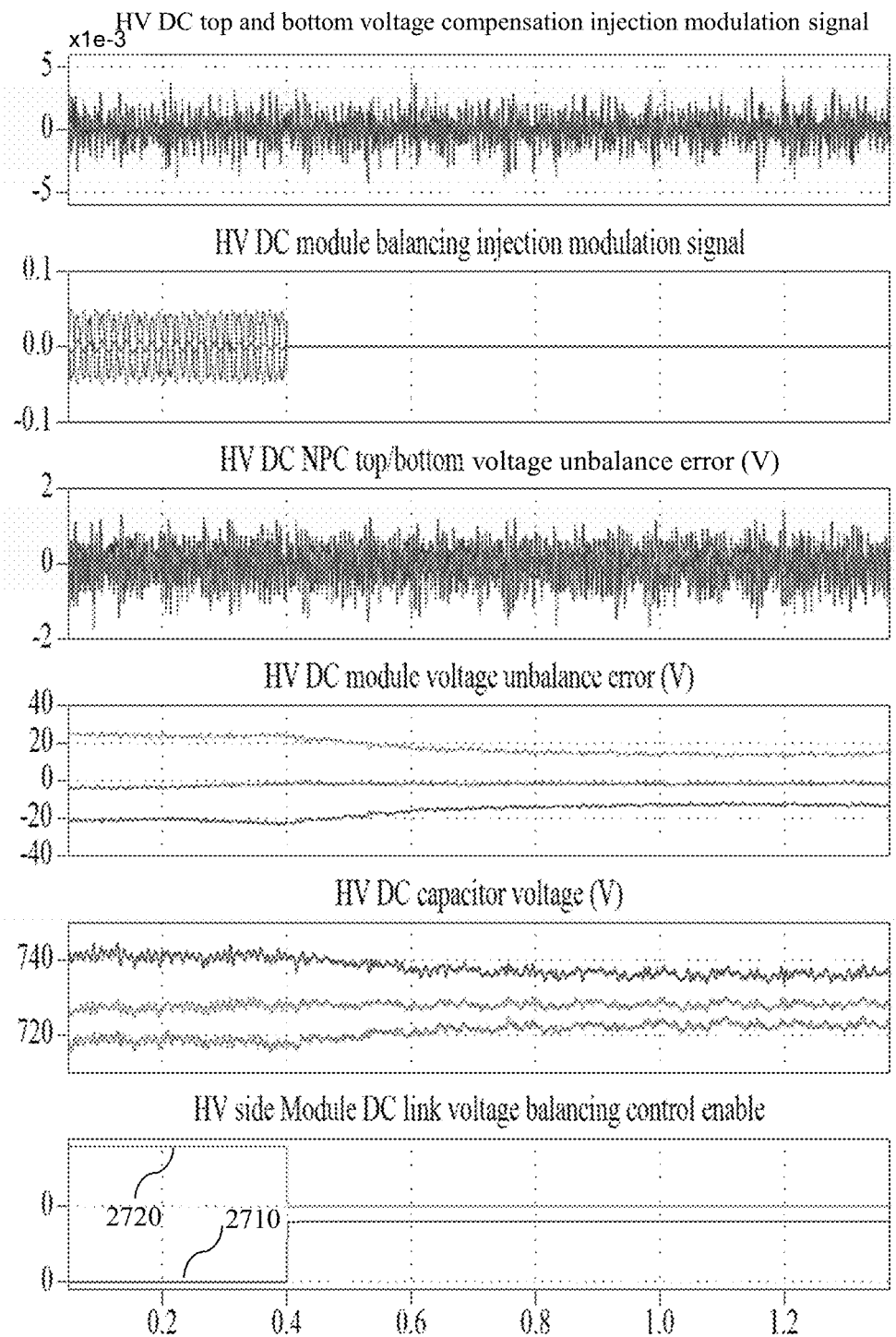
FIG. 28b illustrating the CHB voltage balancing signals of SST switches from CHB voltage balancing with enforced 1 kVA CHB reactive power to DAB voltage balancing in zero power condition.

FIGS. 28a and 28b show the emulation results when SST switching from the CHB voltage balancing control with enforced 1 kVA CHB circuit reactive power to the DAB voltage balancing control at zero power condition. The CHB voltage balancing control performance is greatly improved and achieves maximum +/−25V module level voltage balance. Although there is increased CHB reactive current in zero power condition, the performance of the CHB voltage balancing control is still slightly worse than the performance of DAB voltage balancing control.

The emulation results of FIGS. 28a and 28b justify that in the SST start-up process, it is required to enforce a minimum CHB reactive power/current for the CHB voltage balancing control to meet its performance requirement.

Figure 29A:
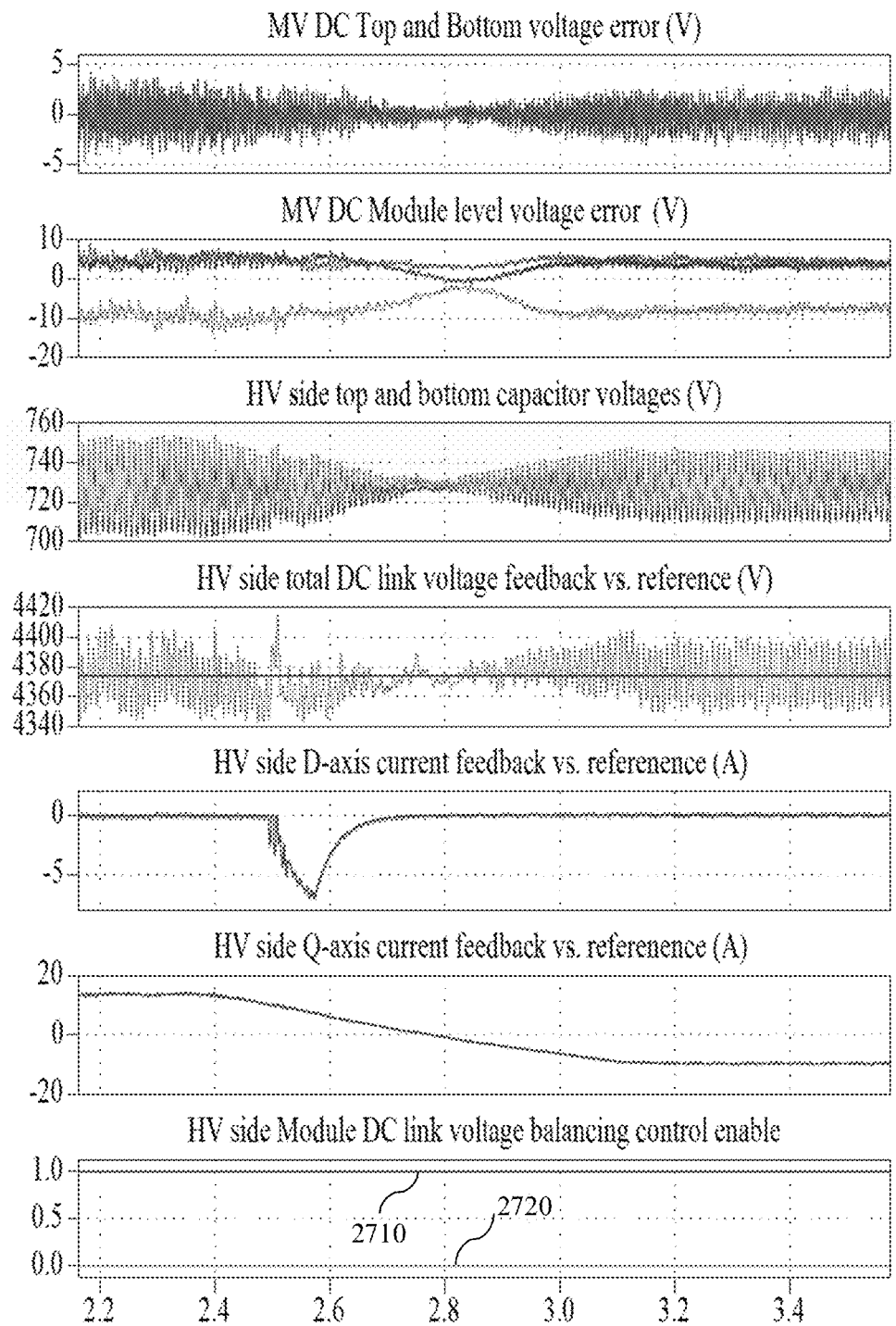
FIG. 29a illustrating the CHB control signals of the DAB voltage balancing performance in power ramping process.
Figure 29B:
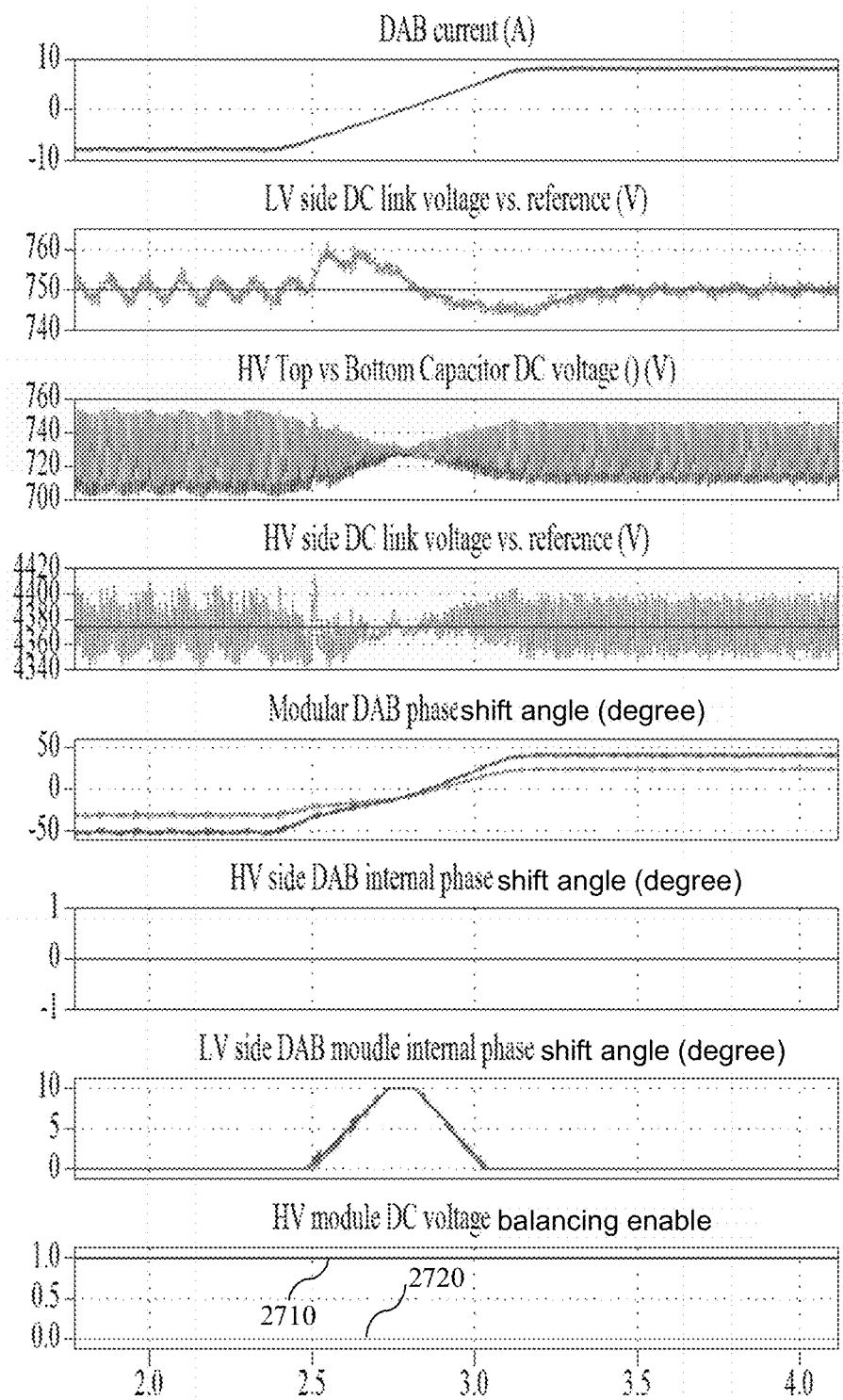
FIG. 29b illustrating the DAB control signals of the DAB voltage balancing performance in power ramping process.

FIGS. 29a and 29b show DAB current distribution voltage unbalance control performance with CHB and DAB control signals in power ramping process from −18 kW to +18 KW.

This emulation result of FIGS. 29a and 29b show that DAB voltage balancing control can consistently achieve less than +/−20V voltage module level HV bus voltage balancing error in the dynamic power ramping process for both positive and negative SST power flow directions. The CHB and DAB parameter circuit variation shows up in the difference of DAB phase shift angle control output signals.

Figure 30A:
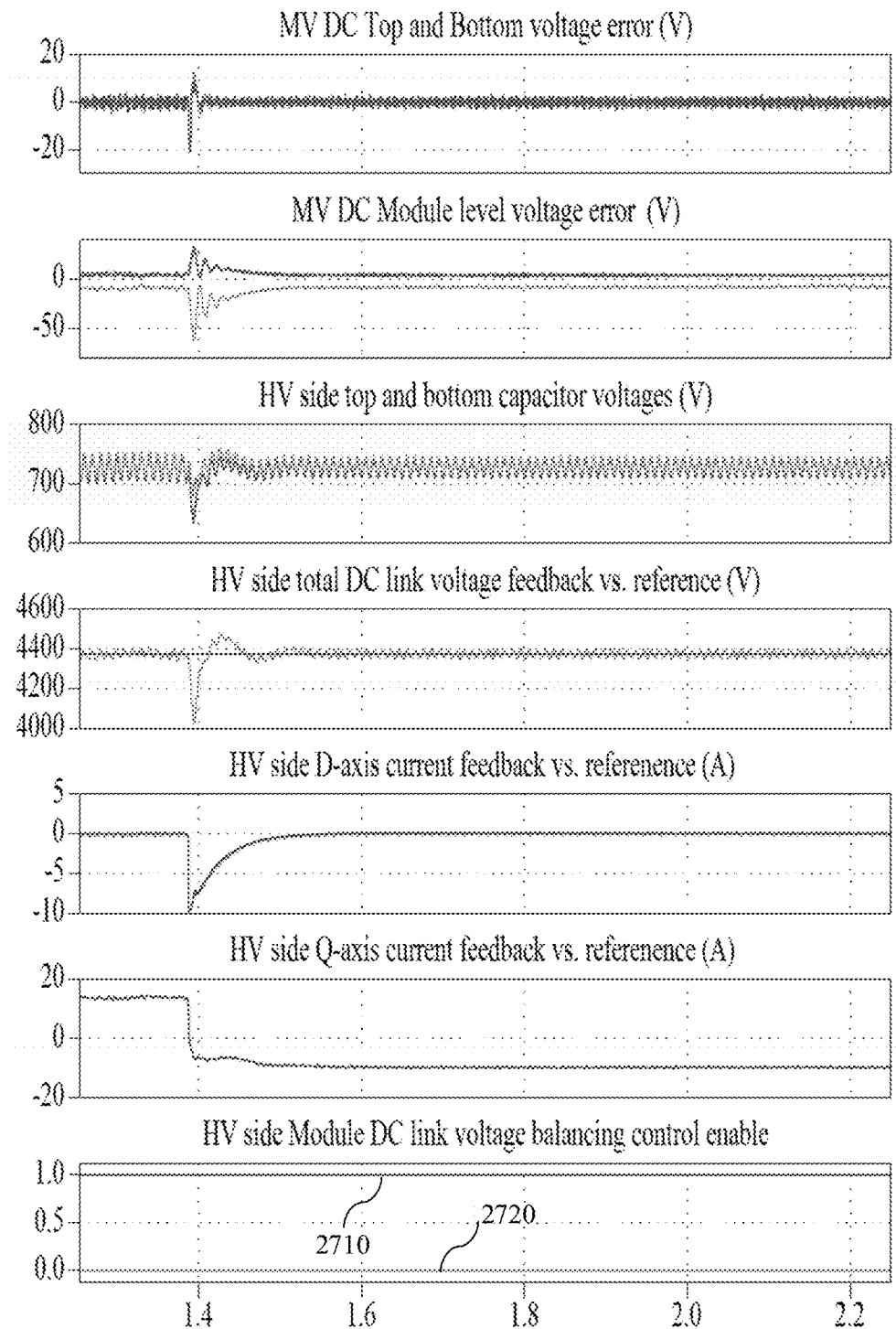
FIG. 30a illustrating the CHB control signals of the DAB voltage balancing performance in power step process.
Figure 30B:
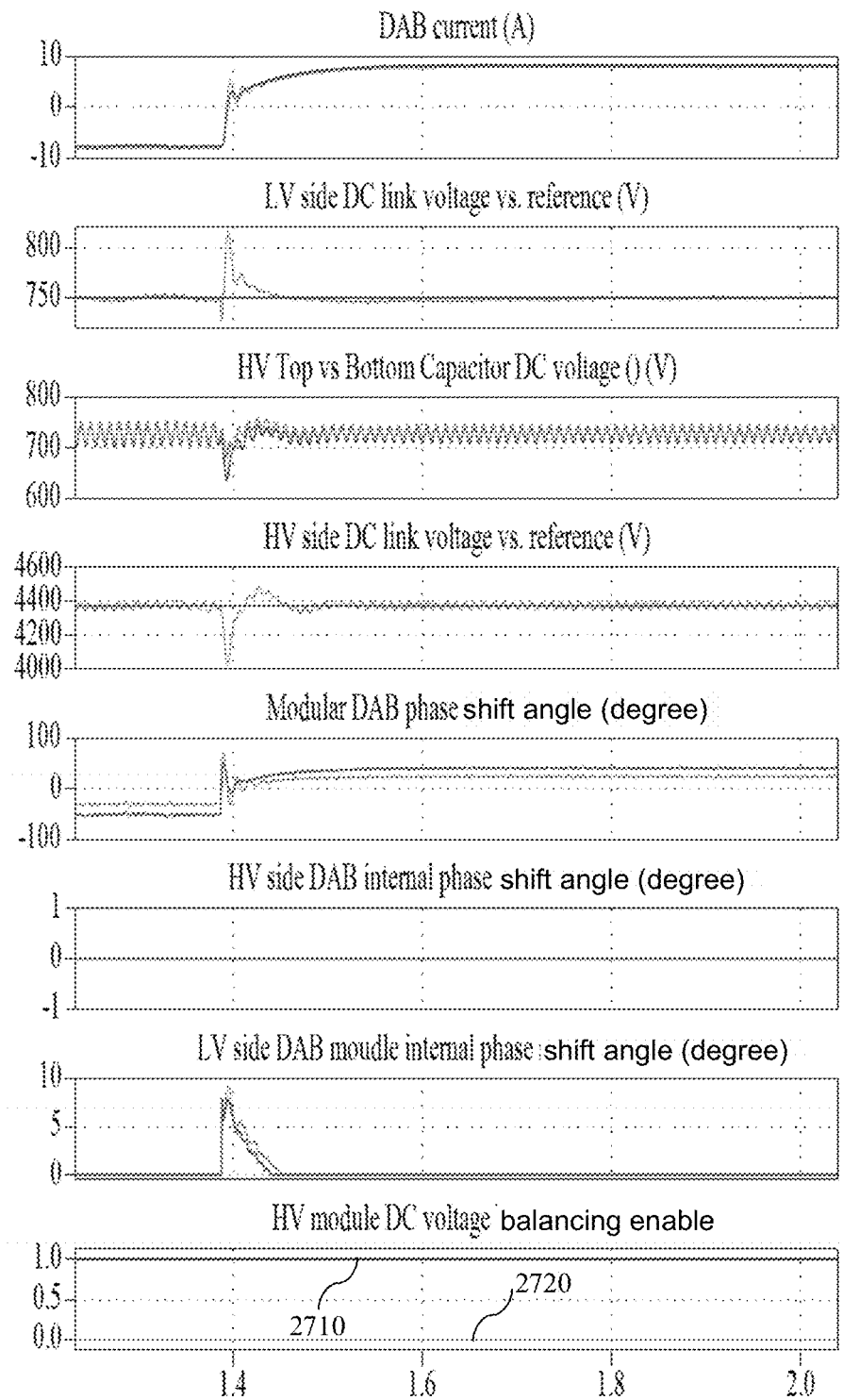
FIG. 30b illustrating the DAB control signals of the DAB voltage balancing performance in power step process.

FIGS. 30a and 30b show DAB current distribution voltage unbalance control performance with CHB and DAB control signals in power step process from −18 kW to +18 KW.

This emulation result of FIGS. 30a and 30b show that DAB voltage balancing control can achieve less than +/−60V voltage module level HV bus voltage balancing error in the dynamic power stepping transition process. The archived NPC top/bottom voltage unbalance error is round 20V in this dynamic power stepping transition process. There is almost no noticeable DAB module current difference in the entire power ramp stepping up process. The CHB and DAB parameter variation shows up in the difference of modular DAB phase shift angle control output signals.

The emulation results of FIGS. 29a, 29b, 30a and 30b, validate that DAB voltage balancing control has good performance for bi-directional power regulation with dynamic power stepping and ramping transition.

FIGS. 31a, 31b, 32a, 32b, 33a and 33b show the modular DAB converter control performance in SST emulation system in the steady state operation. In these emulation results, the detailed DAB circuit voltage/current signal waveforms are given to demonstrate that the DAB circuit model and PLECS real time FPGA based PWM modulator are working correctly at different phase shift angles in the real time emulation. This is the foundation to use PLECS real time circuit emulation to validate the performance of DC-DC converter control for SST system.

Figure 31A:
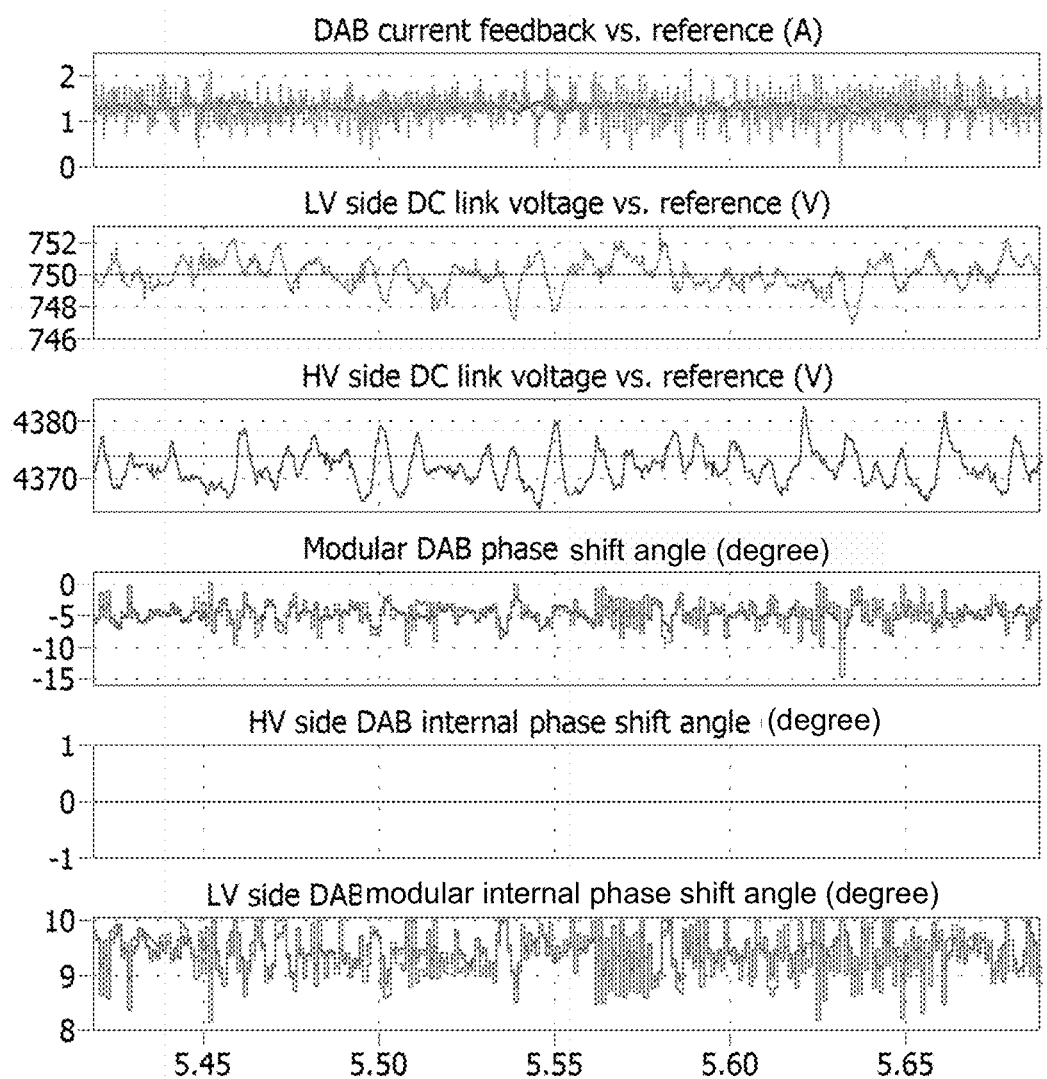
FIG. 31a illustrating the DAB control signals of SST steady state performance with power flow from LV grid to HV grid with DAB module operating at +1 kW light load condition.
Figure 31B:
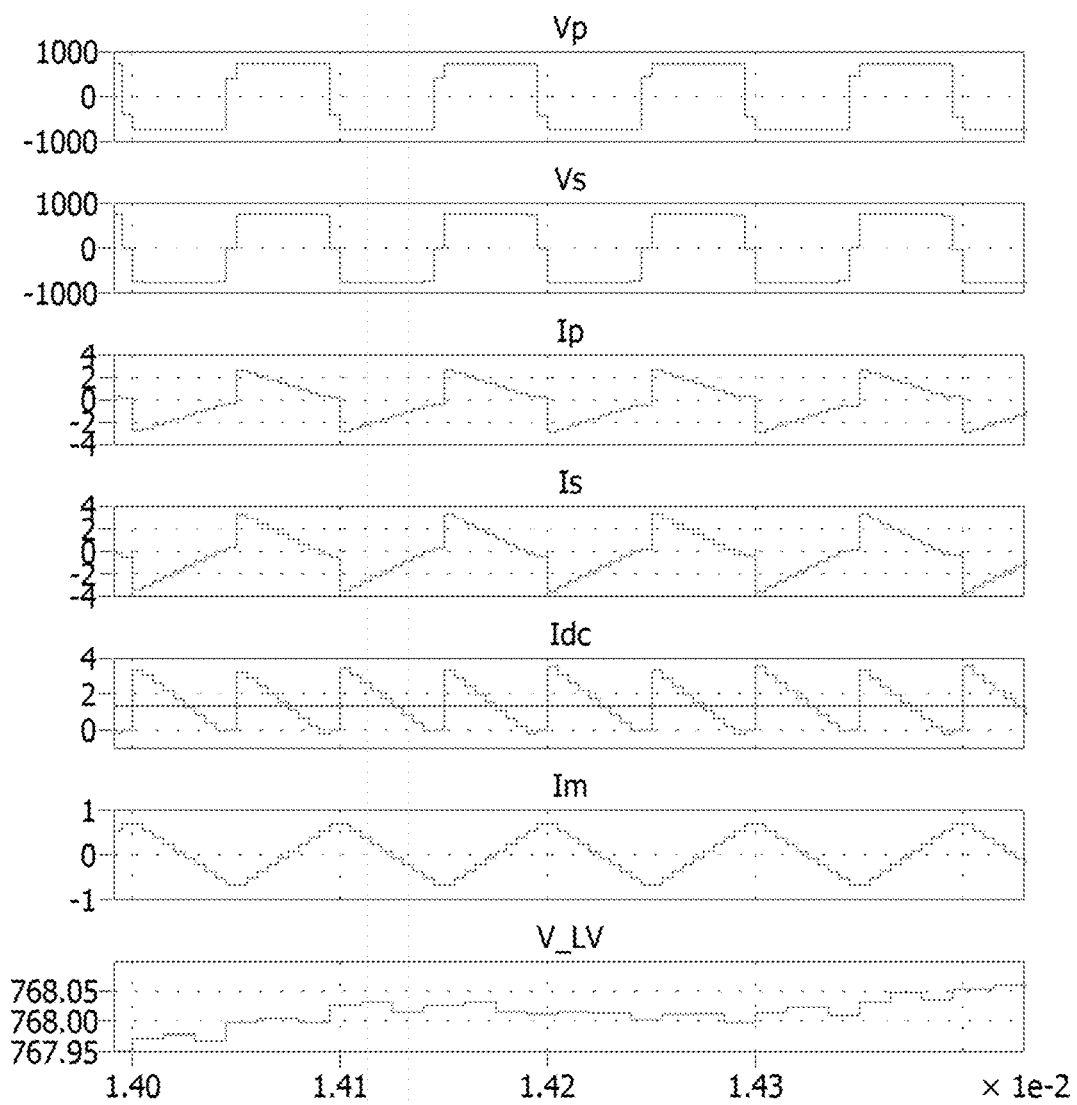
FIG. 31b illustrating the DAB circuit signals of SST steady state performance with power flow from LV grid to HV grid with DAB module operating at +1 kW light load condition.

FIGS. 31a and 31b show the PLECS real time emulation results of steady state performance of SST converter system with each DAB module operates at light load condition around +1 KW. The emulation result shows that HV side DAB converter output voltage (Vp) leads LV side DAB voltage output (Vs) in phase angle around 5 degree. The internal phase shift angle of the LV side DAB AC-DC converter is 9 degree. The DAB LV side AC-DC converter switches operate at ZVS condition with continuous current flow through the corresponding freewheeling diodes in the switch-on instant.

Figure 32A:
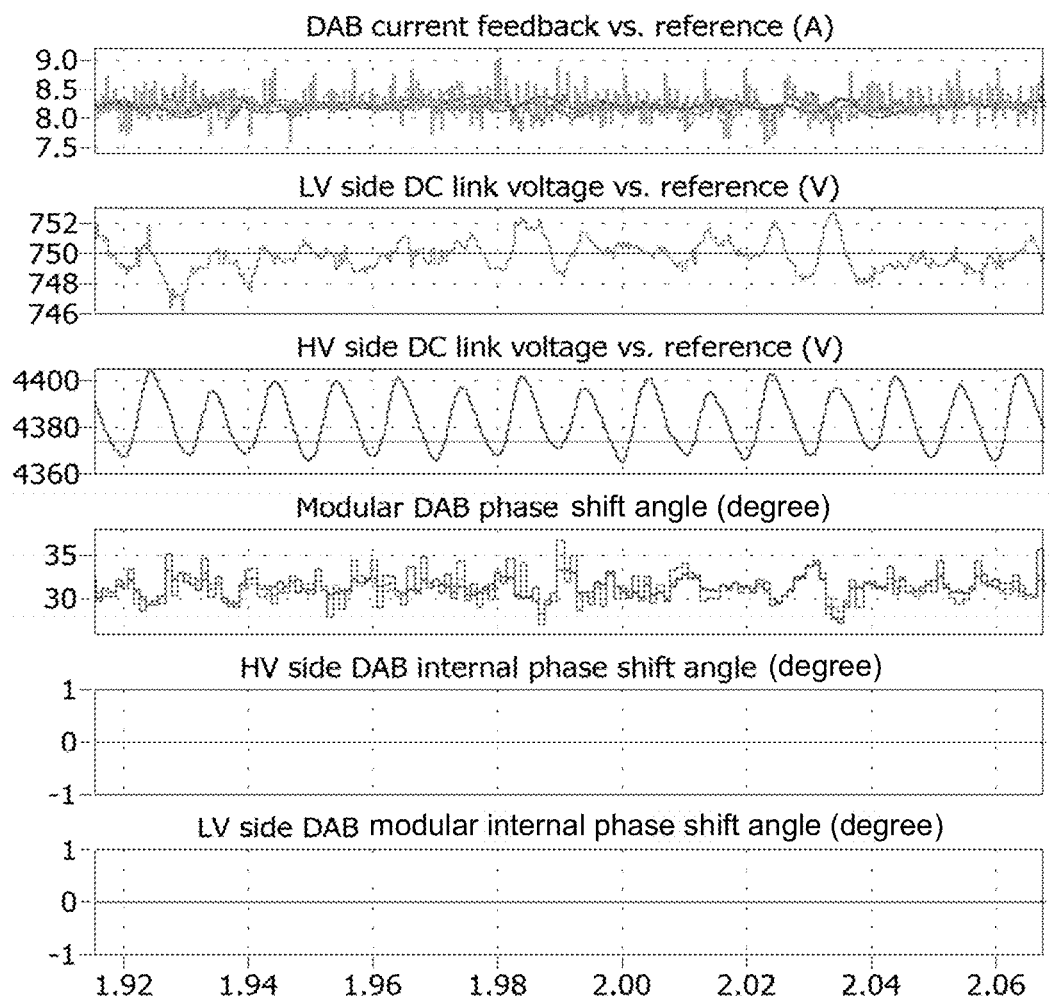
FIG. 32a illustrating the DAB control signals of SST steady state performance with power flow from HV grid to LV grid with DAB module operating at +6 kW full load condition.
Figure 32B:
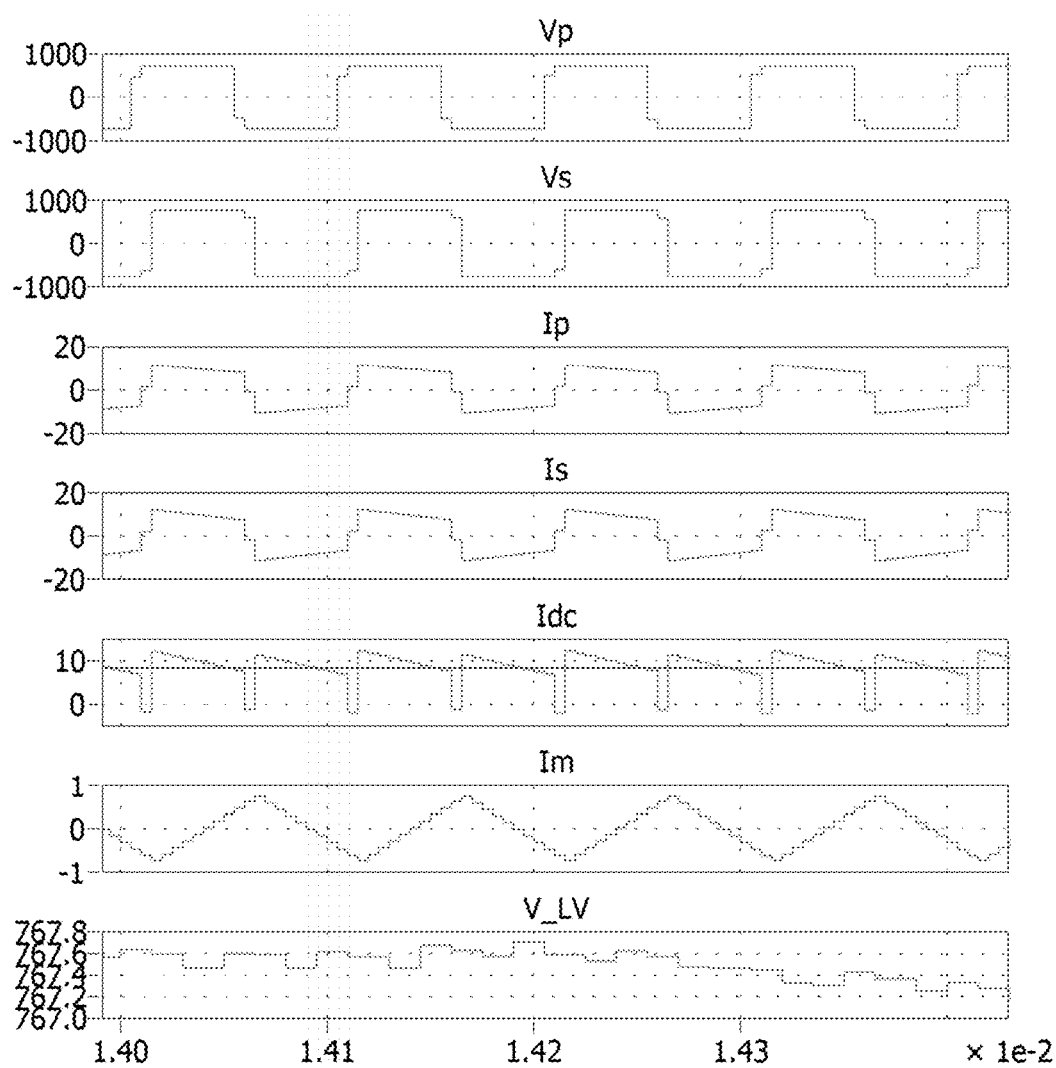
FIG. 32b illustrating the DAB circuit signals of SST steady state performance with power flow from HV grid to LV grid with DAB module operating at +6 kW full load condition.

FIGS. 32a and 32b show the PLECS real time emulation results of steady state performance of SST system power flow regulation from HV to LV grid source with DAB module operates around −6 KW. Both HV side and LV side DC bus voltages are regulated at its target value. The circuit emulation results show that HV side DAB converter output voltage (Vp) leads HV side DAB voltage output (Vs) in phase shift angle around +32 degree. The HF transformer primary winding current (Ip) and secondary winding current (Is) are both symmetrical around zero current. The magnetization current (Im) is symmetrical around zero. The averaged LV side output current (Idc) is pulsing with two times of DAB switching frequency.

Figure 33A:
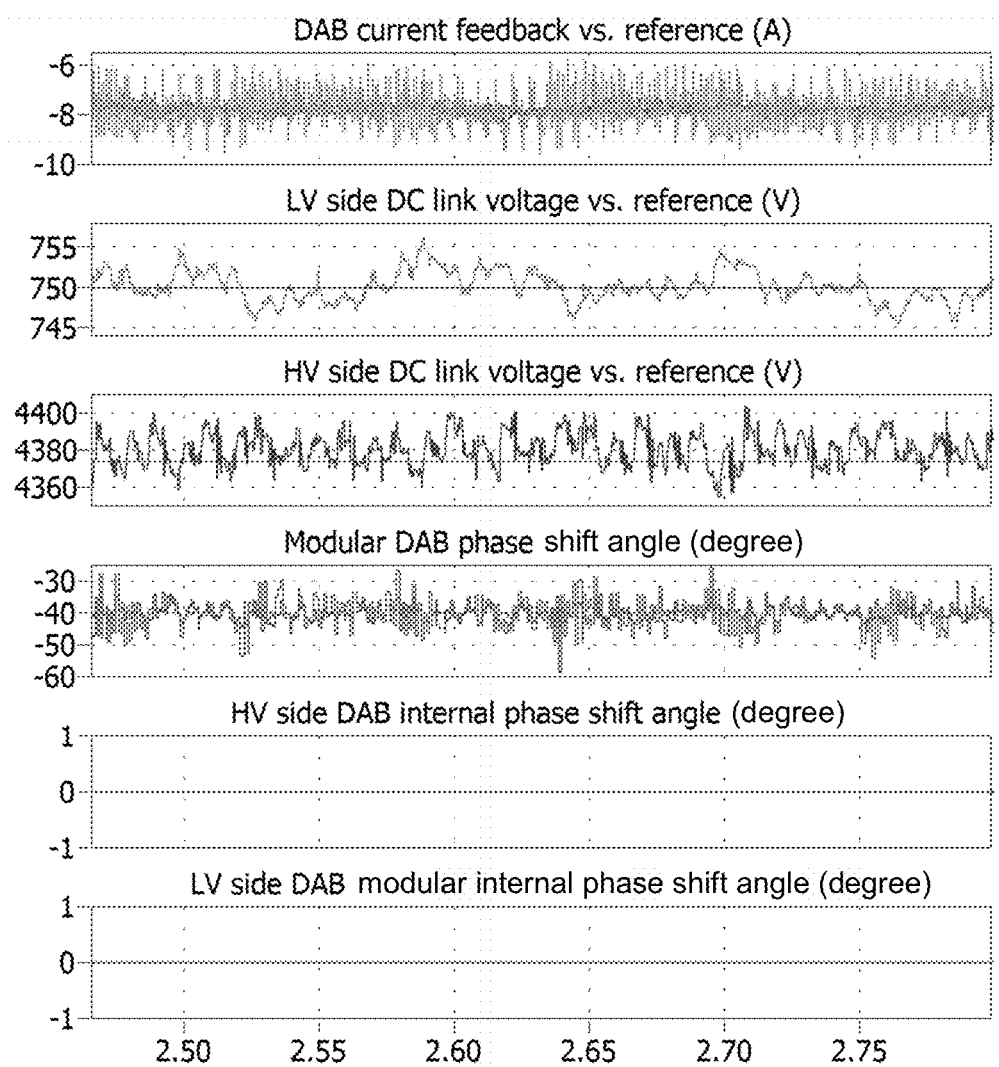
FIG. 33a illustrating the DAB control signals of SST steady state performance with power flow from LV grid to HV grid with DAB module operate at −6 kW full load condition.
Figure 33B:
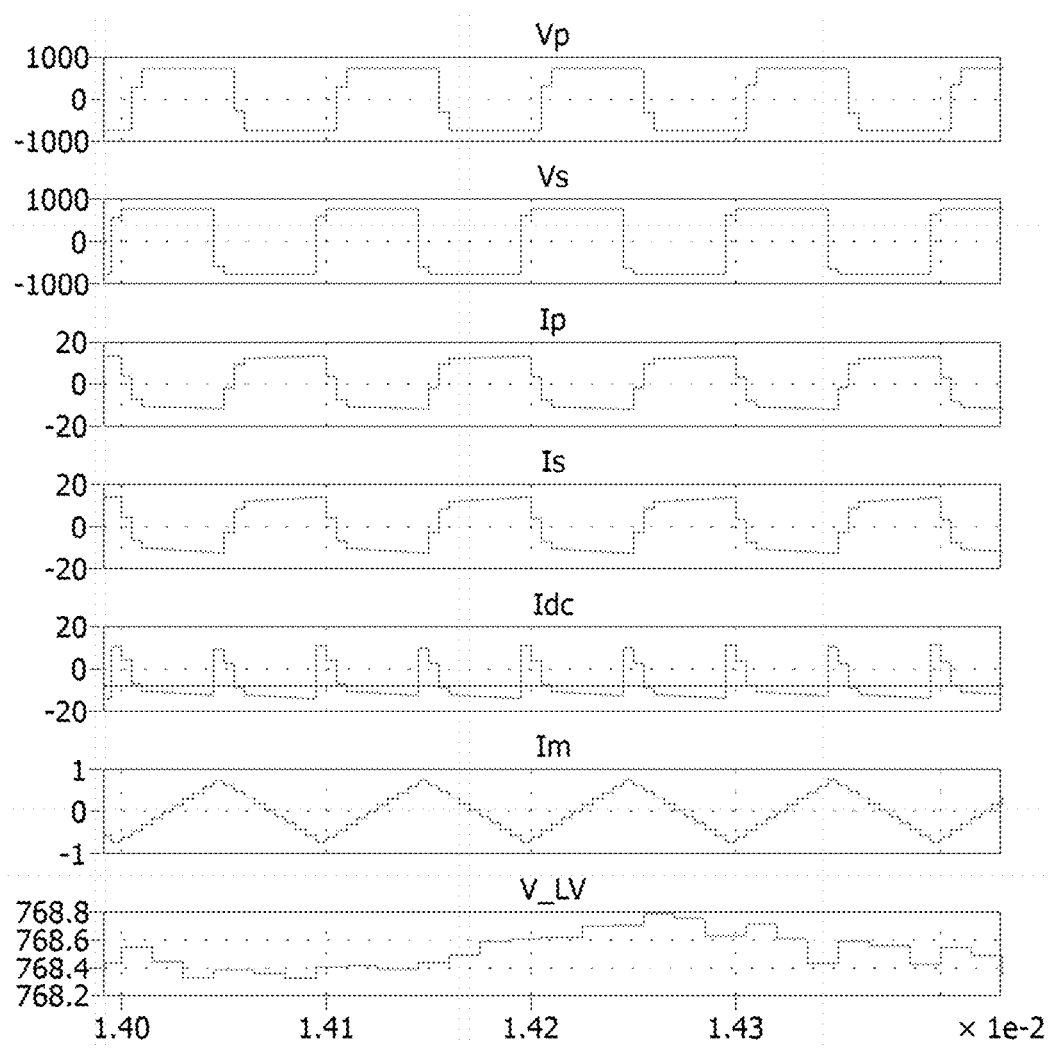
FIG. 33b illustrating the DAB circuit signals of SST steady state performance with power flow from LV grid to HV grid with DAB module operate at −6 kW full load condition.

FIGS. 33a and 33b show the PLECS real time emulation results of steady state performance of SST system with power flow regulation from LV to HV grid source with DAB module operates around −6 KW. Both HV side and LV side DC bus voltages are regulated at its target value. The emulation result shows that HV side DAB converter output voltage (Vp) lags LV side DAB voltage output (Vs) in phase angle around 40 degree. The turn-on delay added in both DAB HV converter and DAB LV converter FPGA based PWM signal generation and unsymmetrical response of PLECS PWM capture channel of PLECS RT box could be the root cause of unsymmetrical phase shift angle between positive power flow operations of FIGS. 32a and 32b.

Figure 34A:
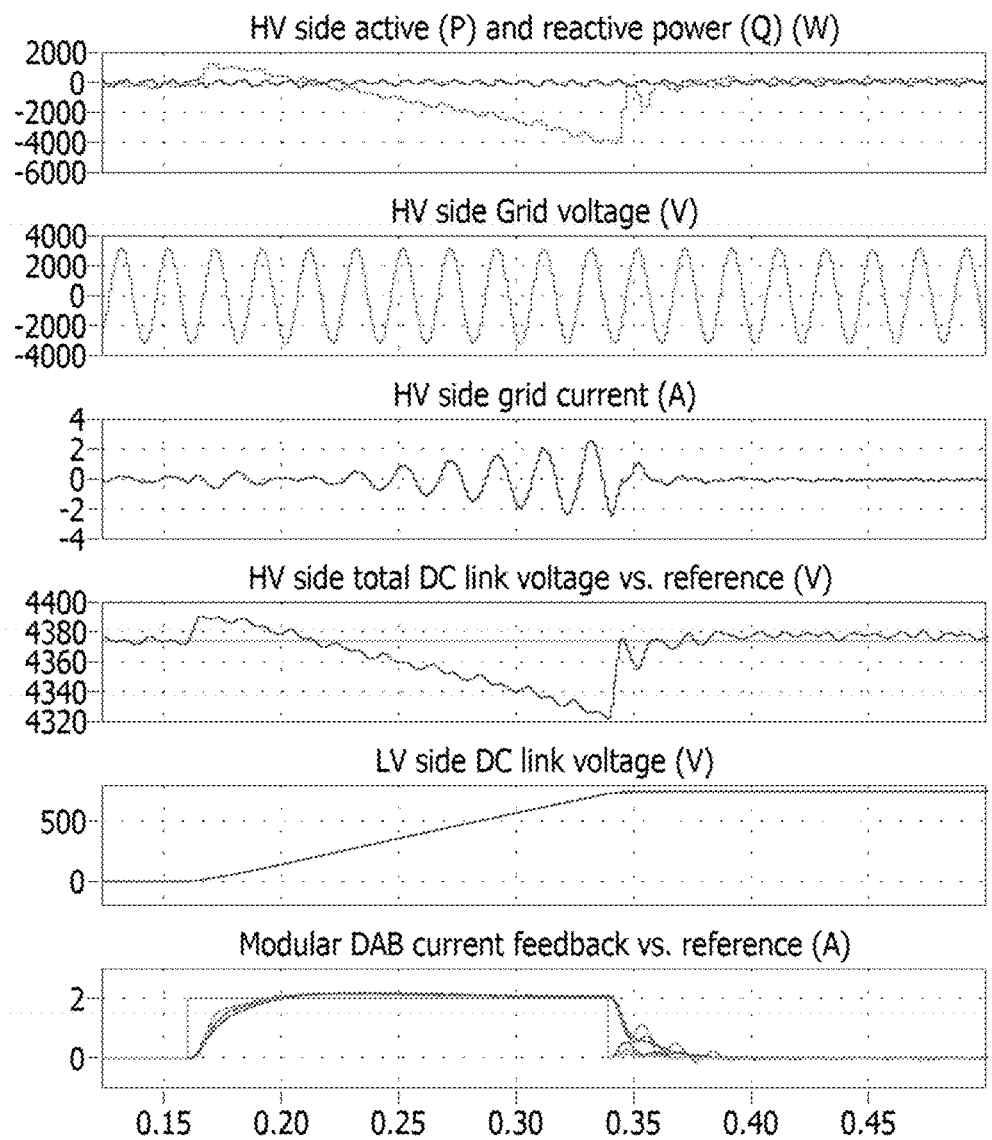
FIG. 34a illustrating the SST emulation results showing SST module converter performance for DAB control in LV side DC capacitor charging up with +/−20% DAB circuit external inductance variation among DAB modules.
Figure 34B:
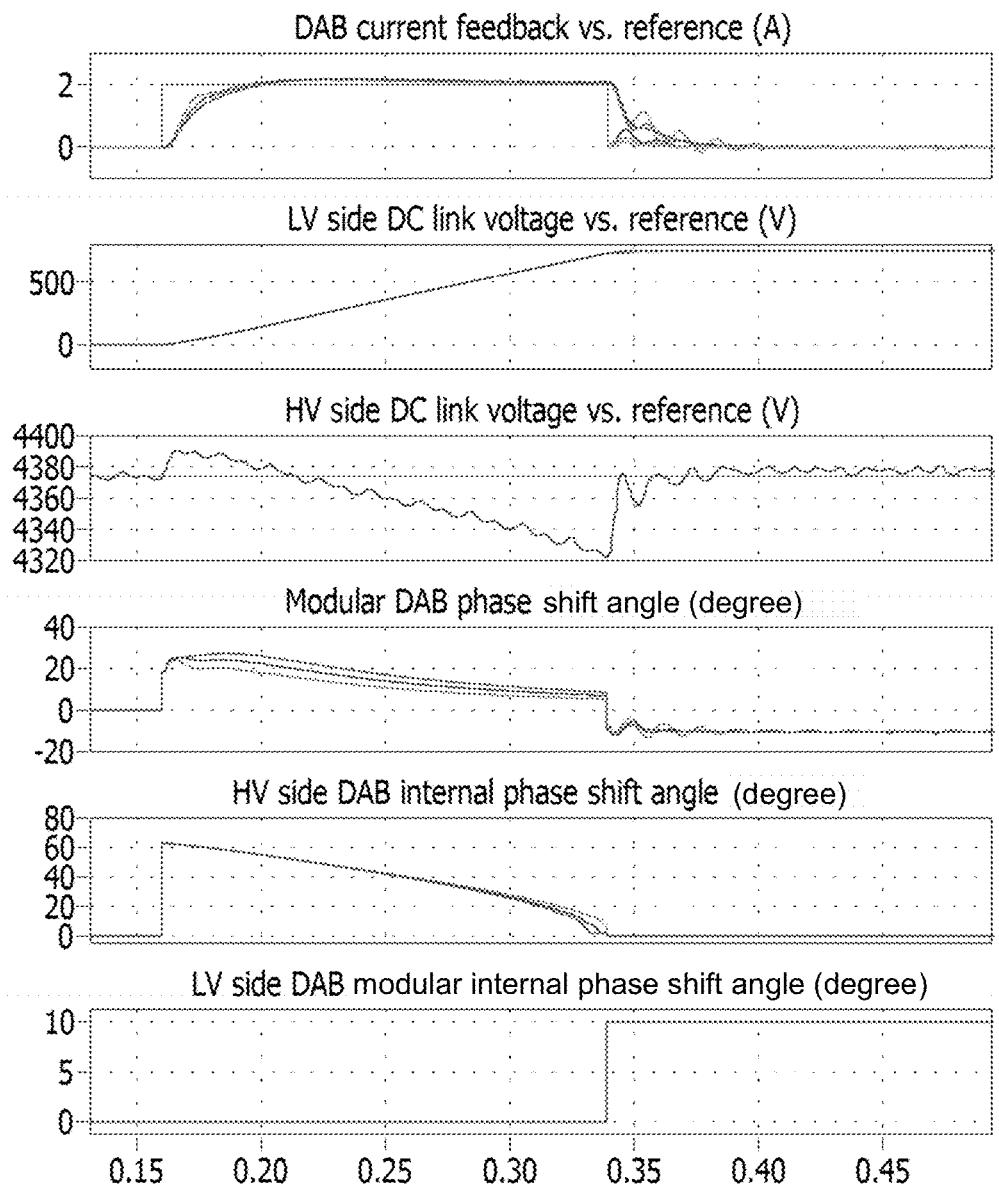
FIG. 34b illustrating the SST emulation results of DAB DC-DC control signals for DAB control in LV side DC capacitor charging up with +/−20% DAB circuit external inductance variation among DAB modules.

FIGS. 34a and 34b show the PLECS real time emulation results of LV side DC bus charging up process with the outer voltage loop disabled and inner current control loop activated with constant charging up current. This emulation is conducted in the condition with +/−20% DAB circuit external inductance variation among the three DAB modules. In the LV side DC bus charging up process, the HV side cascaded H-bridge converter control regulated the HV side DC bus voltage and provides the charging energy for LV side capacitor. The smooth LV side capacitor charging up energy control of modular DAB helps to improve the dynamic transition of HV side cascaded H-bridge controller and thus reduces the HV DC bus voltage variation. This allows a reduction in the HV side capacitor value for SST system.

In the LV DC bus voltage charging up process shown in FIGS. 34a and 34b, the HV side DAB internal phase shift angle $a_1$ of NPC half bridge converter starts with a very large value and is slowly reduced with increasing of LV side voltage. This helps to reduce the duty ratio of HV side DAB converter and limits the instantaneous in-rush DAB current when the LV DC capacitor voltage is charged up from zero voltage. The phase shift angles are different for DABs due to large external inductance variation. But the charging up current of individual DAB modules follows the current reference with fast dynamic step response. The modular DAB control is stable in the large variation range of $a_1$ value in the entire LV DC bus charging up process. This emulation result validates that the proposed linearized DAB current control scheme is not sensitive to the HV side phase shift angle $a_1$ variation and DAB external inductance parameter variation.

Figure 35A:
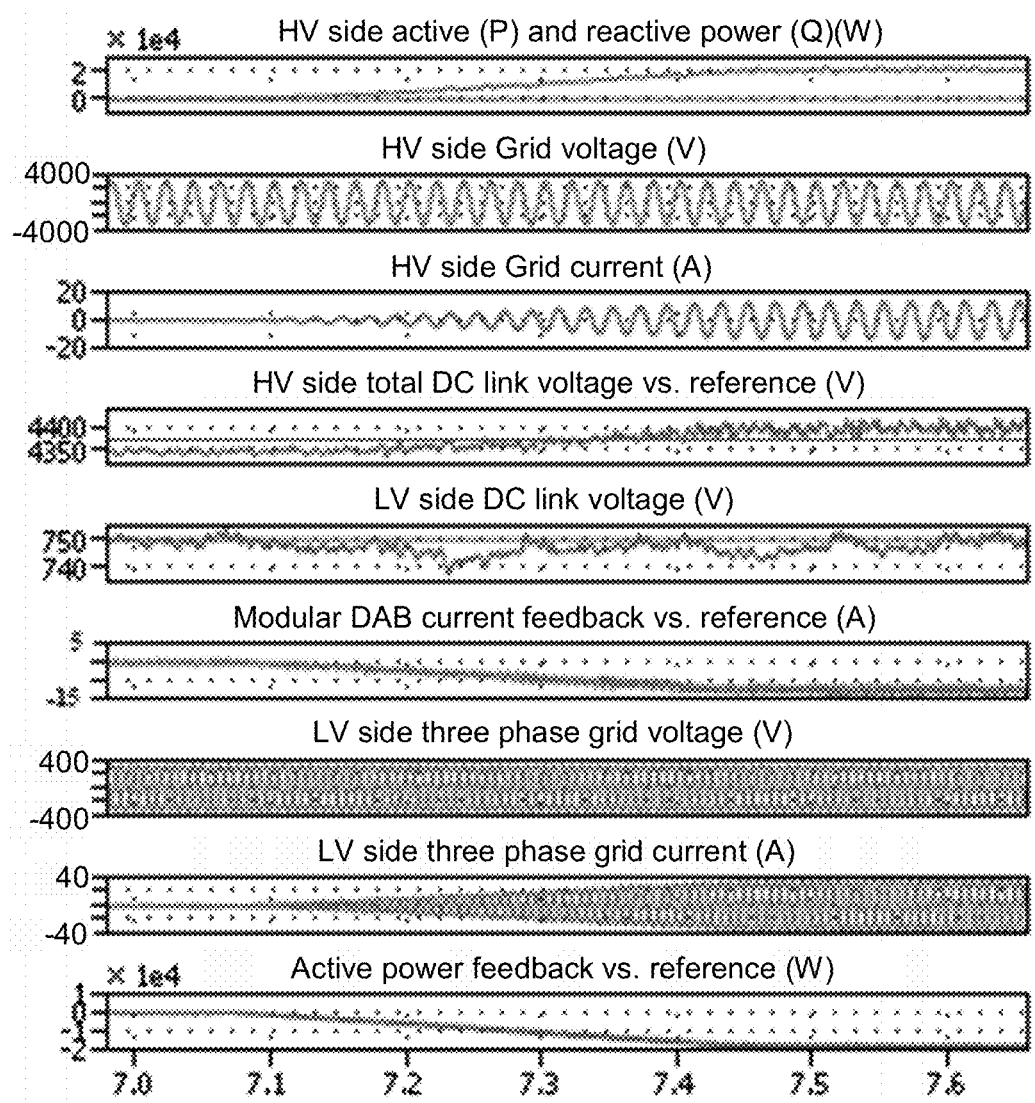
FIG. 35a illustrating the SST emulation results showing SST converter performance for positive power ramp to −18 kW with +/−20% DAB external inductance variation among DAB modules.
Figure 35B:
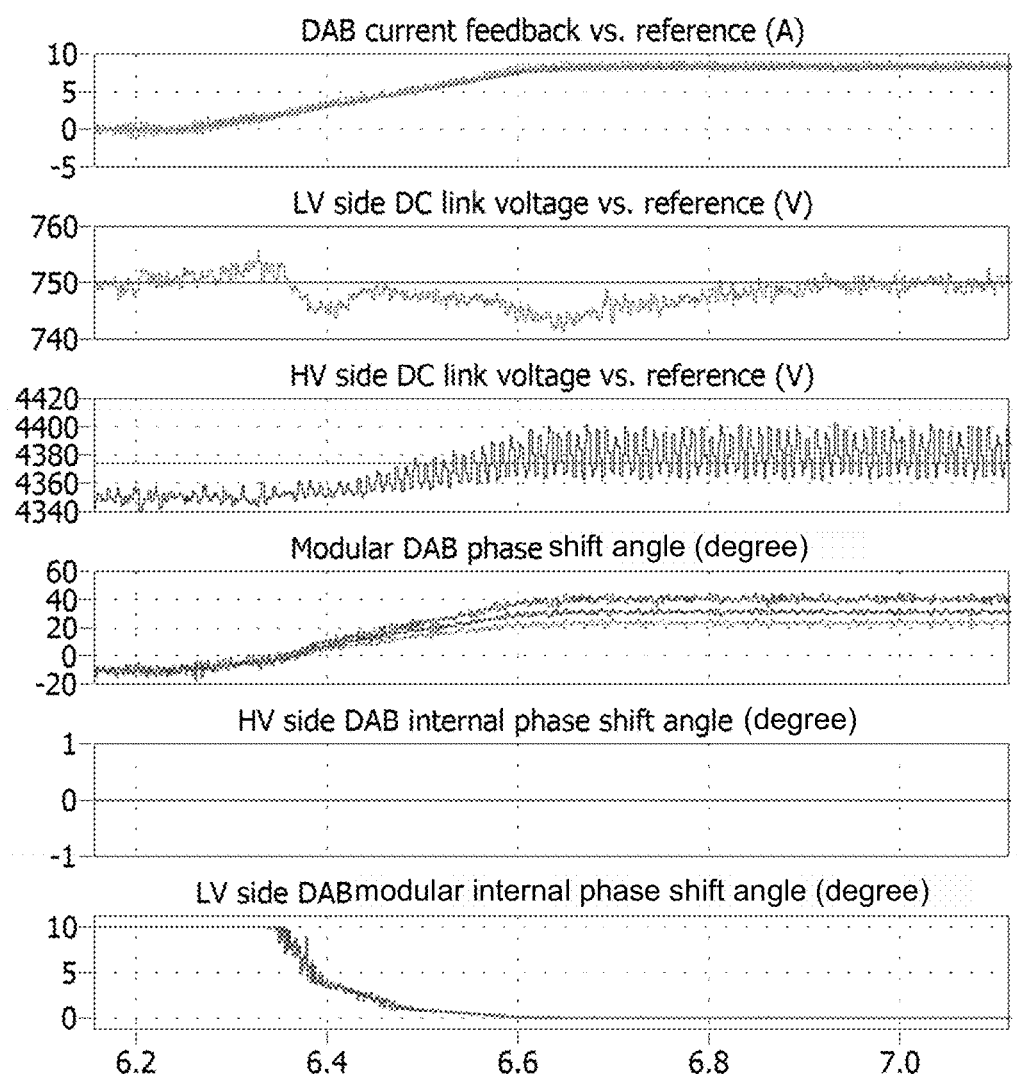
FIG. 35b illustrating the SST emulation results of Modular DAB control signals for positive power ramp to −18 kW with +/−20% DAB external inductance variation among DAB modules.

FIGS. 35a and 35b show the PLECS real time emulation results with modular DAB control for positive power ramp up from 0 to rated power +18 kW with +/−20% DAB external inductance value variation among the three DAB modules. In SST positive power ramp up process, HV side converter operates as a cascaded H-bridge rectifier. It regulates the HV side DC bus voltage and transfers the active power from HV side grid and transfer the power to DC-DC converter. The DAB converter regulates the LV side DC bus voltage and transfers the power to the LV side DC-AC inverter. The LV side three phase DC-AC inverter works as grid tied inverter to regulate the active power rounds it references settings. The fast dynamic response of modular DAB ensures the smooth power transfer from HV side grid to LV side grid with minimized HV DC bus voltage variation and LV DC bus voltage variation. This allows smaller HV side capacitor and LV side capacitor to be applied for SST system.

In the emulation results shown in FIGS. 35a and 35b, in the normal power regulation process of DAB, a look-up table with current reference of individual DAB module as input and the LV side DAB internal phase shift angle $a_2$ as output is implemented for modular DAB current control in order to keep LV side DAB converter to operate in the ZVS range at light load condition. The emulation results show that the ramp up current of SST system in DC-DC converter as well as in HV side rectifier and LV side inverter are all smooth. The HV side DC bus voltage and LV side DC bus voltage variation are both very small. The large external inductance variation among DAB modules causes the phase shift angle difference between HV side DAB converter and LV side DAB converter. However, the DAB module currents follow closely the reference with stable control achieved irrespective to the larger LV side DAB converter internal phase shift variation $a_2$ in power ramp up process and large external DAB circuit external inductance variation. This SST system emulation results validated that proposed linearized dual voltage and current DAB control scheme is robust to internal phase shift angle variation and the DAB circuit parameter variation.

Figure 36A:
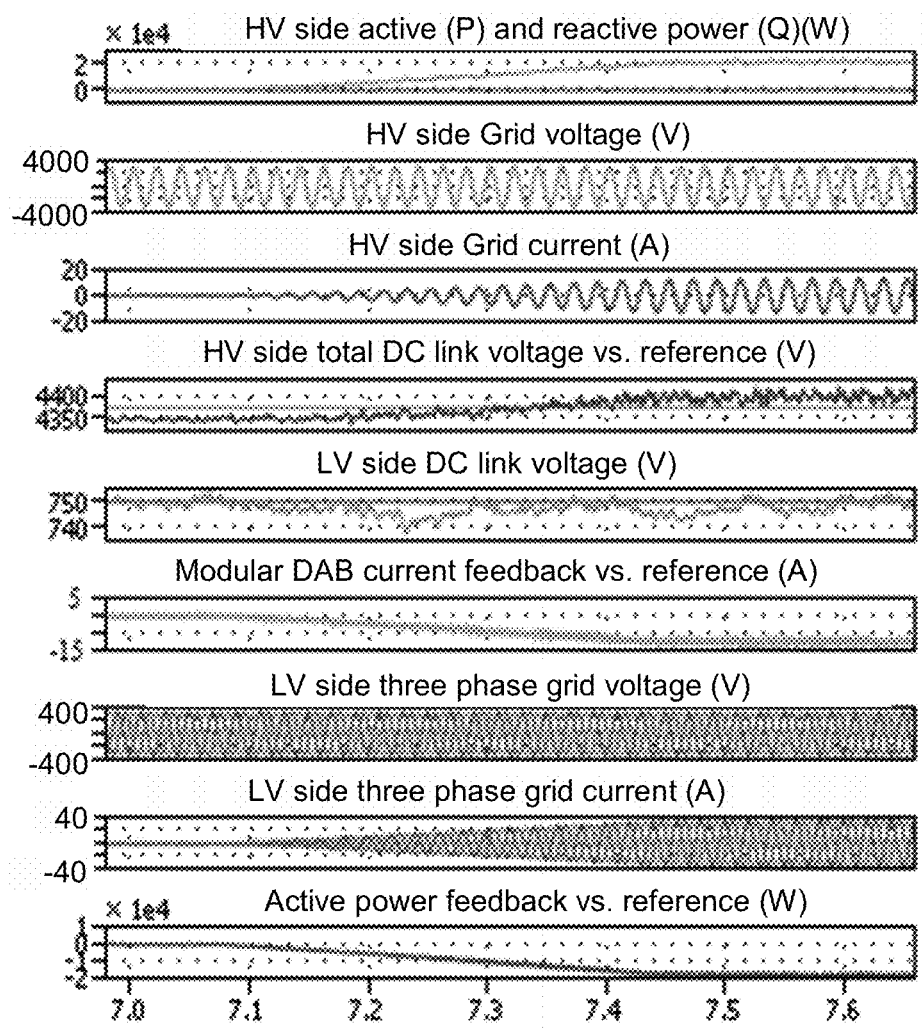
FIG. 36a illustrating the SST emulation results showing SST converter performance for negative power ramp to −18 kW with +/−20% DAB external inductance variation among DAB modules.
Figure 36B:
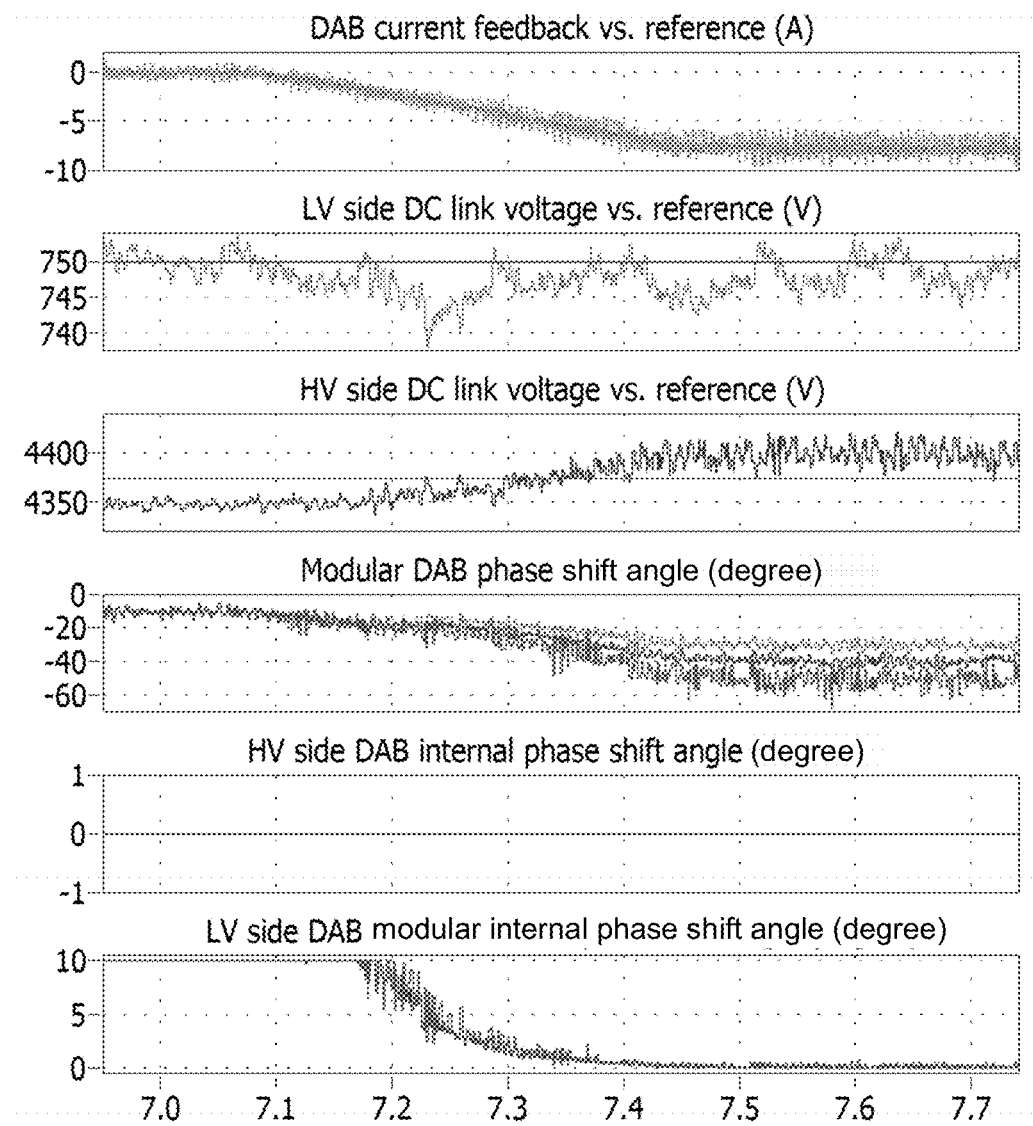
FIG. 36b illustrating the SST emulation results of Modular DAB control signals for negative power ramp to −18 kW with +/−20% DAB external inductance variation among DAB modules.

FIGS. 36a and 36b show the PLECS real time emulation results with modular DAB control for negative power ramp up from 0 to rated power −18 kW with +/−20% DAB external inductance value variation among the three DAB modules. In the emulation results shown in FIGS. 36a and 36b, the converter internal phase shift angle $t_6$ in negative power ramp up process is larger in the light power condition. In SST negative power ramp up process, LV side converter works as three phase rectifier. It transfers active power from LV side three phase grid to DC-DC converter. The DAB converter regulates the LV side DC bus voltage and transfers the active power to the HV side NPC cascade single phase DC-AC inverter. The HV side single phase NPC cascaded H-bridge DC-AC converter regulates the HV DC bus voltage around its target value and it effectively works as grid tied single phase inverter to transfer the active power to HV side single phase grid. The fast dynamic response of modular DAB is crucial for the smooth power transfer from LV side three phase AC grid to HV side single phase AC grid with minimized HV DC bus voltage variation and LV DC bus voltage variation.

The SST system emulation results of FIGS. 35*a* and 35*b* and FIGS. 36*a* and 36*b*, validated that proposed dual voltage and modular current DAB control scheme supports bi-directional power flow of the SST converter system without requires extra current sensors mounted on both HV and LV side of DAB converter output. The SST system emulation results of FIGS. 35*a* and 35*b* and FIGS. 36*a* and 36*b* also validated that the proposed linearized dual voltage and modular current DAB control scheme is robust for SST operation system with respect to large internal phase shift angle variation and the DAB external inductance variation.

Figure 37A:
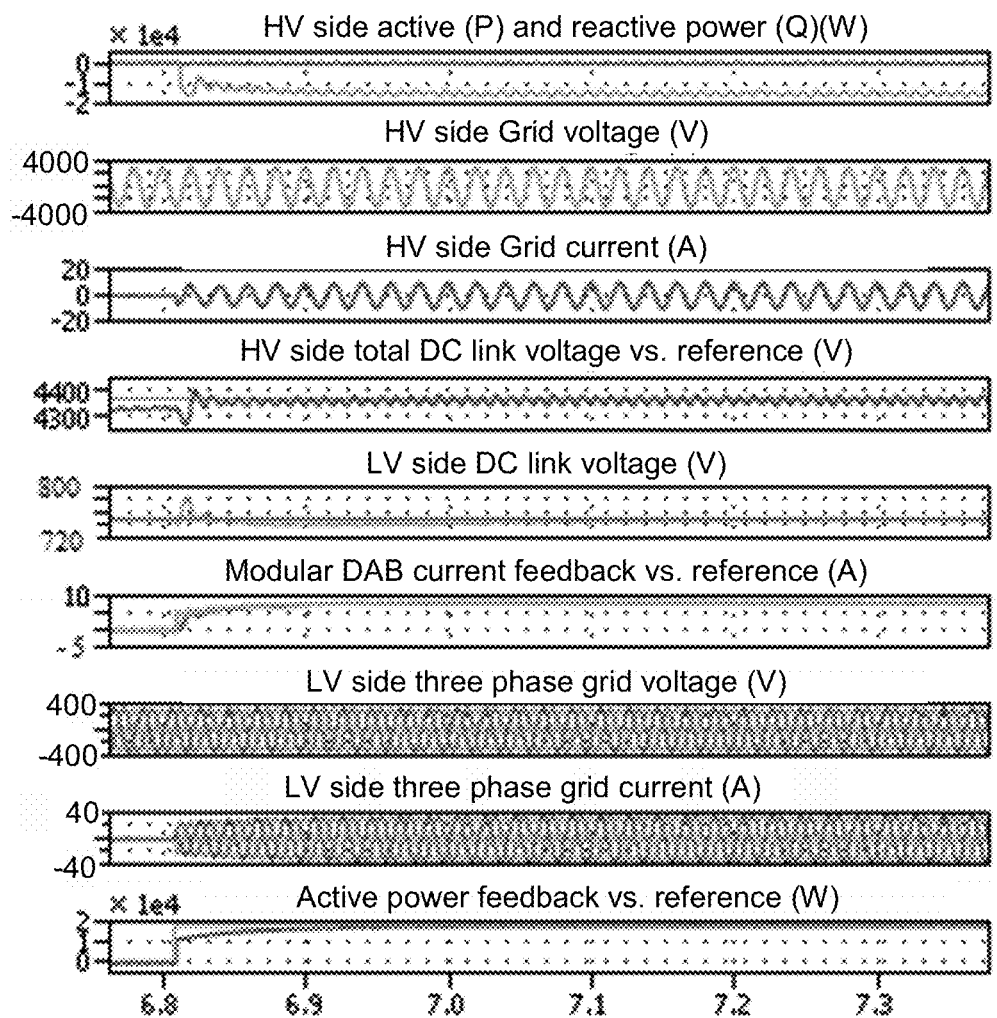
FIG. 37a illustrating the SST emulation results showing SST converter performance for positive power step change to −18 kW with +/−20% external inductance variation among DAB modules.
Figure 37B:
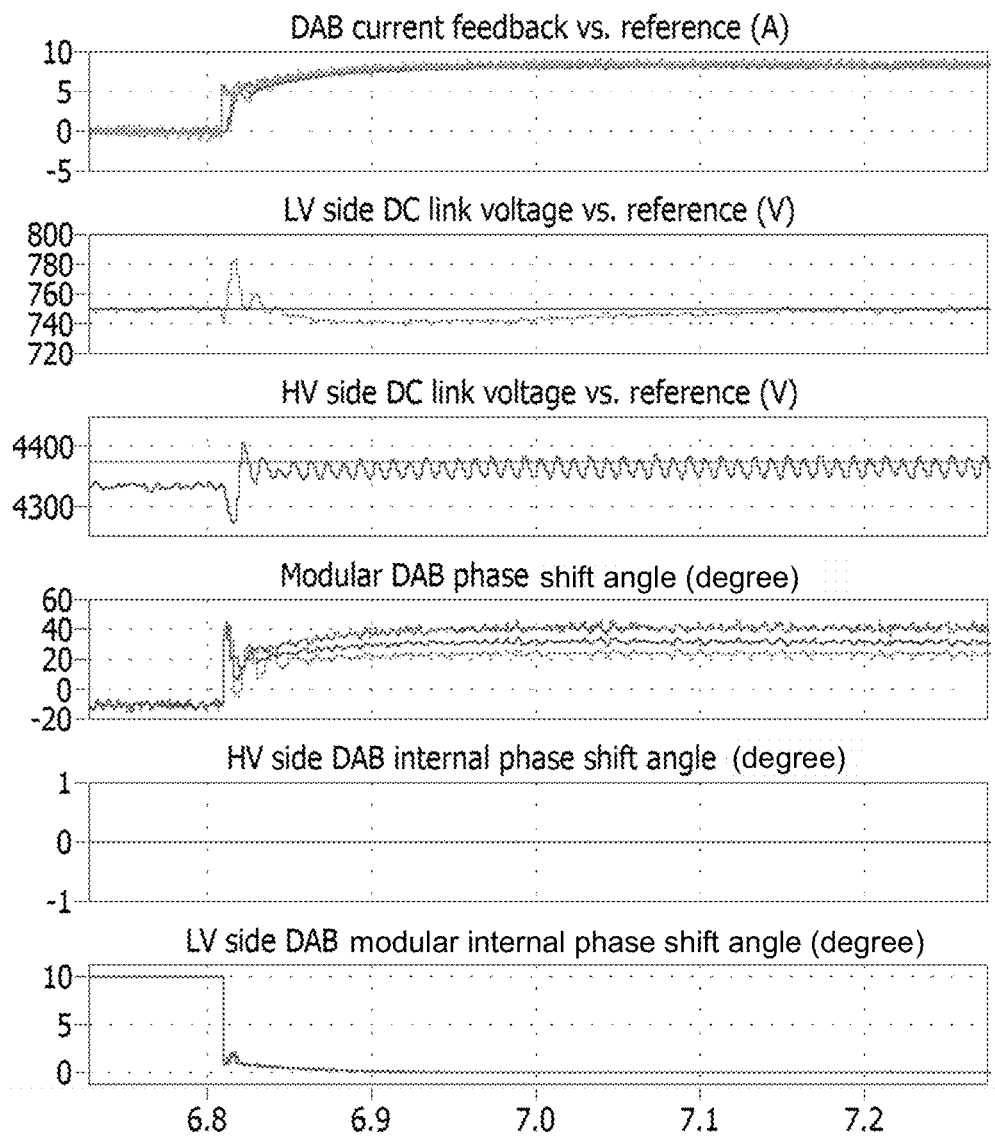
FIG. 37b illustrating the SST emulation results of Modular DAB control signals for positive power step change to −18 kW with +/−20% external inductance variation among DAB modules.

FIGS. 37*a* and 37*b* show the PLECS real time emulation results with modular DAB control for positive power step up from 0 to rated power +18 kW with +/−20% DAB external inductance value variation among the three DAB modules. This emulation result shows that fast transit response of modular DAB control, HV side rectifier control, and LV side three phase inverter control are achieved in the power step up change condition with respect to large DAB circuit inductance variation. The voltage transition in HV DC bus and LV DC bus are limited below +/−100V in power step change condition without requiring very large HV side and LV side DC bus capacitance values. This emulation result validates the proposed modular DAB control scheme has sufficient stability margins with respect to worst case operation condition change of SST system.

Figure 38A:
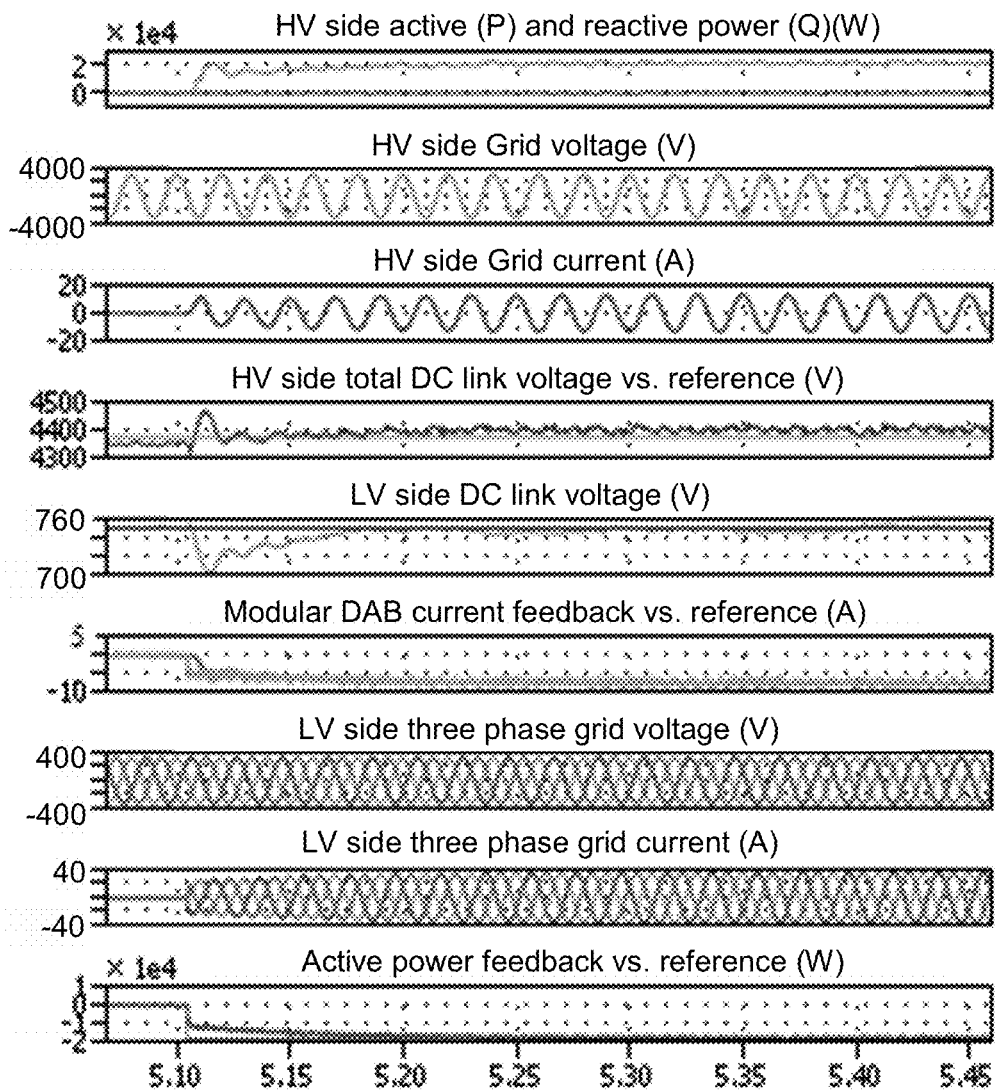
FIG. 38a illustrating the SST emulation results showing SST converter performance for negative power step change to −18 kW with +/−20% external inductance variation among DAB modules.
Figure 38B:
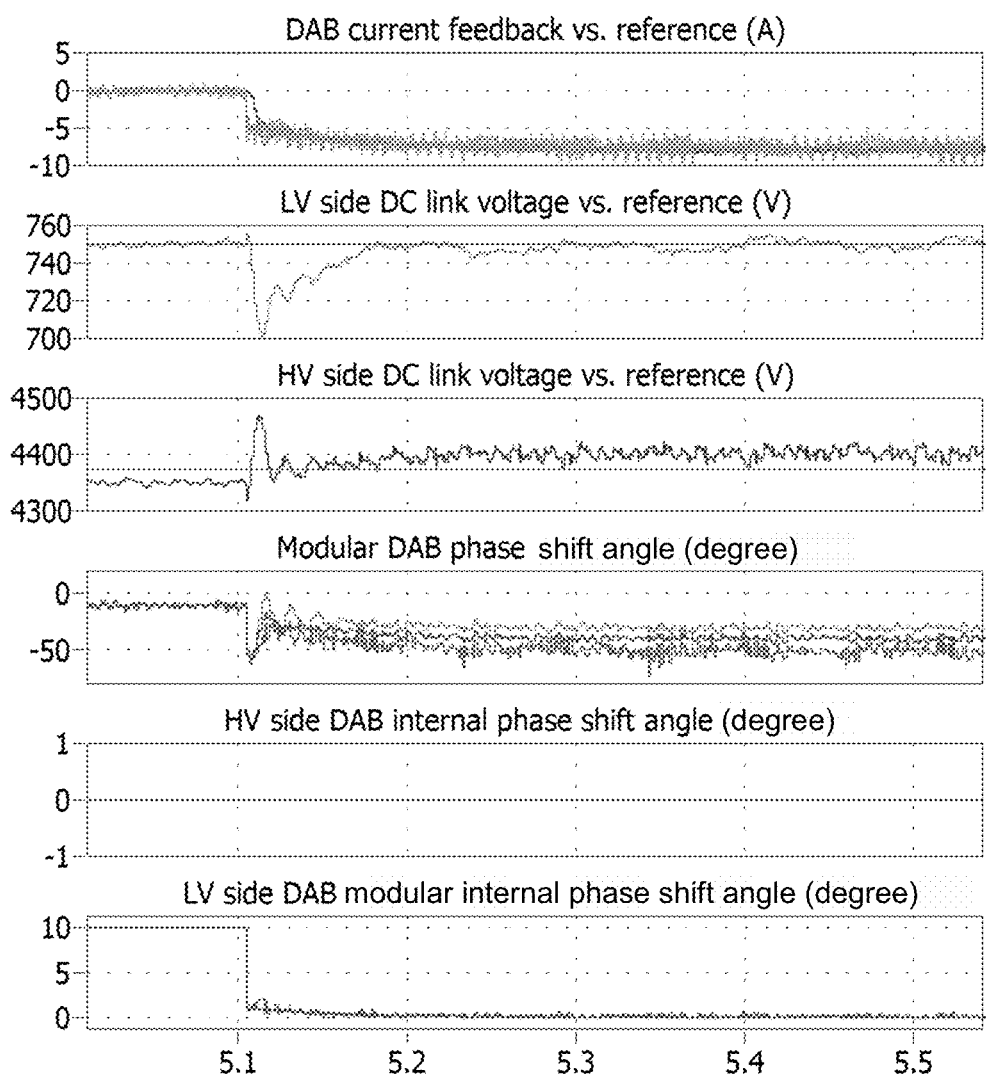
FIG. 38b illustrating the SST emulation results of Modular DAB control signals for negative power step change to −18 kW with +/−20% external inductance variation among DAB modules.

FIGS. 38*a* and 38*b* show the PLECS real time emulation results with modular DAB control for negative power step down from 0 to rated power −18 kW with +/−20% DAB external inductance value variation among the three DAB modules. This emulation result shows that fast transit response of modular DAB control, HV side rectifier control, and LV side three phase inverter control are achieved in the negative power step down change condition with respect to large DAB circuit inductance variation. The voltage transition in HV DC bus and LV DC bus are limited below +/−100V in power down step change condition without requiring very large HV side and LV side DC bus capacitance values.

With reference to the result of the modular DAB phase shift angle shown in FIGS. 34*b*, 35*b*, 36*b*, 37*b* and 38*b*, the three lines correspond to the DAB phase shift angle of the three cascaded bridge converters, which are almost equal to each other. Hence, three lines overlap each other.

The emulation results of FIGS. 37*a* and 37*b* and FIGS. 38*a* and 38*b* validate that the proposed modular DAB control scheme achieves robust performance for bi-direction power step change with respect to worst case operation condition of SST system.

Conclusion drawn from modular DAB control PLECS real time emulation results are as follows.

(1) CHB voltage balancing scheme requires enforced minimum CHB reactive power/current to achieve acceptable performance. It should be applied only in the SST start-up process before DAB voltage balancing control is activated.

(2) DAB current distribution voltage based HV DC link balancing control performance is not sensitive to the CHB circuit parameter variation, DAB circuit parameter variation, and HF transformer parameter variation. It is applicable for SST normal power regulation.

(3) DAB current distribution based HV DC link voltage balancing control does not require reactive power flow in HV CHB converter at zero power or light load conditions.

(4) DAB current distribution based HV DC link voltage balancing control has fast dynamic response to HV DC link voltage unbalance in SST normal power regulation.

(5) DAB current distribution based HV DC link voltage balancing control has better performance than CHB voltage balancing control in the entire power operation range of SST.

(6) The proposed DAB current distribution based HV DC link voltage balancing control can achieve the same voltage balancing performance for bi-direction SST power flow.

(7) DAB current distribution based HV DC link voltage balancing control performance is not sensitive to the load/power ramping and stepping dynamic transition.

(8) PLECS circuit model for DAB converter circuit is accurate for real time circuit emulation. PLECS FPGA based phase shift PWM generation is accurate for modular DAB control.

(9) The proposed linearized DAB dual voltage and current control scheme is simple and can be applied to improve the HV side and LV side DC bus voltage transit performance of the SST converter system with fast dynamic response in power ramp up/down operation and power step up/down transition for SST bi-direction power flow regulation.

(10) The power direction change is decided by the power reference polarity of LV side DC-AC three phase converter which is connected to LV side three phase grid voltage source.

(11) The proposed DAB linearized dual voltage and current control scheme achieves fast dynamic response of modular DAB control with respect to large DAB external inductance variation and larger HV side DAB DC-AC converter internal phase shift angle variation and larger LV side DAV AC-DC converter internal phase shift angle variation.

INDUSTRIAL APPLICATION

The proposed DAB voltage balancing control can be applied to improve the reliability of SST operation with reduced power device voltage rating by minimizing the HV DC bus voltage unbalance. With improved voltage balancing control achieved by DAB, the DC link capacitor size can also be reduced to achieve cost saving.

The proposed DAB voltage balancing control can be applied for modular DAB with multiple HV side DC bus application for electrical vehicle charging or battery charging application.

The proposed SST voltage balancing control scheme can be applied for both NPC CHB and HV side NPC half bridge DAB SST circuit topology and 2-level full bridge CHB and 2-level full bridge DAB circuit topology.

The proposed SST voltage balancing control scheme with enforced reactive power in CHB in SST start-up process can be applied in Statistical Atlases and Computational Modelling (STACOM) application of CHB converter and other CHB converter circuit application cases including the high voltage motor drive CHB circuit application.

The proposed DAB linearized dual voltage loop and current loop control scheme is applicable for SST product deployment with reliable control and operation of SST converter system.

The proposed DAB linearized dual voltage loop and current loop control scheme can be used in other DAB DC-DC converter application for electrical vehicle battery charging application, traction drive application, magnetically isolated DC power supply application, etc.

The proposed DAB control scheme can also be applied for PV DC-DC converter interface control to provide power to the HV AC grid or LV AC grid through a DC-AC inverter.

The proposed DAB control scheme can be applied for both 2-level and 3-level DC-DC converter control. The method can be generalized for higher order DC-DC DAB converter control as well.

While the invention has been illustrated and described in detail in the drawings and foregoing description, such illustration and description are to be considered illustrative or exemplary, and not restrictive; the invention is not limited to the disclosed embodiments.

Other variations to the disclosed embodiments can be understood and effected by those skilled in the art in practising the claimed invention.

The invention claimed is:

1. A method of controlling a Solid State Transformer (SST), the method comprising:
    dividing a dual active bridge (DAB) power reference by a Low Voltage (LV) side Direct Current (DC) link voltage to obtain a total DAB reference current;
    dividing the total DAB reference current by N number of DAB modules to obtain a reference current for each DAB module;
    in response to the SST being in a normal power regulation, determining a deviation of a capacitor voltage at the HV side of each of a k DAB modules with reference from an average voltage from the HV DC bus;
    determining a current adjustment signal for each of the k DAB modules based on the total DAB reference current and a corresponding deviation of the capacitor voltage of each of the k DAB modules;
    adding the current adjustment signal together with the reference current for each DAB module to obtain a total current reference for each of the k DAB modules; and
    subtracting a sum of the total current reference of each of the k DAB modules from the total DAB reference current to determine a total current reference of an $N^{th}$ DAB module, wherein k=1, . . . , N−1.

2. The method of controlling the SST according to claim 1 wherein the step of determining the current adjustment signal for each of the k DAB modules based on the total DAB reference current and the corresponding deviation of the capacitor voltage of each of the k DAB modules comprises:
    multiplying the deviation of the capacitor voltage at the HV side of each of the k DAB modules, a load dependent voltage balancing proportional compensation gain, and a magnitude of the reference current for each of the k DAB modules.

3. The method of controlling the SST according to claim 2 wherein the current adjustment signal is saturated before adding together with the reference current for each DAB module to obtain the total current reference for each of the k DAB modules.

4. The method of controlling the SST according to claim 2 further comprising:
    in response to the total current reference of the $N^{th}$ DAB module being positive, increasing the magnitude of the reference current for a DAB module with higher deviation of the capacitor voltage.

5. The method of controlling the SST according to claim 2 further comprising:
    in response to the total current reference of the $N^{th}$ DAB module being negative, reducing the magnitude of the reference current for a DAB module with higher deviation of the capacitor voltage.

6. The method of controlling the SST according to claim 2 further comprising:
    in response to the total current reference of the $N^{th}$ DAB module being positive, reducing the magnitude of the reference current for a DAB module with lower deviation of the capacitor voltage.

7. The method of controlling the SST according to claim 2 further comprising:
    in response to the total current reference of the $N^{th}$ DAB module being negative, increasing the magnitude of the reference current for a DAB module with lower deviation of the capacitor voltage.

8. The method of controlling the SST according to claim 1 further comprising:
    in response to the SST being in a normal power regulation, applying the reference current of each DAB module as the total current reference for each DAB module.

9. The method of controlling the SST according to claim 8 further comprising:
    in response to the SST being in the normal power regulation, enforcing minimum HV side reactive power.

10. The method of controlling the SST according to claim 1 further comprising:
    linearizing a current and a voltage in each DAB module.

11. The method of controlling the SST according to claim 10 wherein the step of linearizing the current and the voltage in each DAB module comprises:
    applying a non-linear compensation function between a proportional-integral (PI) controller and a DAB plant, the non-linear compensation function being $$\frac{\beta}{\chi} = \frac{1}{V_{DC_{HV}} * \cos\left(\frac{\alpha_{1\_1} + \alpha_{1\_2}}{4}\right) * \cos\left(\frac{a_2}{2}\right)}$$

where $V_{DC_{HV}}$ refers to capacitor voltage at the HV side of each DAB module, $a_{1\_1}$, $a_{1\_2}$, $a_2$ are phase shift angles from the DAB plant, $\beta$ refers to the input of the DAB plant and $\chi$ refers to the output of the PI.

12. The method of controlling the SST according to claim 11 wherein the step of linearizing the current and the voltage in each DAB module further comprises:
    passing a low voltage output current through a low pass filter and using the filtered output current as a feedback signal;
    obtaining a difference between an input current and the feedback signal and passing a signal representing the difference through a proportional-integral (PI) controller and the non-linear compensation function; and
    performing linearization of a voltage by using a square of a low voltage output voltage as a feedback signal to the reference voltage.

13. The method of controlling the SST according to claim 2 wherein the voltage balancing proportional compensation gain is a positive value and/or obtained from a look-up table.

* * * * *